United States Patent
Briggs et al.

(10) Patent No.: US 11,291,215 B2
(45) Date of Patent: Apr. 5, 2022

(54) DURABLE ASYMMETRIC COMPOSITE MEMBRANES AND MODIFIED SUBSTRATES USED IN THEIR PREPARATION

(71) Applicant: HYDROXSYS HOLDINGS LIMITED, Auckland (NZ)

(72) Inventors: Daryl Joseph Briggs, Auckland (NZ); Lenka Benacek Craft, Auckland (NZ); Ashveen Vikash Nand, Auckland (NZ); Mark Exley, Auckland (NZ)

(73) Assignee: HYDROXSYS HOLDINGS LIMITED, Auckland (NZ)

( * ) Notice: Subject to any disclaimer, the term of this patent is extended or adjusted under 35 U.S.C. 154(b) by 0 days.

(21) Appl. No.: 16/298,264

(22) Filed: Mar. 11, 2019

(65) Prior Publication Data

US 2019/0200631 A1    Jul. 4, 2019

Related U.S. Application Data

(63) Continuation-in-part of application No. 15/539,903, filed as application No. PCT/IB2015/060001 on Dec.
(Continued)

(30) Foreign Application Priority Data

Mar. 26, 2014 (AU) .................. 2014901077
Mar. 26, 2014 (AU) .................. 2014901078
Dec. 24, 2014 (AU) .................. 2014905278

(51) Int. Cl.
*B01D 69/12* (2006.01)
*B01D 71/26* (2006.01)
(Continued)

(52) U.S. Cl.
CPC .......... *A23C 9/142* (2013.01); *B01D 67/0006* (2013.01); *B01D 69/02* (2013.01);
(Continued)

(58) Field of Classification Search
CPC .... A23C 9/142; A23C 2210/20; B01D 69/10; B01D 67/0006; B01D 69/02;
(Continued)

(56) References Cited

U.S. PATENT DOCUMENTS 4,707,265 A    11/1987 Barnes, Jr. et al.
4,933,083 A    6/1990 Jones, Jr.
(Continued)

FOREIGN PATENT DOCUMENTS

CN        103421208        12/2013
WO        WO 93/01622       1/1993
(Continued)

OTHER PUBLICATIONS

Zhao et al, Highly hydrophilic and low-protein-fouling polypropylene membrane prepared by surface modification with sulfobetaine-based zwitterionic polymer through a combined surface polymerization method, Journal of Membrane Science 362 (2010) 326-333. (Year: 2010).*
(Continued)

*Primary Examiner* — Pranav N Patel
(74) *Attorney, Agent, or Firm* — Nixon & Vanderhye

(57) ABSTRACT

Durable asymmetric composite membranes consisting essentially of a film of cross-linked sulfonated poly(ether ether ketone) adhered to a sheet of hydrophilicitized microporous poly(ethylene) are disclosed. The membranes have application in the recovery of water from feed streams where the ability to clean in situ is desirable, for example in dairy processing. Methods of preparing cross-linked sulfonated poly(ether ether ketone) suitable for use as the
(Continued)

rejection layer and hydrophilicitized sheets of microporous poly(ethylene) suitable for use as the support layer of such membranes are also disclosed.

5 Claims, 24 Drawing Sheets

Related U.S. Application Data 28, 2015, now Pat. No. 10,335,742, application No. 16/298,264, which is a continuation-in-part of application No. 15/271,923, filed on Sep. 21, 2016, now Pat. No. 10,226,056, which is a continuation of application No. PCT/NZ2015/050034, filed on Mar. 26, 2015.

(51) Int. Cl.
    A23C 9/142    (2006.01)
    B01D 71/52    (2006.01)
    B01D 71/82    (2006.01)
    C02F 1/44    (2006.01)
    B01D 69/10    (2006.01)
    B01D 67/00    (2006.01)
    B01D 69/02    (2006.01)
    H01M 50/403    (2021.01)
    H01M 50/449    (2021.01)

(52) U.S. Cl.
    CPC ........... *B01D 69/10* (2013.01); *B01D 69/105* (2013.01); *B01D 69/12* (2013.01); *B01D 69/125* (2013.01); *B01D 71/52* (2013.01); *B01D 71/82* (2013.01); *C02F 1/44* (2013.01); *A23C 2210/20* (2013.01); *B01D 67/0093* (2013.01); *B01D 71/26* (2013.01); *B01D 2323/02* (2013.01); *B01D 2323/30* (2013.01); *B01D 2323/34* (2013.01); *B01D 2325/04* (2013.01); *B01D 2325/14* (2013.01); *H01M 50/403* (2021.01); *H01M 50/449* (2021.01)

(58) Field of Classification Search
    CPC .... B01D 69/105; B01D 69/12; B01D 69/125; B01D 71/52; B01D 71/82; B01D 2323/34; B01D 2325/14; B01D 2323/02; B01D 67/0093; B01D 71/26; B01D 2323/30; B01D 2325/04; C02F 1/44; H01M 2/145; H01M 2/1686; H01M 2008/1095; H01M 8/1025; H01M 8/106; H01M 8/1053; H01M 10/0525; H01M 2/1653; Y02E 60/10; Y02E 60/50
    See application file for complete search history.

(56) References Cited

U.S. PATENT DOCUMENTS

| | | | |
|---|---|---|---|
| 4,976,897 A | 12/1990 | Callahan et al. | |
| 5,013,439 A | 5/1991 | Fisher et al. | |
| 5,049,275 A | 9/1991 | Gillberg-LaForce et al. | |
| 5,102,552 A | 4/1992 | Callahan et al. | |
| 5,160,627 A | 11/1992 | Cussler et al. | |
| 5,266,391 A | 11/1993 | Donato et al. | |
| 5,294,342 A | 3/1994 | Donato | |
| 5,294,346 A | 3/1994 | Donato et al. | |
| 5,328,760 A | 7/1994 | Gillberg-LaForce | |
| 6,384,100 B1 | 5/2002 | Choi | |
| 6,515,039 B1 | 2/2003 | Ulbricht et al. | |
| 6,680,144 B2 | 1/2004 | Choi | |
| 6,955,865 B2 | 10/2005 | Choi | |
| 9,643,153 B2 | 5/2017 | Meier et al. | |
| 2003/0124332 A1* | 7/2003 | Mao .............. G01N 33/54353 | 506/32 |
| 2006/0121217 A1 | 6/2006 | Childs et al. | |
| 2008/0197070 A1 | 8/2008 | Sirkar et al. | |
| 2011/0094960 A1* | 4/2011 | Zhou ................ B01D 69/125 | 210/500.27 |
| 2012/0252091 A1 | 10/2012 | Rasmussen et al. | |
| 2014/0157985 A1 | 6/2014 | Scovazzo et al. | |

FOREIGN PATENT DOCUMENTS

| | | |
|---|---|---|
| WO | WO 02/085500 | 10/2002 |
| WO | WO 2005/120701 | 12/2005 |
| WO | 2006/015495 | 2/2006 |
| WO | 2006/034575 | 4/2006 |
| WO | 2010/002501 | 1/2010 |
| WO | WO 2010/002502 | 1/2010 |
| WO | WO 2010/106021 | 9/2010 |
| WO | 2011/058439 | 5/2011 |
| WO | WO 2015/147657 | 10/2015 |

OTHER PUBLICATIONS

Abstract of Bai et al (2011) Surface UV photografting of acrylic acid onto LDPE powder and its adhesion *Shenyang Huagong Daxue Xuebao* 25(2), 121-125.
Abstract of El Kholdi et al (2004) Modification of adhesive properties of a polyethylene film by phtografting *Journal of Applied Polymer Science* 92(5), 2803-2811.
Abstract of Shentu et al (2002) Factors affecting photo-grafting on low density polyethylene *Hecheng Suzhi Ji Suliao* 19(3), 5-8.
Abstract of Xu and Yang (2000) Study on the mechanism of LDPE-AA vapor-phase photografting system, *Gaofenzi Xuebao*, 5, 594-598.
Allmér et al (1988) Surface modification of polymers. I. Vapourphase photografting with acrylic acid, *Journal of Polymer Science, Part A: Polymer Chemistry*, 26(8), 2099-2111.
Allmér et al (1989) Surface modification of polymers. II. Grafting with glycidyl acrylates and the reactions of the grafted surfaces with amines, *Journal of Polymer Science: Part A: Polymer Chemistry*, 27, 1641-1652.
Ang et al (1980) Photosensitized grafting of styrene, 4-vinylpyridine and methyl methacrylate to polypropylene, *Journal of Polymer Science: Polymer Letters Edition*, 18, 471-475.
Anon (2014) DOW FILMTEC™ Membranes—Cleaning procedures for DOW FILMTEC FT30 elements Tech Fact (Form No. 609-23010-0211).
Causserand and Aimar (2010) 1.15 Characterisation of filtration membranes In Comprehensive membrane science and engineering Drioli, E; Giorna, L. eds. Oxford Elsevier.
Drioli et al (2003) Sulfonated PEEK-WC membranes for possible fuel cell applications, *Journal of Membrane Science* 228 (2004) 139-148.
Edge et al (1993) Surface modification of polyethylene by photochemical grafting with 2-hydroxyethylmethacrylate, *Journal of Applied Polymer Science*, 47, 1075-1082.
He, T., et al; "Preparation and characterization of nanofiltration membranes by coating polyethersulfone hollow fibers with sulfonated poly(ether ether ketone) (SPEEK),"; *J Membrane Sci.*, vol. 307, pp. 62-72 (2008) Abstract; Sections 2.4, 3.2 & 3.4.
Kubota and Hata (1990) Benzil-sensitized photografting of methacrylic acid on low-density polyethylene film, *Journal of Applied Polymer Science*, 40, 1071-1075.
Kubota and Hata (1990) Distribution of methacrylic acid-grafted chains introduced into polyethylene film by photografting, *Journal of Applied Polymer Science*, 41, 689-695.
Luo, H., et al; "Double cross-linked polyetheretherketone proton exchange membrane for fuel cell"; *Int. J. Hydrogen Energ.*, vol. 37, pp. 6148-6152 (2012) Section 2.2; Figure 1.
Nymeijer K., et al; "Super selective membranes in gas-liquid membrane contactors for olefin/paraffin separation"; *Journal of Membrane Science*, vol. 232, pp. 107-114 (2004).

(56) References Cited

OTHER PUBLICATIONS

Ogiwara et al (1981) Photosensitized grafting on polyolefin films in vapor and liquid phases, *Journal of Polymer Science: Polymer Letters Edition*, 19, 457-462.

Rhoden, S.L. N.H., et al; "Low equivalent weight Friedel-Crafts cross-linked sulfonated poly(ether ether ketone)," *J. Membrane Sci.*, vol. 376, pp. 290-301 (2011) Sections 2.2, 2.3 & 3.2; Scheme 1.

Tazuke and Kimura (1978) Surface photografting. I. Graft polymerization of hydrophilic monomers onto various polymer films, *Journal of Polymer Science: Polymer Letters Edition*, 16, 497-500.

Yang and Rånby (1996) Bulk surface photografting process and its applications. II. Principal factors affecting surface photografting, *Journal of Applied Polymer Science*, 62, 545-555.

Yao and Rånby (1990) Surface modification by continuous graft copolymerization. I. Photoinitiated graft copolymerization onto polyethylene tape film surface, *Journal of Applied Polymer Science*, 40, 1647-1661.

Yao and Rånby (1990) Surface modification by continuous graft copolymerization. III. Photoinitiated graft copolymerization onto poly(ethylene terephthalate) fiber surface, *Journal of Applied Polymer Science*, 41, 1459-1467.

Yao and Rånby (1990) Surface modification by continuous graft copolymerization. IV. Photoinitiated graft copolymerization onto polypropylene fiber surface, *Journal of Applied Polymer Science*, 41, 1469-1478.

Zhang and Rånby (1991) Surface modification by continuous graft copolymerisation. II. Photoinitiated graft copolymerization onto polypropylene film surface, *Journal of Applied Polymer Science*, 43, 621-636.

International Search Report issued in PCT/IB2015/06001 dated Mar. 29, 2016.

International Search Report issued in PCT/NZ2015/050034 dated Jul. 16, 2015.

Yang et al., Multilayer Membranes Based on Sulfonated Poly(Ether Ether Ketone) and Poly(Vinyl Alcohol) for Direct Methanol Membrane Fuel Cells, The Open Fuel Cells Journal, 2008, 1, pp. 4-8 (Dec. 2008).

* cited by examiner

DURABLE ASYMMETRIC COMPOSITE MEMBRANES AND MODIFIED SUBSTRATES USED IN THEIR PREPARATION

This application is a Continuation-in-Part of Ser. No. 15/539,903 filed Jun. 26, 2017, which is a national phase of PCT/IB2015/060001 filed Dec. 28, 2015, which claims priority to Australian Application No. 2014905278 filed Dec. 24, 2014. This application is also a Continuation-in-Part of Ser. No. 15/271,923 filed Sep. 21, 2016, which is a continuation of PCT/NZ2015/050034 filed Mar. 26, 2015, which claims priority to Australian Application Nos. 2014901078 and 2014901077, both filed Mar. 26, 2014. The contents of each of these application are hereby incorporated by reference.

FIELD OF INVENTION

The invention relates to the preparation and use of cross-linked poly(ether ether ketone) as a rejection layer in durable asymmetric composite membranes. The invention also relates to modifying the chemical and physical properties of sheets of microporous polyolefin, in particular poly(ethylene), and the use of these hydrophilicitized sheets as the support layer in the preparation of the durable asymmetric composite membranes. In particular, the invention relates to membranes consisting essentially of a rejection layer of cross-linked poly(ether ether ketone) adhered to a support layer of hydrophilicitized microporous poly(ethylene) and the use of these membranes in the recovery of water from feed streams such as dairy feed streams.

BACKGROUND ART

It is well-known to use photografting to modify the surface of films, sheets and molded objects formed from polyolefins. For example, the publication of Tazuke and Kimura (1978) discloses photografting onto poly(propylene), poly(ethylene) and several other polymer films using benzophenone as a sensitizer. In this publication the choice of solvent and sensitizer was noted to be very important. The publication of Ang et al (1980) discloses an irradiation procedure where the sensitizer is dissolved in the hydrophilicitizing agent solution and can be used for the photosensitized copolymerization in high yields of styrene, 4-vinyl pyridine and methyl methacrylate to poly(propylene). Again, this publication notes that the reaction was found to be very specific to certain types of sensitizers.

The publication of Ogiwara et al (1981) discloses the photografting on poly(propylene) and low-density poly(ethylene) (LDPE) films on which sensitizers were coated beforehand. The sensitizers coated on films enabled vinyl hydrophilicitizing agents, such as methyl methacrylate, acrylic acid and methacrylic acid to graft easily with high yields. The hydrophilic hydrophilicitizing agents acrylic acid and methacrylic acid were conveniently grafted using them in aqueous solution in a liquid phase system. The publication of Allmer et al (1988) discloses the modification of surfaces of LDPE, high-density poly(ethylene) (HDPE) and polystyrene by grafting with acrylic acid. The grafting is performed in the vapor-phase and increased the wettability of the polymer. It was observed that acetone was able to initiate grafting and was found to promote and direct grafting to the surface. The publication of Allmer et al (1989) discloses the grafting of the surface of LDPE with glycidyl acrylate and glycidyl methacrylate by photoinitiation. Acetone and ethanol were used as solvents, with acetone yielding slightly more grafting at the surface.

The publications of Yao and Ranby (1990a, 1990b and 1990c) disclose inter alia a process for the continuous photoinitiated graft copolymerization of acrylamide and acrylic acid onto the surface of HDPE tape film. The process is performed under a nitrogen atmosphere using benzophenone as the photoinitiator. It was noted that pre-soaking was very important for efficient photographing within short irradiation times. The application of this pre-soaking photografting method to poly(ethylene terephthalate) (PET) was also disclosed. In this context acetone was found to be a somewhat better solvent than methylethyl ketone and methylpropyl ketone. When applied to a continuous process for the photochemically induced graft polymerization of acrylamide and acrylic acid of poly(propylene) (PP) fiber surface under a nitrogen atmosphere, optimal concentrations of hydrophilicitizing agent and initiator in the pre-soaking solution were determined.

The publications of Kubota and Hata (1990a and 1990b) disclose an investigation of the location of methacrylic acid chains introduced into poly(ethylene) film by liquid and vapor-phase photograftings and a comparative examination of the photografting behaviours of benzil, benzophenone and benzoin ethyl ether as sensitizers. In these latter studies poly(methacrylic acid) was grafted onto initiator-coated LDPE film.

The publication of Edge et al (1993) discloses the photochemical grafting of 2-hydroxyethyl methacrylate (HEMA) onto LDPE film. A solution phase method is used to produce a material with increased wettability. The publication of Singleton et al (1993) discloses a method of making a polymeric sheet wettable by aqueous solvents and useful as an electrode separator in an electrochemical device. The polymeric sheet is formed from fibers which comprise poly(propylene) alone and is distinguished from a membrane formed from a microporous polymer sheet. The publication of Zhang and Ranby (1993) discloses the photochemically induced graft copolymerisation of acrylamide onto the surface of PP film. Acetone was shown to be the best solvent among the three aliphatic ketones tested.

The publications of Yang and Ranby (1996a and 1996b) disclose factors affecting the photografting process, including the role of far UV radiation (200 to 300 nm). In these studies benzophenone was used as the photoinitiator and LDPE film as the substrate. Added water was shown to favour the photografting polymerisation of acrylic acid on the surface of polyolefins, but acetone was shown to have a negative effect due to the different solvation of poly(acrylic acid) (PAA).

The publication of Hirooka and Kawazu (1997) discloses alkaline separators prepared from unsaturated carboxylic acid grafted poly(ethylene)-poly(propylene) fiber sheets. Again, the sheets used as a substrate in these studies are distinguished from a membrane formed from a microporous polymer sheet.

The publication of Xu and Yang (2000) discloses a study on the mechanism of vapor-phase photografting of acrylic acid in LDPE. The publication of Shentu et al (2002) discloses a study of the factors, including the concentration of hydrophilicitizing agent, affecting photo-grafting on low-density LDPE. The publication of El Kholdi et al (2004) discloses a continuous process for the graft polymerisation of acrylic acid from hydrophilicitizing agent solutions in water onto LDPE. The publication of Bai et al (2011) discloses the preparation of a hot melt adhesive of grafted low-density poly(ethylene) (LDPE). The adhesive is prepared by surface UV photografting of acrylic acid onto the LDPE with benzophenone as the photoinitiator.

The publication of Choi et al (2001) states that graft polymerisation is considered as a general method for modifying the chemical and physical properties of polymer materials.

The publication of Choi (2002) discloses a method for producing an acrylic graft polymer on the surface of a polyolefin article comprising the steps of immersing the article in a solution of an initiator in a volatile solvent, allowing the solvent to evaporate, and then immersing the article in a solution of an acrylic hydrophilicitizing agent before subjecting the article to ultraviolet irradiation in air or an inert atmosphere. Acrylic acid is used as the acrylic hydrophilicitizing agent in each one of the Examples disclosed in the publication, although the use of equivalent amounts of methacrylic acid, acrylamide and other acrylic hydrophilicitizing agents is anticipated.

The publication of Choi (2004) discloses the use of "ethylenically unsaturated hydrophilicitizing agents" in graft polymerisation. These other hydrophilicitizing agents are disclosed as hydrophilicitizing agents that are polymerisable by addition polymerisation to a thermoplastic polymer and are hydrophilic as a consequence of containing carboxyl (—COOH), hydroxyl (—OH), sulfonyl ($SO_3$), sulfonic acid (—$SO_3H$) or carbonyl (—CO) groups. No experimental results concerning the chemical and physical properties of graft polymers prepared by a method using these other hydrophilicitizing agents is disclosed.

The publication of Choi (2005) discloses a non-woven sheet of polyolefin fibres where opposed surfaces of the sheet are hydrophilic as a consequence of an acrylic graft polymerisation. The properties of the sheet are asymmetric, the ion exchange coefficient of the two surfaces being different. The method used to prepare these asymmetric acrylic graft polymerised non-woven polyolefin sheets comprises the steps of immersing the substrates in a solution of benzophenone (a photoinitiator), drying and then immersing the substrate in a solution of acrylic acid prior to subjecting to ultraviolet (UV) irradiation. The irradiation may be performed when the surfaces are in contact with either air or an inert atmosphere.

The publication of Gao et al (2013) discloses a method of preparing a radiation cross-linked lithium-ion battery separator. In an example, a porous polyethylene membrane is immersed in a solution of benzophenone and triallyl cyanurate in dichloromethane. The immersed membrane is dried at room temperature before being immersed in a water bath at 30° C. and irradiated on both sides using a high-pressure mercury lamp for three minutes.

The objective of the majority of these prior art methods is to improve the adhesion, biocompatibility, printability or wettability of the surface of a substrate. These improvements to surface characteristics are to be distinguished from the use of UV-initiated polymerisation to modify the permeability of preformed microporous polyolefin substrates, such as the substrates described in the publications of Fisher et al (1991) and Gillberg-LaForce (1994).

It is well-known to prepare thin film composite membranes to modify the permeability of a preformed microporous polyolefin substrate. For example, the publication of Jones (1990) discloses a composite permselective membrane comprising an ultrathin semipermeable layer comprising a polybenzimidazole polymer in occluding contact with at least one surface of a microporous polymer support layer. The membranes are asserted to provide better combinations of flux and rejection rates in reverse osmosis processes than do conventional semipermeable membranes of polybenzimidazole polymer alone.

The publications of Callahan and Johnson (1990 and 1992) disclose a composite membrane having a microporous support which is coated with a UV curable polymer composition having a sufficiently high viscosity to prevent pore filling upon coating and curing.

The publication of Gillberg-LaForce and Gabriel (1991) discloses a pore modified microporous membrane which is made by a process of incorporating a polymerizable vinyl hydrophilicitizing agent within the pores of a microporous membrane followed by polymerization to secure the resulting polymer within the pores. The process is stated to be particularly suitable for modifying a hydrophobic microporous membrane with a hydrophilic polymer, as occurs for example when polyacrylic acid is secured into the pores of a polypropylene microporous membrane.

The publication of Cussler et al (1992) discloses a process for modifying the properties of a hydrophobic microporous membrane which includes the steps of treating a hydrophobic microporous membrane with a surfactant to render the membrane hydrophilic, permeating the membrane with a polyol, and crosslinking the polyol to yield a hydrophilic microporous membrane having pores filled with an aqueous gel. The modified membranes are asserted to be useful in carrying out chromatographic separations.

The publication of Donato and Phillips (1993) discloses a composite membrane having a microporous support which is coated with a polymer selected from the group consisting of polyethylene oxide, polyacrylic acid, poly(methyl methacrylate) and polyacrylamide wherein there is no pore filing of the microporous support. The publication of Donato (1994) discloses a composite membrane having a microporous support coated with an aqueous polyeurethane dispersion composition. The publication of Donato and Phillips (1994) discloses a composite membrane having a microporous support which is coated with a polymer composition and a contact adhesive layer applied to said polymer.

For the most part, the methods of preparing composite membranes disclosed in these publications use UV initiated polymerisation to form polymers in situ. Methods of adhering dissimilar preformed polymers to the surface of the microporous polyolefin substrates are less well known.

Sulfonated poly(ether ether ketone) membranes have greater hydrophilicity relative to membranes prepared from the parent polymer, but are subject to excessive swelling and dimensional instability when wetted. In the context of preparing membranes for use as separators in batteries and fuel cells crosslinking of sulfonated poly(ether ether ketone) has been pursued as a means of overcoming this deficiency. The publication of Hou et al (2012) reviews methods of crosslinking of sulfonated aromatic polymers that have been pursued in the context of developing PEMs. Many of these methods exploit the reactivity provided by the presence of the sulfonic acid group.

The publications of Mikhailenko et al (2004), Mikhailenko et al (2006), Deb et al (2007) and Hande et al (2008) disclose methods where a condensation reaction between the sulfonic acid of the sulfonated aromatic polymer and the hydroxyl group of an alcohol forms a sulfonic acid ester linkage. These methods effectively lower the degree of sulfonation (DS) of the substrate polymer. The publications of Mikhailenko et al (2004 and 2006) disclose polymer electrolyte membranes prepared from sulfonated poly(ether ether ketone) and simple polyols. Structural data indicated that under the conditions used simple polyols such as ethylene glycol and glycerol do not link the neighbouring main chains of the polymer via the sulfonic acid functions, but form an interpenetrating network of oligomers bonded to the sulfonyl ($SO_3$) group. As a major proportion of the sulfonic acid functions are not involved in this form of "cross-linking", membrane conductivities are only somewhat reduced.

The publication of Rhoden et al (2011) discloses a method of cross-linking a sulfonated poly(ether ether ketone) with a high degree of sulfonation using 1,4-benzene dimethanol. The method is a zinc chloride catalysed crosslinking that is stated to produce a high hydrophobic polymer backbone, whilst still maintaining high levels of polymer sulfonation. The method is distinguished from those disclosed in the publications of Mikhailenko et al (2004), Mikhailenko et al (2006), Deb et al (2007) and Hande et al (2008) in that the sulfonic acid group does not participate directly in the reaction resulting in the formation of the cross-link. The reaction is performed in an aqueous solution of SPEEK.

The publication of Di Vona et al (2008) discloses sulfonation in the preparation of proton-conducting hybrid polymers based on poly(ether ether ketone). The use of both sulfuric acid and chlorosulfonic acid as the sulfonating agent is disclosed.

The publication of Hande et al (2008) discloses the crosslinking of sulfonated poly(ether ether ketone) in the preparation of proton exchange membranes using 2,6-bis (hydroxymethyl)-4-methyl phenol and 1,4-bis(hydroxymethyl) benzene as the cross-linking agents. The crosslinking reaction was achieved by a thermally activated condensation reaction between the hydroxymethyl group of the cross-linking agent and the sulfonic acid group of the polymer.

The publication of Di Vona et al (2009) discloses thermally induced crosslinking of sulfonated poly(ether ether ketone) by the formation of $SO_2$ bridges between macromolecular chains. The publication also discloses the important role played by the casting solvent when seeking to improve the proton-exchange membranes used in fuel cells.

The publication of Ye et al (2009) discloses the use of benzoxazine or sulfonic acid containing benzoxazine as a crosslinking agent in the preparation of sulfonated poly (ether ether ketone) proton exchange membranes. The cast membranes are heated at 180° C. for three hours to complete the crosslinking.

The publication of Merle et al (2014) also discloses the preparation of crosslinked sulfonated poly(ether ether ketone) membranes where crosslinking was performed via the Friedel-Crafts route employing 1,4-benzene dimethanol as the cross-linking agent. High proton conductive membranes were obtained at increased temperatures.

In the context of preparing membranes for use as separators in batteries and fuel cells the objective is to prepare a membrane that permits the passage of ions whilst maintaining the separation of the two electrodes. By contrast, in the context of preparing membranes for use in processes driven by hydrostatic or osmotic pressure, the objective is to prepare a membrane that permits the passage of water whilst limiting the passage of solutes. In food processing the membrane is also required to be chemically resistant and durable.

Osmosis is generally seen as the movement of water from a solution of higher water chemical potential to one of lower water chemical potential. This movement, or flux, is moderated by a semi-permeable membrane, which allows the passage of water, but not the passage of the species whose presence lowers the chemical potential of water in the receiving solution. This fundamental thermodynamic property of solutions is an essential component of many biological processes (McCutcheon and Wang (2013)).

The first viable semi-permeable membrane was made in the 1960s from cellulose acetate and used in reverse osmosis (Loeb (1981)). The further development of thin film composite membranes followed with the introduction of the concept of interfacial polymerisation (Mogan (1965)). In a thin film composite membrane, each individual layer can be optimised for its particular function. The thin "barrier layer" can be optimised for the desired combination of solvent flux and solute rejection, while the porous "support layer" can be optimised for maximum strength and compression resistance combined with minimum resistance to permeate flow. Numerous reviews concerning the preparation and properties of composite membranes developed for use in reverse osmosis and nanofiltration are available (e.g. Petersen (1993)).

The desired properties of membranes used in water desalination, purification or recovery include high rejection of undesirable species, high filtration rate and good mechanical strength. Depending on the particular application on which the membrane is used other desired properties may also include resistance to fouling and chemical decomposition (McCutcheon and Wang (2013)). These latter properties are particularly desirable for membranes used in food processing applications such as dairy processing operations where periodic in situ cleaning and sterilisation ("clean-in-place" (CIP)) of the membrane is required.

It is an object of the present invention to provide a method of decreasing the hydrophobicity of preformed microporous poly(ethylene) sheets and thereby provide modified microporous poly(ethylene) sheets suitable for use in the preparation of water permeable asymmetric composite membranes comprising cross-linked poly(ether ether ketone) as the rejection layer. It is an object of the present invention to provide at least one method of preparing cross-linked poly(ether ether ketone) suitable for use as the rejection layer of a water permeable asymmetric composite membrane. It is an object of the present invention to provide a durable asymmetric composite membrane. It is an object of the present invention to provide a durable asymmetric composite membrane suitable for use in the recovery of water from dairy feed streams. These objects are to be read in the alternative.

STATEMENT OF INVENTION

In a first aspect the invention provides an asymmetric composite membrane comprising a first layer of cross-linked sulfonated poly(ether ether ketone) adhered to a second layer of hydrophilicitized microporous poly(ethylene).

Preferably, the thickness of the first layer is in the range 0.1 to 50 nM and the thickness of the second layer is in the range 5 to 200 μM. More preferably, the thickness of the first layer is in the range 1 to 5 nM and the thickness of the second layer is in the range 5 to 20 μM. Most preferably, the thickness of the first layer is 1 nM and the thickness of the second layer is 20 μM.

Preferably, the asymmetric composite membrane excludes a woven or non-woven fabric.

In a second aspect the invention provides a method of removing water from a feed stream comprising the step of exposing the first layer of the asymmetric composite membrane of the first aspect of the invention to the feed stream at a pressure and temperature sufficient to produce a permeate.

Preferably, the feed stream is a dairy product. More preferably, the feed stream is milk. Most preferably, the feed stream is skimmed milk.

Preferably, the pressure is in the range 10 to 50 Bar. More preferably, the pressure is in the range 20 to 40 Bar. Most preferably, the pressure is in the range 20 to 30 Bar.

Preferably, the temperature is in the range 2 to 98° C. More preferably, the temperature is in the range 4 to 40° C. Most preferably, the temperature is in the range 4 to 20° C.

In a third aspect the invention provides a method of preparing a cross-linked sulfonated poly(ether ether ketone) comprising the step of incubating in the presence of a Friedel-Crafts type catalyst a mixture of a chlorosulfonated poly(ether ether ketone) and a $C_{2-6}$-dioic cross-linking agent solvated in a non-aqueous reactive solvent at a temperature substantially below 120° C. for a time sufficient to provide the cross-linked sulfonated poly(ether ether ketone).

Preferably, the Friedel-Crafts type catalyst is ferric chloride ($FeCl_3$).

Preferably, the $C_{2-6}$-dioic cross-linking agent is selected from the group consisting of: ethanedioic acid (oxalic acid; CAS Registry no. 144-62-7), 2-hydroxypropanedioic acid (CAS Registry no. 80-69-3); 2,3-dihydroxybutanedioic acid and 2-hydroxy-1,2,3-propanetricarboxylic acid (citric acid; CAS Registry no. 77-92-9). More preferably, the $C_{2-6}$-dioic cross-linking agent is selected from the group consisting of: ethanedioic acid (oxalic acid; CAS Registry no. 144-62-7); (2R,3R)-2,3-dihydroxybutanedioic acid (tartaric acid; CAS Registry no. 87-69-4) and 2-hydroxy-1,2,3-propanetricarboxylic acid (citric acid; CAS Registry no. 77-92-9).

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Where the non-aqueous reactive solvent is acetone/methanol the ratio (v/v) of acetone to methanol is in the range 1:1.5 to 1:5. The inclusion of dimethylsulfoxide (DMSO) as a component of the non-aqueous reactive solvent is optional. The exclusion of amines (e.g. ethylamine) as components of the non-aqueous reactive solvent is required.

Preferably, the molar ratio of chlorosulfonated poly(ether ether ketone) to $C_{2-6}$-dioic cross-linking agent is in the range 1 to 3. More preferably, the molar ratio of chlorosulfonated poly(ether ether ketone) to polyhydric alcohol is 2.

Preferably, the molar ratio of chlorosulfonated poly(ether ether ketone) to Friedel-Crafts type catalyst is in the range 10 to 30. More preferably, the molar ratio of chlorosulfonated poly(ether ether ketone) to chloride catalyst is 20.

Preferably, the ratio of the weight (g) of chlorosulfonated poly(ether ether ketone) to the volume (mL) of non-aqueous reactive solvent in the mixture is in the range 0.07 to 0.11. More preferably, the ratio of the weight (g) of chlorosulfonated poly(ether ether ketone) to the volume (mL) of non-aqueous reactive solvent in the mixture is in the range 0.08 to 0.10. Most preferably, the ratio of the weight (g) of chlorosulfonated poly(ether ether ketone) to the volume (mL) of non-aqueous reactive solvent in the mixture is 0.09.

Preferably, the temperature is in the range 60° C. to 110° C. More preferably, the temperature is in the range 80° C. to 90° C. Most preferably, the temperature is 85° C.

In a preferred embodiment of the third aspect the invention provides a method of preparing a film of a cross-linked sulfonated poly(ether ether ketone) comprising the steps of:
1. incubating in the presence of Friedel-Crafts type catalyst a mixture of a chlorosulfonated poly(ether ether ketone) and a $C_{2-6}$-dioic cross-linking agent solvated in a non-aqueous reactive solvent at a temperature of 80 to 90° C. for one and a half to two and a half hours; and then
2. casting the cooled mixture onto a plate and curing at a temperature of 80 to 90° C. for two to three hours to provide the film.

Preferably, the Friedel-Crafts type catalyst is ferric chloride ($FeCl_3$).

Preferably, the $C_{2-6}$-dioic cross-linking agent is selected from the group consisting of: ethanedioic acid (oxalic acid; CAS Registry no. 144-62-7), 2-hydroxypropanedioic acid (CAS Registry no. 80-69-3); 2,3-dihydroxybutanedioic acid and 2-hydroxy-1,2,3-propanetricarboxylic acid (citric acid; CAS Registry no. 77-92-9). More preferably, the $C_{2-6}$-dioic cross-linking agent is selected from the group consisting of: ethanedioic acid (oxalic acid; CAS Registry no. 144-62-7); (2R,3R)-2,3-dihydroxybutanedioic acid (tartaric acid; CAS Registry no. 87-69-4) and 2-hydroxy-1,2,3-propanetricarboxylic acid (citric acid; CAS Registry no. 77-92-9).

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Preferably, the molar ratio of chlorosulfonated poly(ether ether ketone) to $C_{2-6}$-dioic cross-linking agent is in the range 1 to 3. More preferably, the molar ratio of chlorosulfonated poly(ether ether ketone) to polyhydric alcohol is 2.

Preferably, the molar ratio of chlorosulfonated poly(ether ether ketone) to Friedel-Crafts type catalyst is in the range 10 to 30. More preferably, the molar ratio of chlorosulfonated poly(ether ether ketone) to chloride catalyst is 20.

Preferably, the ratio of the weight (g) of chlorosulfonated poly(ether ether ketone) to the volume (mL) of non-aqueous reactive solvent in the mixture is in the range 0.07 to 0.11. More preferably, the ratio of the weight (g) of chlorosulfonated poly(ether ether ketone) to the volume (mL) of non-aqueous reactive solvent in the mixture is in the range 0.08 to 0.10. Most preferably, the ratio of the weight (g) of chlorosulfonated poly(ether ether ketone) to the volume (mL) of non-aqueous reactive solvent in the mixture is 0.09.

In a fourth aspect the invention provides a cross-linked sulfonated poly(ether ether ketone) comprising the structure:

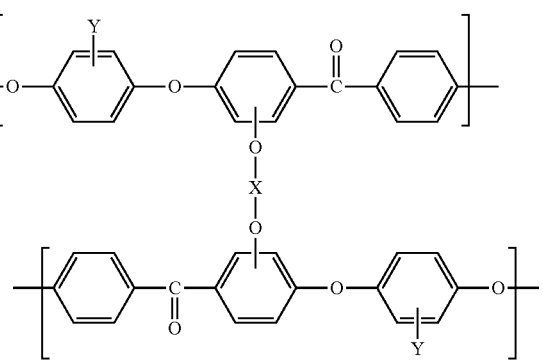

where X is a divalent radical of the structure:

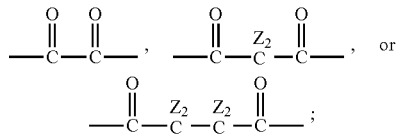

Y may be either H or a monovalent radical selected from the group consisting of: —SO$_3$H and —SO$_2$Cl; and Z are monovalent radicals selected independently from the group consisting of: H, —OH and —COOH.

Preferably, the invention provides a cross-linked sulfonated poly(ether ether ketone) comprising the structure:

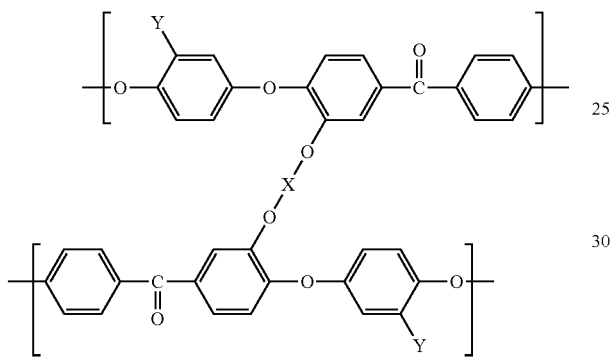

In a first embodiment of the fourth aspect the invention provides a cross-linked sulfonated poly(ether ether ketone) comprising the structure:

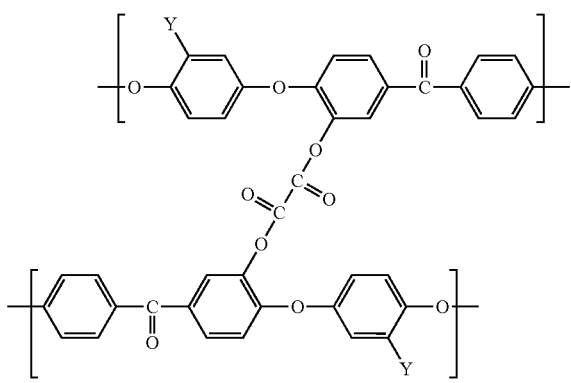

In a second embodiment of the fourth aspect the invention provides a cross-linked sulfonated poly(ether ether ketone) comprising the structure:

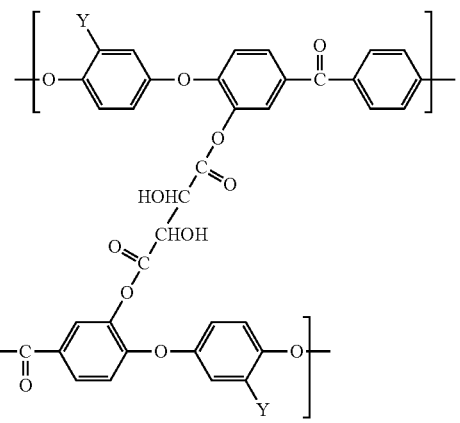

In a third embodiment of the fourth aspect the invention provides a cross-linked sulfonated poly(ether ether ketone) comprising the structure:

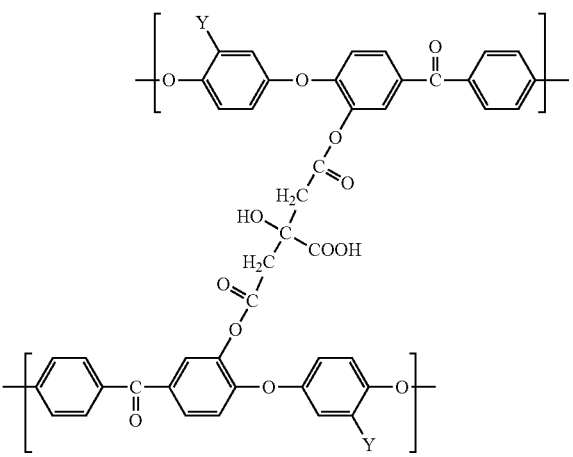

A cross-linked sulfonated poly(ether ether ketone) of the fourth aspect of the invention may be prepared by the method of the third aspect of the invention and each may be prepared as a film.

In a fifth aspect the invention provides a method of preparing a cross-linked sulfonated poly(ether ether ketone) comprising the step of incubating in the presence of a Friedel-Crafts type catalyst a mixture of a chlorosulfonated poly(ether ether ketone) and a C$_{2-9}$-dioyl halide cross-linking agent solvated in a non-aqueous reactive solvent at a temperature substantially below 180° C. for a period of time sufficient to provide the cross-linked sulfonated poly (ether ether ketone).

Preferably, the Friedel-Crafts type catalyst is ferric chloride (FeCl$_3$).

Preferably, the C$_{2-9}$-dioyl halide is a C$_{2-9}$-dioyl chloride such as 1,3,5-benzenetricarbonyl trichloride (trimesoyl trichloride; CAS Registry no. 4422-95-1) or butanedioyl dichloride (succinyl chloride; CAS Registry no. 543-20-4). More preferably, the C$_{2-9}$-dioyl halide is an aliphatic C$_{2-6}$-dioyl chloride. Yet more preferably, the C$_{2-9}$-dioyl halide is an acyclic, aliphatic C$_{2-6}$-dioyl chloride. Most preferably, the C$_{2-9}$-dioyl halide is butanedioyl dichloride.

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Preferably, the molar ratio of chlorosulfonated poly(ether ether ketone) to $C_{2-9}$-dioyl halide cross-linking agent is in the range 1 to 3. More preferably, the molar ratio of chlorosulfonated poly(ether ether ketone) to $C_{2-9}$-dioyl halide cross-linking agent is 2.

Preferably, the molar ratio of chlorosulfonated poly(ether ether ketone) to Friedel-Crafts type catalyst is in the range 5 to 15. More preferably, the molar ratio of chlorosulfonated poly(ether ether ketone) to Friedel-Crafts type catalyst is 10.

Preferably, the temperature is substantially below 180° C. More preferably, the temperature is in the range 120° C. to 170° C. Most preferably, the temperature is 150° C.

Preferably, the period of time is 15 to 105 minutes. More preferably, the period of time is 30 minutes.

In an embodiment of the fifth aspect the invention provides a method of preparing a film of a cross-linked sulfonated poly(ether ether ketone) comprising the steps of casting a mixture of a chlorosulfonated poly(ether ether ketone), a $C_{2-9}$-dioyl halide cross-linking agent and a Friedel-Crafts type catalyst solvated in a non-aqueous reactive solvent and curing at a temperature substantially below 180° C. for a period of 15 to 105 minutes to provide the film. Preferably, the Friedel-Crafts type catalyst is ferric chloride ($FeCl_3$), the $C_{2-9}$-dioyl halide cross-linking agent is butanedioyl dichloride, the non-aqueous reactive solvent is cyclopentanone and the curing is at 150° C. for 30 minutes.

In a sixth aspect the invention provides a cross-linked sulfonated poly(ether ether ketone) prepared by the method of the fifth aspect of the invention. A cross-linked sulfonated poly(ether ether ketone) of the second aspect of the invention may be prepared as a film.

In a seventh aspect the invention provides a method of preparing an asymmetric composite membrane consisting of a film of crosslinked sulfonated poly(ether ether ketone) adhered to a sheet of hydrophilicitized microporous polyolefin comprising the steps:

1. Contacting one side of a sheet of microporous polyolefin with a dispersion in an organic solvent of a photoinitiator, a sulfonated poly(ether ether ketone), at least one cross-linking agent and at least one hydrophilicitizing agent, to provide a coated sheet;
2. Irradiating the one side of the coated sheet at an intensity and a wavelength for a time sufficient to adhere the film to the sheet; and then
3. Drying and then washing the coated sheet to provide the asymmetric composite membrane.

Preferably, the polyolefin is poly(ethylene).

Preferably, the organic solvent is DMAc or DMSO. More preferably, the organic solvent is DMSO.

Preferably, the photoinitiator is benzophenone.

Preferably, the at least one cross-linking agent is divinylbenzene.

Preferably, the hydrophilicitizing agent is 4-ethenyl-benzenesulfonic acid. More preferably, the hydrophilicitizing agent is 4-ethenyl-benzenesulfonic acid as its sodium salt (SSS).

Preferably, the drying the coated sheet is at a temperature of 60 to 70° C. for a period of time of 20 to 50 minutes. More preferably, the drying the coated sheet is at a temperature of 65° C. for a period of time of 30 to 45 minutes.

Preferably, the washing the coated sheet is at a temperature of 45 to 55° C. in deionised water.

In an eighth aspect the invention provides a method of preparing an asymmetric composite membrane comprising the steps:

1. Irradiating a dispersion comprising sulfonated poly(ether ether ketone) and at least one cross-linking agent in an organic solvent to provide a partially cross-linked dispersion of sulfonated poly(ether ether ketone);
2. Contacting one side of a sheet of wetted microporous polyolefin with the dispersion of partially cross-linked sulfonated poly(ether ether ketone);
3. Irradiating the one side of the coated sheet at a wave length and an intensity for a time sufficient to adhere the cross-linked sulfonated poly(ether ether ketone) to the sheet of microporous polyolefin to provide a composite; and then
4. Drying the composite at a temperature and time sufficient to provide the asymmetric composite membrane, where the sheet of wetted microporous polyolefin is wetted with a solution of a hydrophilicitizing agent in an aqueous solvent.

Preferably, the aqueous solvent is 40 to 60% (v/v) acetone in water.

Preferably, the hydrophilicitizing agent is 4-ethenyl-benzenesulfonic acid.

Preferably, the hydrophilic microporous polyolefin is a graft polymer. More preferably, the side chains of the graft polymer are derived from one or more of 2-acrylamido-1-methyl-2-propanesulfonic acid, 2-propen-1-ol, 2-propenoic acid, 2-hydroxyethyl 2-methyl-2-propenoic acid ester and 4-ethenyl-benzenesulfonic acid. Yet more preferably, the side chains of the graft polymer are derived from either or both of 2-acrylamido-1-methyl-2-propanesulfonic acid and 4-ethenyl-benzenesulfonic acid. Most preferably, the side chains of the graft polymer are derived from 4-ethenyl-benzenesulfonic acid.

Preferably, the organic solvent is dimethylacetamide.

Preferably, the cross-linking agent is a di-, tri- or tetraethenyl compound with a molecular weight less than 260. More preferably, the cross-linking agent is a di- or tetraethenyl compound selected from the group consisting of: divinylbenzene, ethylene glycol dimethacrylate and glyoxal bis(diallyl acetal). Most preferably, the cross-linking agent is p-divinylbenzene.

Preferably, the ratio of cross-linking agent to sulfonated poly(ether ether ketone) is in the range 1:3 to 1:7. More preferably, the ratio of cross-linking agent to sulfonated poly(ether ether ketone) is in the range 1:4 to 1:6.

Preferably, the dispersion additionally includes at least one hydrophilicitizing agent. More preferably, the at least one hydrophilicitizing agent is 2-acrylamido-1-methyl-2-propanesulfonic acid, 4-ethenyl-benzenesulfonic acid, or a salt thereof. Most preferably, the at least one hydrophilicitizing agent is 4-ethenyl-benzenesulfonic acid.

Preferably, the dispersion comprises a photoinitiator. Most preferably, the photoinitiator is benzophenone.

Preferably, the concentration of photoinitiator is greater than 2% (w/w). More preferably, the concentration of photoinitiator is greater than 4% (w/w).

Preferably, the irradiating is at wavelengths less than 350 nm and at an intensity equivalent to 0.1 mW m$^{-1}$ at a distance of 50 mm.

Preferably, the irradiating is for a time of 60 to 120 seconds. More preferably, the irradiating is for a time of 80 to 100 seconds In a ninth aspect the invention provides an asymmetric composite membrane consisting essentially of a film of cross-linked sulfonated poly(ether ether ketone) adhered to a sheet of hydrophilicitized microporous polyolefin.

Preferably, the film of cross-linked sulfonated poly(ether ether ketone) is an interpenetrating film of cross-linked sulfonated poly(ether ether ketone).

In a tenth aspect the invention provides a method of removing water from a feed stream comprising the step of contacting the asymmetric composite membrane of the ninth aspect of the invention with the feed stream at a pressure and temperature sufficient to produce permeate.

Preferably, the feed stream is a dairy product. More preferably, the feed stream is milk. Most preferably, the feed stream is whole milk.

Preferably, the pressure is in the range 0 to 40 bar. More preferably, the pressure is in the range 15 to 35 bar. Most preferably, the pressure is 20±2.5 bar.

Preferably, the temperature is in the range 2 to 98° C. More preferably, the temperature is in the range 4 to 40° C. Most preferably, the temperature is in the range 4 to 20° C.

In an eleventh aspect the invention provides a method of preparing a hydrophilic microporous polyolefin substrate comprising the steps of:
1. Contacting a microporous polyolefin substrate with a solution of a hydrophilicitizing agent and a photoinitiator;
2. irradiating the contacted substrate at an intensity and wavelength and for a time sufficient to provide a graft polymer; and then
3. Removing non-grafted polymerised hydrophilicitizing agent.

Preferably, the contacting is under an atmosphere of air.

Preferably, the microporous polyolefin substrate is a sheet of microporous polyolefin. More preferably, the polyolefin is selected from the group consisting of: polyethylene, polypropylene, polybutylene and polymethylpentene. Most preferably, the polyolefin is polyethylene.

Preferably, the microporous polyethylene substrate is prepared according to a method disclosed in the publications of Fisher et al (1991) and Gillberg-LaForce (1994).

Preferably, the solution is a solution in 40 to 60% (v/v) acetone in water. More preferably, the solution is a solution in 50% (v/v) acetone in water.

Preferably, the photoinitiator is selected from the group consisting of: aceto-phenone, anthraquinone, benzoin, benzoin ether, benzoin ethyl ether, benzil, benzil ketal, benzophenone, benzoyl peroxide, n-butyl phenyl ketone, iso-butyl phenyl ketone, fluorenone, propiophenone, n-propyl phenyl ketone and iso-propyl phenyl ketone. Most preferably, the photoinitiator is benzophenone.

Preferably, the irradiating is at wavelengths less than 350 nm.

Preferably, the irradiating is at an intensity sufficient for a time no greater than 5 minutes. More preferably, the irradiating is at an intensity sufficient for a time no greater than 2 minutes.

Preferably, the removing non-grafted polymer is by washing in water. More preferably, the removing non-grafted polymer is by washing in water at a temperature of 40 to 50° C.

In the description and claims of this specification the following abbreviations, acronyms, phrases and terms have the meaning provided: "alicyclic" means cyclic aliphatic; "aliphatic" means alkanes, alkenes or alkynes or their derivatives and is used as a descriptor for compounds that do not have the special stability of aromatics; "alkanes" means a saturated hydrocarbon of the general formula $C_nH_{2n+2}$; "alkenes" means unsaturated hydrocarbons that contain one or more double carbon-carbon bonds; "alkynes" means unsaturated hydrocarbons that contain one or more triple carbon-carbon bonds; "aromatic" means containing a benzene ring or having similar chemical properties; "bursting strength" means the maximum uniformly distributed pressure applied at right angles to its surface, that a single sample location can withstand under test conditions; "$C_{2-6}$-dicarboxylic" means a non-aromatic organic acid comprising two or more carboxylic acid functional groups; "carbonic solvent" means a component of the solvent composition comprises a carbonic (aldonic or ketonic) function; "comprising" means "including", "containing" or "characterized by" and does not exclude any additional element, ingredient or step; "consisting essentially of" means excluding any element, ingredient or step that is a material limitation; "consisting of" means excluding any element, ingredient or step not specified except for impurities and other incidentals; "copolymer" means a polymer formed by the polymerization of two or more monomers; "crosslinking" means the formation of a three-dimensional polymer network by covalent bonding between the main chains of the polymer; "crosslinking agents" means materials that are incorporated into the crosslinking bridge of a polymer network; "csPEEK" means chlorosulfonated PEEK; "degree of sulfonation" means the ratio of moles of sulfonated structural repeating units to total moles of structural repeating units expressed as a percentage; "dioyl halide" means a dicarboxylic acid halide of the general structure XOC—R—COX where X is a halogen and R may be either aliphatic or aromatic and includes a trioyl halide; "DMAc" means dimethylacetamide; "DMSO" means dimethylsulfoxide; "DS" means degree of sulfonation being the number of sulfonated units per 100 monomer units expressed as a percentage; "durable" means capable of maintaining performance during repeated clean-in-place (CIP) protocols; "DXL" means degree of crosslinking being the number of crosslinks per 100 monomer units expressed as a percentage; "ethenyl" means having a terminal ethylene function (vinyl); "flow" means the rate at which a feed stream is introduced; "flux" means the rate of permeate transported per unit of membrane area; "gfd" means gallons per square foot per day; "graft polymer" means a polymer in which the linear main chain has attached to it at various points macromolecular side chains of a structure different from the main chain; "homopolymer" means a polymer formed by the polymerization of a single monomer; "hydrophilic" means having a tendency to mix with, dissolve in, or be wetted by water and "hydrophilicity", "hydrophilicitized" and "hydrophilicitizing" have a corresponding meaning; "hydrophilicitizing agents" means materials that are incorporated into a polymer network to impart hydrophilic properties; "hydrophobic" means having a tendency to repel or fail to mix with water and "hydrophobicity" has a corresponding meaning; "interpenetrating" means a comingling of two polymer networks; "ionomer" means a polymer that comprises both electrically neutral structurally repeating units and a fraction of ionized structurally repeating units (usually no more than 15 mole percent); "ketonic solvent" means a component of the solvent composition comprises a ketonic function; "LMH" means litres per square metre per hour; "microporous" means consisting of an essentially continuous matrix structure containing substantially uniform small pores or channels distributed uniformly throughout the body of the substrate and specifically excludes a discontinuous matrix of woven or non-woven fibres; "non-aqueous" means initially excluding water; "passage" means the percentage of dissolved species in the feed stream allowed to pass through the membrane; "PEEK" means poly(oxy-1,4- phenyleneoxy-1,4-phenylenecarbonyl-1,4-phenylene); "permeate" means the at least partially purified product water; "photoinitiator" means a photolabile compound which upon irradiation forms a radical; "polyelectrolyte" means a polymer that comprises structurally repeating units bearing an electrolyte group that will dissociate in aqueous solutions making the polymer charged; "polymer blend" means a homogenous or heterogeneous physical mixture of two or more polymers; "polyol" means an acyclic alcohol containing three or more hydroxyl functional groups including the triol glycerol (glycerine); "post-treated polymer" means a polymer that is modified, either partially or completely, after the basic polymer backbone has been formed; "preformed" means formed beforehand, i.e. prior to treatment; "reactive solvent" means a solvent capable of abstracting chloride or a chlorine radical from a chlorosulfonated polymer, e.g. csPEEK; "recovery" means the percentage of the feed stream that emerges from the system as product water or "permeate"; "rejection" means the percentage of solids concentration removed from the feed stream by the membrane; "solvated" means associated or combined with molecules of a solvent and includes in solution; "sPEEK" means sulfonated PEEK and includes csPEEK; "structural repeating unit" means a smallest structural unit that repeats in the polymer backbone, e.g. oxy-1,4-phenyleneoxy-1,4-phenylenecarbonyl-1,4-phenylene is the structural repeating unit of PEEK; "tensile strength" means the maximum tensile stress sustained by a specimen at the yield point (tensile strength at yield) or at break (tensile strength at break) during a tension test; "trioyl halide" means a tricarboxylic acid halide of the general structure $R(COX)_3$ where X is a halogen and R may be either aliphatic or aromatic and "xsPEEK" means cross-linked sulfonated PEEK (sPEEK) and includes cross-linked chlorosulfonated PEEK (csPEEK); "UVA" means electromagnetic radiation having wavelengths between 320 and 400 nm; "UVB" means electromagnetic radiation having wavelengths between 290 and 320 nm and "UVC" means electromagnetic radiation having wavelengths between 200 and 290 nm.

The phrase "rejection layer" is used synonymously with the phrase "barrier layer" and the phrase "backing layer" is used synonymously with the phrase "support layer". The term "film" is generally used when referring to the rejection layer of the asymmetric composite membrane and the term "sheet" is generally used when referring to the backing layer of the asymmetric composite membrane. Any reference to a "preformed microporous substrate" specifically excludes a preformed post-treated polymer.

In the absence of further limitation, the use of plain bonds in the representations of the structures of compounds encompasses the diastereoisomers, enantiomers and mixtures thereof of the compounds.

The use of double bonds in the representations of aromatic ring structures does not exclude delocalisation of the π-electrons and encompasses alternative representations of the same aromatic ring structures.

Where a substituted aromatic ring is represented:

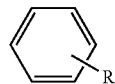

it will be recognised that the ring may be substituted by the monovalent radical R at any available locus (node) of the ring.

Although the sulfonic acid function of SPEEK is frequently represented as being located exclusively at the ortho or meta position on the substituted ring it is recognised that unless the sulfonated derivative of the poly(ether ether ketone) substrate has been fully characterised the sulfonic acid function could potentially be located at either location.

The terms "first", "second", "third", etc. used with reference to elements, features or integers of the subject matter defined in the Statement of Invention and Claims, or when used with reference to alternative embodiments or options for practising the invention are not intended to imply an order of preference.

Where concentrations or ratios of reagents or solvents are specified, the concentration or ratio specified is the initial concentration or ratio of the reagents or solvents. Where values are expressed to one or more decimal places standard rounding applies. For example, 1.7 encompasses the range 1.650 recurring to 1.749 recurring.

The invention will now be described with reference to embodiments or examples and the figures of the accompanying drawings pages.

DETAILED DESCRIPTION

Figure 1:
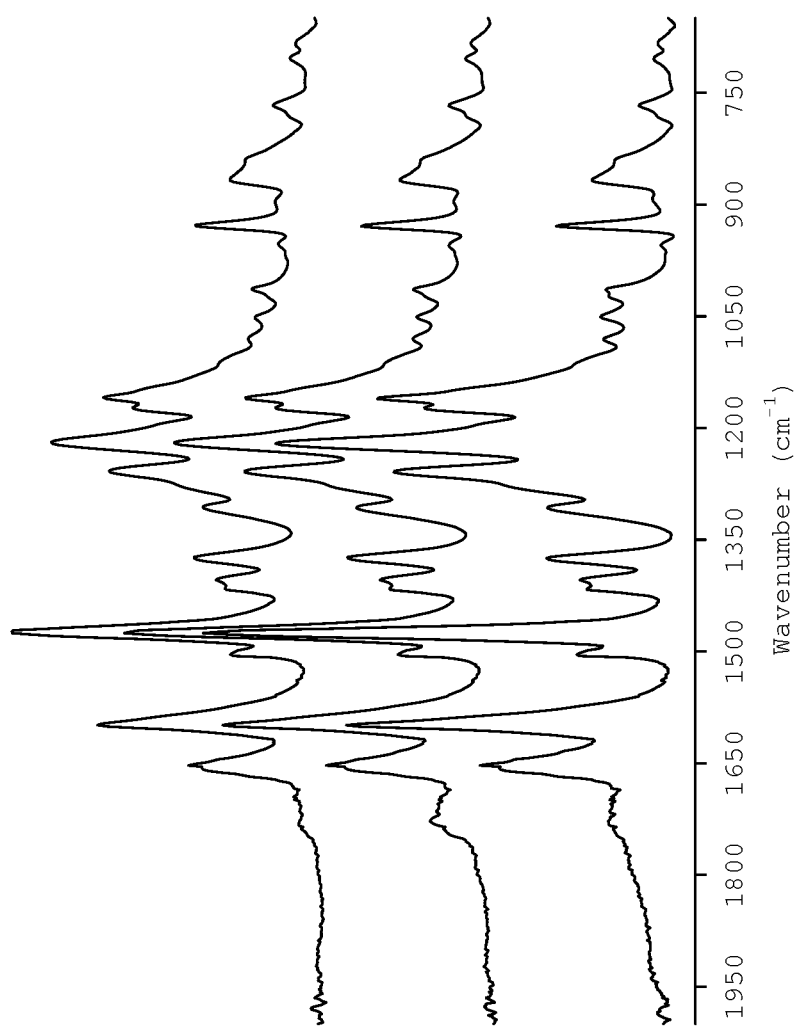
FIG. 1. Comparison of FTIR spectra recorded for samples of cross-linked sulfonated PEEK: 150SClPEEK30 (upper trace), 150SClPEEK15 (middle trace) and control sample (lower trace). The scale of the vertical axis (absorbance; not shown) is the same for each trace.
Figure 2:
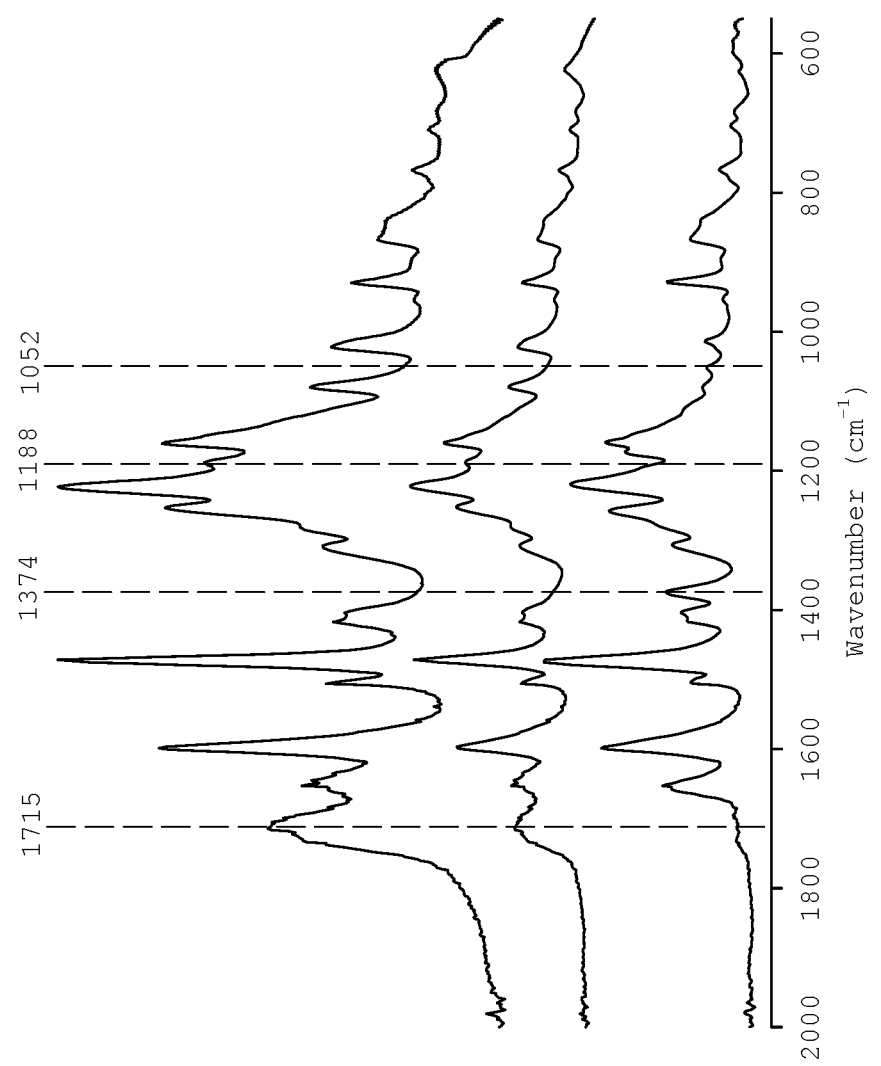
FIG. 2. Comparison of FTIR spectra recorded (2000 to 550 cm$^{-1}$) for selected samples of cross-linked sulfonated PEEK: 150SClPEEK302X (upper trace), 150SCl30 (middle trace) and 150SClPEEK30 (lower trace). The scale of the vertical axis (absorbance; not shown) is the same for each trace.
Figure 3:
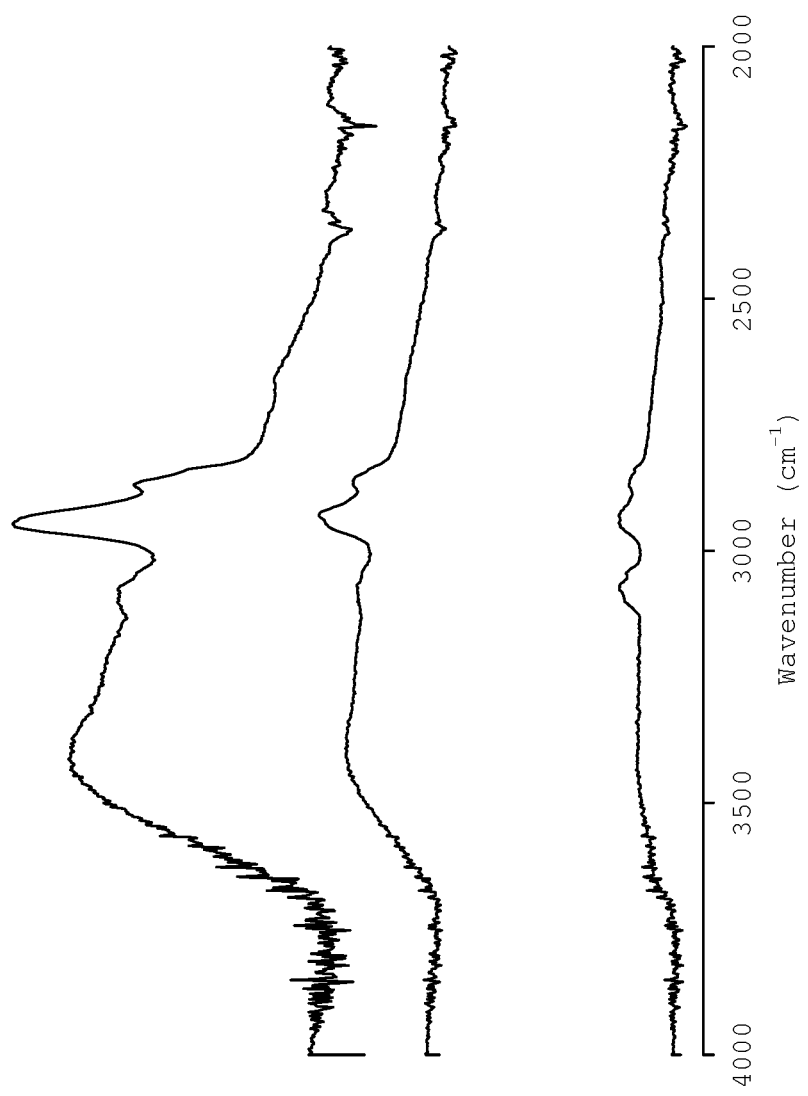
FIG. 3. Comparison of FTIR spectra recorded (4000 to 2000 cm$^{-1}$) for selected samples of cross-linked sulfonated PEEK: 150SClPEEK302X (upper trace), 150SCl30 (middle trace) and 150SClPEEK30 (lower trace). The scale of the vertical axis (absorbance; not shown) is the same for each trace.
Figure 4:
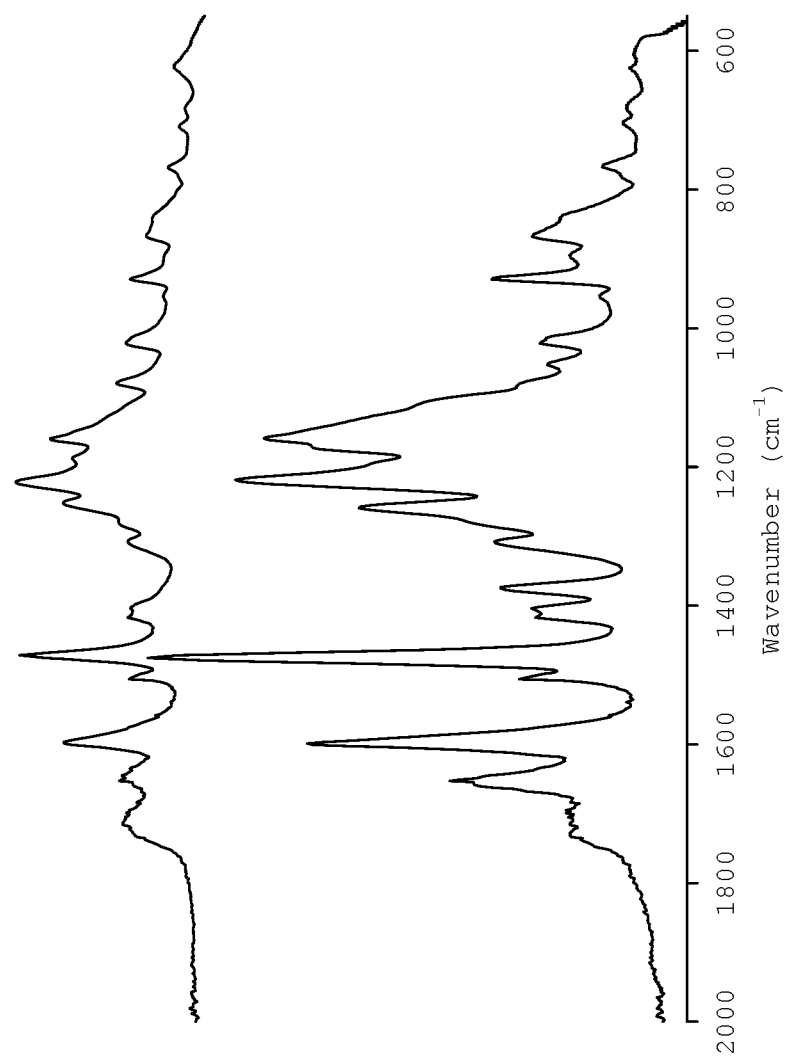
FIG. 4. Comparison of FTIR spectra recorded (2000 to 550 cm$^{-1}$) for samples of cross-linked sulfonated PEEK prepared by casting the same mixture (including the cross-linking agent succinyl chloride) and curing at 150° C. for 30 min or 15 min: 150SCl30 (upper trace) and 150SCl15 (lower trace). The scale of the vertical axis (absorbance; not shown) is the same for each trace.
Figure 5:
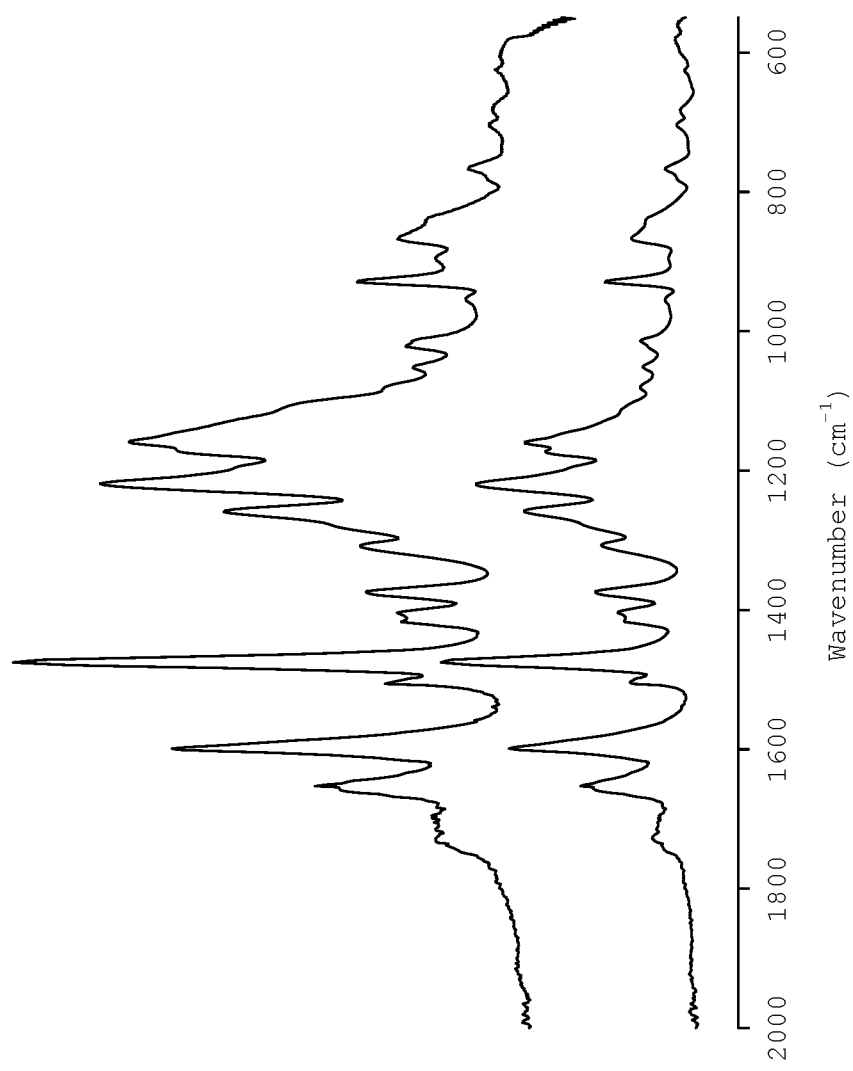
FIG. 5. Comparison of FTIR spectra recorded (2000 to 550 cm$^{-1}$) for samples of cross-linked sulfonated PEEK prepared by casting mixtures with and without the inclusion of the crosslinking agent succinyl chloride and curing at 150° C. for 15 min: 150SCl30 (upper trace) and 50SCl15 (lower trace). The scale of the vertical axis (absorbance; not shown) is the same for each trace.

The invention provides an asymmetric composite membrane in which a film of sulfonated poly(ether ether ketone) (sPEEK) is adhered to one side of a sheet of hydrophilicitized microporous poly(ethylene) (μPE). Various options for crosslinking sPEEK are available. In a first option a Friedel- Crafts type reaction may be utilised. In a second option photoinitiated grafting of the crosslinking agents may be utilised. Similarly, various options for hydrophilicitizing a preformed µPE are available. In a first option direct sulfonation may be utilised. In a second option photoinitiated grafting with a hydrophilicitizing agent may be utilised. For the industrial manufacture of the asymmetric composite membrane the options utilising photoinitiated grafting are anticipated to be of greatest utility.

Example A

In a first option, chlorosulfonated poly(ether ether ketone) is used as the substrate for cross-linking, specifically csPEEK. It is desirable to retain the degree of hydrophilicity imparted to the PEEK substrate by chlorosulfonation when crosslinking for the purpose of preparing a polymer for use in the fabrication of membranes for use in processes driven by hydrostatic or osmotic pressure. When crosslinking via the introduced chlorosulfonyl groups the degree of hydrophilicity may be reduced. Crosslinking of the csPEEK substrate via a Friedel-Crafts type reaction promotes maintenance of the desired degree of hydrophilicity. Furthermore, curing at temperatures substantially below those known to promote thermally induced crosslinking between chlorosulfony/sulfonyl groups favours the DXL being attributable to participation of the cross-linking agent in the crosslinking reaction. Curing at lower temperatures also reduces the likelihood of thermal degradation of the substrate polymer.

The microstructure of the polymer network formed by cross-linking will also be influenced by the structure of the cross-linking agent selected for use.

The combination of a film of cross-linked sulfonated poly(ether ether ketone) rejection layer adhered to a sheet of sulfonated microporous polyethylene backing layer provide an asymmetric composite membrane with the advantage of resistance to chemical decomposition and hence durability in commercial processing operations. In addition, the asymmetric composite membrane is tolerant of desiccation facilitating storage and transport.

Preparation of Sulfonated Microporous Poly(Ethylene) ("Support Layer")

A sheet of sulfonated microporous poly(ethylene) was prepared substantially as described in the publication of Briggs (2015). An amount of 250 g of phosphorous pentoxide was added to a volume of 469 mL of sulfuric acid to provide a mixture of 1:5 (mol/mol) phosphorous pentoxide-sulfuric acid and heated to 90° C. to dissolve the phosphorous pentoxide ("sulfonating agent").

Example 1

Sheets of microporous poly(ethylene) were cut in to 15×20 cm pieces and wetted with a mixture of DMSO-trichloromethane (9:1 (v/v)). Excess of the mixture was removed from the pieces before they were frozen by covering them in liquid nitrogen. Immediately after freezing the pieces were added to the sulfonating agent at room temperature and incubated at 80° C. for 90 minutes. The incubated pieces were removed from the sulfonating agent and allowed to sit for 3 hours in order to dilute the acid before rinsing twice with methanol to remove all residual sulfonating agent.

Example 2

Sheets of microporous poly(ethylene) were cut in to 14×28 cm pieces and whetted with a mixture of 20% chloroform and 8% dimethyl sulfoxide (DMSO) before being placed between glass fibre sheets and keeping on dry ice overnight. The sheets were then immersed in the sulfonating agent before being covered and cured in an oven at 85° C. for 90 minutes. Following curing the glass fibre sheets were removed and the sulfonated microporous poly(ethylene) sheet humidified overnight. The sheet was then rinsed with methanol and stored dry before use as a backing layer.

Preparation of Cross-Linked Sulfonated PEEK ("Rejection Layer")

Example 3

Solutions of dry chlorosulfonated poly(ether ether ketone), the cross-linking agent ethanedioic acid (oxalic acid), and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); 0.769 g of ethanedioic acid (oxalic acid) was dissolved in 25 mL of cyclopentanone (solution 2); and 0.138 g of ferric chloride ($FeCl_3$) was dissolved in 25 mL of cyclopentanone (solution 3). A 3 mL volume of solution 2 was added to a 6 mL volume of solution 1 and the two solutions mixed thoroughly. A 3 mL volume of solution 3 was then added and the combined solutions mixed to provide a cross-linking solution. The molar ratio of chlorosulfonated poly(ether ether ketone) to ethanedioic acid (oxalic acid) was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate. The film was cast under ambient conditions and left for two to five minutes before being cured at 85° C. for 2.5 hours. During curing the upper surface of the film was protected with a second glass plate located approximately 1 cm above the surface.

Example 4

Solutions of dry chlorosulfonated poly(ether ether ketone), the cross-linking agent tartaric acid, and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); and 1.281 g of tartaric acid and 0.138 g of ferric chloride ($FeCl_3$) were dissolved in 25 mL of cyclopentanone (solution 2). A 3 mL volume of cyclopentanone was added to a 6 mL volume of solution 1 and mixed thoroughly. A 3 mL volume of solution 2 was then added and the combined solutions mixed to provide a cross-linking solution. The molar ratio of chlorosulfonated poly(ether ether ketone) to tartaric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate. The film was cast under ambient conditions and left for two to five minutes before being cured at 85° C. for 2.5 hours. During curing the upper surface of the film was protected with a second glass plate located approximately 1 cm above the surface.

Example 5

Solutions of dry chlorosulfonated poly(ether ether ketone), the cross-linking agent citric acid, and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); and 1.640 g of citric acid and 0.138 g of ferric chloride ($FeCl_3$) were dissolved in 25 mL of cyclopentanone (solution 2). A 3 mL volume of cyclopentanone was added to a 6 mL volume of solution 1 and mixed thoroughly. A 3 mL volume of solution 2 was then added and the combined solutions mixed to provide a cross-linking solution. The molar ratio of chlorosulfonated poly(ether ether ketone) to citric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate. The film was cast under ambient conditions and left for two to five minutes before being cured at 85° C. for 2.5 hours. During curing the upper surface of the film was protected with a second glass plate located approximately 1 cm above the surface.

Example 6

Solutions of dried chlorosulfonated poly(ether ether ketone), the cross-linking agents ethanedioic acid (oxalic acid) and tartaric acid, and the chloride catalyst ferric chloride ($FeCl_3$), were prepared in the non-aqueous reactive solvent cyclopentanone under ambient conditions (room temperature and pressure): 6.6 g of chlorosulfonated poly(ether ether ketone) was dissolved in 50 mL of cyclopentanone (solution 1); 0.769 g of ethanedioic acid (oxalic acid) was dissolved in 25 mL of cyclopentanone (solution 2); 1.281 g of tartaric acid and 0.138 g of ferric chloride ($FeCl_3$) was dissolved in 25 mL of cyclopentanone (solution 3); and 0.138 g of ferric chloride ($FeCl_3$) was dissolved in 25 mL of cyclopentanone (solution 4). A 1.5 mL volume of cyclopentanone and a 1.5 mL volume of solution 2 was added to a 6 mL volume of solution 1 and mixed thoroughly. A 1.5 mL volume of solution 3 and a 1.5 mL volume of solution 4 was then added and the combined solutions mixed to provide a cross-linking solution. The molar ratio of chlorosulfonated poly(ether ether ketone) to tartaric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate. The film was cast under ambient conditions and left for two to five minutes before being cured at 85° C. for 2.5 hours. During curing the upper surface of the film was protected with a second glass plate located approximately 1 cm above the surface.

Example 7

An amount of 50 g of poly(ether ether ketone) (Victrex) having a density of 1.3 g $cm^{-3}$ and a melt viscosity of 400° C. of 90 Pa·s was added to a volume of 250 mL of chloroform (Fisher Chemicals) followed by the addition of a volume of 250 mL of chlorosulfonic acid (Nacalai Tesque Inc.). The mixture was stirred for two hours at 50° C. and then washed twice with two separate volumes of 200 mL of chloroform and thrice with three separate volumes of 400 mL of chloroform. Washing was indicated to be complete when the volume of chloroform used in the washing remained colourless.

The orange coloured, viscous residue remaining following the chloroform washings was washed repeatedly with volumes of deionized water until the pH of the wash water had increased to 5. The resulting whitish coloured product was then broken into small flakes and dried in a vacuum oven at 65° C. for five days.

An amount of 1.9932 g of flakes of the dried, whitish coloured product was added to a volume of 15 mL cyclopentanone (AK Scientific) to provide a 13.2% (w/v) solution of the product. An amount of 0.235 g zinc chloride (Sigma-Aldrich) was added to a volume of 5 mL cyclopentanone (AK Scientific) to provide a 0.55% (w/v) solution of the catalyst.

To a volume of 15 mL of the solution of product in a vial either a volume of 0.3 mL of succinyl chloride (Sigma-Aldrich) or an amount of 0.4 g of 1,3,5-benzenetricarboxylic chloride (Sigma-Aldrich) was added. Following one of these additions a volume of 1.5 mL of the solution of the catalyst was added to provide a mixture of product, cross-linker and catalyst in a molar ratio of 1:0.5:0.1.

Following shaking of the vial the mixture was cast on a glass plate and cured at a predetermined temperature for a predetermined period of time. The temperatures and times used to provide samples of membrane consisting of putatively cross-linked chlorosulfonated poly(ether ether ketone) are presented in Table 1 and Table 2.

For comparative purposes, samples of membrane were also prepared without the addition of cross-linker and catalyst to the cast mixture. The curing conditions used in the preparation of these latter samples are presented in Table 3.

TABLE 1

Curing temperatures and times used for the preparation of putatively cross-linked chlorosulfonated poly(ether ether ketone) membranes where the crosslinking agent was succinyl chloride.

| Sample designation | Curing temp (±5° C.) | Curing time (min) | Molar ratio (product to crosslinking agent) | Molar ratio (product to catalyst) |
|---|---|---|---|---|
| 120SCl15 | 120 | 15 | 1:0.5 | 1:0.1 |
| 120SCl30 | 120 | 30 | 1:0.5 | 1:0.1 |
| 120SCl45 | 120 | 45 | 1:0.5 | 1:0.1 |
| 120SCl60 | 120 | 60 | 1:0.5 | 1:0.1 |
| 120SCl75 | 120 | 75 | 1:0.5 | 1:0.1 |
| 120SCl90 | 120 | 90 | 1:0.5 | 1:0.1 |
| 150SCl15 | 150 | 15 | 1:0.5 | 1:0.1 |
| 150SCl30 | 150 | 30 | 1:0.5 | 1:0.1 |
| 150SCl45 | 150 | 45 | 1:0.5 | 1:0.1 |
| 150SCl60 | 150 | 60 | 1:0.5 | 1:0.1 |
| 150SCl75 | 150 | 75 | 1:0.5 | 1:0.1 |
| 150SCl90 | 150 | 90 | 1:0.5 | 1:0.1 |
| 150SCl105 | 150 | 105 | 1:0.5 | 1:0.1 |
| 160SCl15 | 160 | 15 | 1:0.5 | 1:0.1 |
| 170SCl15 | 170 | 15 | 1:0.5 | 1:0.1 |
| 150SCl302x | 150 | 30 | 1:1 | 1:0.1 |

TABLE 2

Curing temperatures and times used for the preparation of putatively cross-linked chlorosulfonated poly(ether ether ketone) membranes where the crosslinking agent was 1,3,5-benzenetricarboxylic chloride.

| Sample designation | Curing temp (±5° C.) | Curing time (min) | Molar ratio (product to crosslinking agent) | Molar ratio (product to catalyst) |
|---|---|---|---|---|
| 120TMC15 | 120 | 15 | 1:0.33 | 1:0.1 |
| 120TMC30 | 120 | 30 | 1:0.33 | 1:0.1 |
| 120TMC45 | 120 | 45 | 1:0.33 | 1:0.1 |
| 120TMC60 | 120 | 60 | 1:0.33 | 1:0.1 |
| 120TMC75 | 120 | 75 | 1:0.33 | 1:0.1 |
| 120TMC90 | 120 | 90 | 1:0.33 | 1:0.1 |
| 150TMC15 | 150 | 15 | 1:0.33 | 1:0.1 |
| 150TMC30 | 150 | 30 | 1:0.33 | 1:0.1 |
| 150TMC45 | 150 | 45 | 1:0.33 | 1:0.1 |
| 150TMC60 | 150 | 60 | 1:0.33 | 1:0.1 |
| 150TMC75 | 150 | 75 | 1:0.33 | 1:0.1 |
| 160TMC15 | 160 | 15 | 1:0.33 | 1:0.1 |
| 170TMC15 | 170 | 15 | 1:0.33 | 1:0.1 |

TABLE 3

Curing temperatures and times used for the preparation of chlorosulfonated poly(ether ether ketone) membranes without the addition of catalyst or crosslinking agent.

| Sample designation | Curing temp (±5° C.) | Curing time (min) | Molar ratio (product to crosslinking agent) | Molar ratio (product to catalyst) |
|---|---|---|---|---|
| 120SClPEEK15 | 120 | 15 | — | — |
| 120SClPEEK30 | 120 | 30 | — | — |
| 120SClPEEK45 | 120 | 45 | — | — |
| 120SClPEEK60 | 120 | 60 | — | — |
| 120SClPEEK75 | 120 | 75 | — | — |
| 120SClPEEK90 | 120 | 90 | — | — |
| 150SClPEEK15 | 150 | 15 | — | — |
| 150SClPEEK30 | 150 | 30 | — | — |
| 150SClPEEK45 | 150 | 45 | — | — |
| 150SClPEEK60 | 150 | 60 | — | — |
| 150SClPEEK75 | 150 | 75 | — | — |
| 150SClPEEK90 | 150 | 90 | — | — |
| 150SClPEEK105 | 150 | 105 | — | — |
| 150SClPEEK120 | 150 | 120 | — | — |
| 160SClPEEK15 | 160 | 15 | — | — |
| 170SClPEEK15 | 170 | 15 | — | — |

Characterisation of Membranes

Solubilities of samples of membrane were determined at room temperature by placing a small piece (circa 25 mm$^2$) of sample in a volume of 3 mL of a solvent. A lack of solubility in various solvents was indicative of the sample of membrane consisting of cross-linked polymer. The appearances and solubilities of the samples in the solvent cyclopentanone are presented in Table 4. The solubility of selected samples of membrane (150SClPEEK30, 150SCl30 and 150SCl302x) in the solvents acetone, dimethylsulfoxide and methanol and acid (nitric acid) and alkali (sodium hydroxide)) are presented in Table 5.

Fourier transform infrared spectra (FTIR) were recorded using a Thermo Electron Nicolet 8700 spectrometer equipped with a single bounce ATR and diamond crystal. An average of 32 scans with a 4 cm$^{-1}$ resolution were recorded for each sample. For comparative purposes the FTIR spectrum of a sample of membrane prepared by the casting of a mixture without the addition of crosslinking agent or catalyst (control sample) was also recorded. All samples were washed with deionised water before recording scans. Comparisons of the FTIR spectra recorded for the selected samples of membrane and the control sample are presented in FIGS. 1 to 5. The observed solubilities and FTIR spectra of the selected samples of membrane are consistent with crosslinking of the csPEEK substrate having occurred.

TABLE 4

Appearance and solubility in cyclopentanone (after 24 hours) of samples of membrane.

| Sample | Appearance | Solubility |
|---|---|---|
| 120SClPEEK15 | Brown film | Soluble |
| 120SClPEEK30 | Dark brown film | Soluble |
| 120SClPEEK45 | Dark brown film | Soluble |
| 120SClPEEK60 | Dark brown film | Soluble |
| 120SClPEEK75 | Dark brown film | Soluble |
| 120SClPEEK90 | Black film | Soluble |
| 150SClPEEK15 | Dark brown film | Soluble |
| 150SClPEEK30 | Black film | Soluble |
| 150SClPEEK45 | Black film | Soluble |
| 150SClPEEK60 | Black film, brittle | Soluble |
| 150SClPEEK75 | Black film, brittle | Soluble |
| 150SClPEEK90 | Black film brittle | Partially soluble |
| 150SClPEEK105 | Black film, brittle | Partially soluble |
| 150SClPEEK120 | Black film brittle | Partially soluble |
| 160SClPEEK15 | Black film | Soluble |
| 170SClPEEK15 | Black film | Soluble |
| 120SCl15 | Brown film | Soluble |
| 120SCl30 | Dark brown film | Soluble |
| 120SCl45 | Dark brown film | Soluble |
| 120SCl60 | Dark brown fim | Soluble |
| 120SCl75 | Dark brown film | Soluble |
| 120SCl90 | Dark brown film | Soluble |
| 150SCl15 | Black film | Partially soluble |
| 150SCl30 | Black film | Insoluble |
| 150SCl45 | Black film, brittle | Insoluble |
| 150SCl60 | Black film, brittle | Insoluble |
| 150SCl75 | Black film, brittle | Insoluble |
| 150SCl90 | Black film, brittle | Insoluble |
| 150SCl105 | Black film, brittle | Insoluble |
| 160SCl15 | Black film | Soluble |
| 170SCl15 | Black film | Partially soluble |
| 150SCl302x | Black film | Insoluble |
| 120TMC15 | Brown film | Soluble |
| 120TMC30 | Dark brown film | Soluble |
| 120TMC45 | Dark brown film | Soluble |
| 120TMC60 | Dark brown film | Soluble |
| 120TMC75 | Dark brown film | Partially soluble |
| 120TMC90 | Dark brown film | Partially soluble |
| 150TMC15 | Black film | Partially soluble |
| 150TMC30 | Black film, brittle | Partially soluble |
| 150TMC45 | Black film, brittle | Insoluble |
| 150TMC60 | Black film, brittle | Insoluble |
| 150TMC75 | Black film, brittle | Insoluble |
| 160TMC15 | Black film | Soluble |
| 170TMC15 | Black film | Partially soluble |

TABLE 5

Solubilities of selected samples (shaded, Table 4) in different solvents.

| Solvent | 150SClPEEK30 | 150SCl30 | 150SCl302X |
|---|---|---|---|
| Dimethylsulfoxide | Dissolved | Undissolved, swollen | Undissolved, swollen |
| Cyclopentanone | Dissolved | Undissolved, swollen | Undissolved, swollen |
| Acetone | Undissolved, slightly swollen | Undissolved, slightly swollen | Undissolved, slightly swollen |
| Methanol | Undissolved, swollen | Undissolved, slightly swollen | Undissolved, slightly swollen |
| Sodium hydroxide solution (pH 13) | Undissolved | Undissolved | Undissolved |

TABLE 5-continued

Solubilities of selected samples (shaded, Table 4) in different solvents.

| Solvent | 150SClPEEK30 | 150SCl30 | 150SCl302X |
|---|---|---|---|
| Nitric acid (pH 2) | Undissolved | Undissolved | Undissolved |
| Cyclopentanone (after 24 hours in sodium hydroxide solution (pH 13)) | Undissolved, slightly swollen | Undissolved | Undissolved |
| Cyclopentanone (after 24 hours in nitric acid (pH 2)) | Dissolved partially, swollen | Undissolved, swollen | Undissolved, swollen |

Example 8

An amount of 13.97 g of poly(ether ether ketone) (Victrex) having a density of 1.3 g cm$^{-3}$ and a melt viscosity at 400° C. of 90 Pa·s was added to a volume of 66.5 mL of chloroform (Fisher Chemicals) mixed with 3.5 mL thionyl chloride. An amount of 70 g cholorsulfonic acid (Nacalai Tesque Inc.) was then added and the mixture stirred for two hours at 50° C. The mixture was then washed twice with two separate volumes of 200 mL of chloroform and thrice with three separate volumes of 400 mL of chloroform. Washing was indicated to be complete when the volume of chloroform used in the washing remained colourless. The orange coloured, viscous residue remaining following the chloroform washings was washed repeatedly with volumes of deionized water until the pH of the wash water had increased to 5. The resulting whitish coloured product was then broken into small flakes and dried in a vacuum oven at 65° C. for four days. Following drying the product was added to a volume of 100 mL tetrachloroethylene and a volume of 20 mL thionyl chloride and stirred for five hours. The product was then dried in a vacuum oven at 65° C. overnight.

Preparation of Asymmetric Composite Membrane

Example 9

The cooled crosslinking solution was cast onto a borosilicate glass plate to provide a wet film. A sheet of the sulfonated microporous poly(ethylene) was adhered by applying directly to the wet film ensuring full contact between the abutting surfaces of the film and sheet. The asymmetric composite was then transferred to an oven and cured for a period of ten to ninety minutes at a temperature of greater than 85° C., but not exceeding the melting point of the sheet. Following cooling the asymmetric composite membrane was removed from the glass plate in warm water.

Example 10

The cooled crosslinking solution was cast onto a borosilicate glass plate to provide a wet film. The cast crosslinking solution was allowed to stand under ambient conditions (room temperature and non-condensing humidity) for a period of at least 30 minutes. A sheet of the sulfonated microporous poly(ethylene) was then adhered by applying directly to the film formed by coagulation ensuring full contact between the abutting film and sheet surfaces. The asymmetric composite was then transferred to an oven and cured for a period of ten to ninety minutes at a temperature of greater than 85° C., but not exceeding the melting point of the sheet. Following cooling the asymmetric composite membrane is removed from the glass plate in warm water.

Example 11

A solution of chlorosulfonated poly(ether ether ketone) product obtained according to Example 8 was prepared at a concentration of 0.132 g/mL in cyclopentanone. To a volume of 15 mL of this solution an amount of 0.3 mL succinyl chloride (as cross-linking agent) and 1.5 mL zinc chloride (as catalyst) was added to provide a mixture of product, cross-linking agent and catalyst in a molar ratio of 1:0.5:0.1. The mixture was cast on a glass plate and the solvent evaporated at 85° C. before curing of the film at 120° C. for one hour. The cured film was then whetted with 50% tetrachloroethylene in chloroform before adhering a sheet of dry sulfonated microporous poly(ethylene) as the backing layer. To adhere the sheet of sulfonated microporous poly (ethylene) prepared according to Example 2, the sheet was flattened using 25% tetrachloroethylene in chloroform and 20% tetrachloroethylene in a mixture of 10% cyclopentanone and 90% chloroform followed by cyclopentanone. The asymmetric composite was then dried at 85° C. for 15 minutes and the membrane evaluated.

Performance of Asymmetric Composite Membrane

Figure 6:
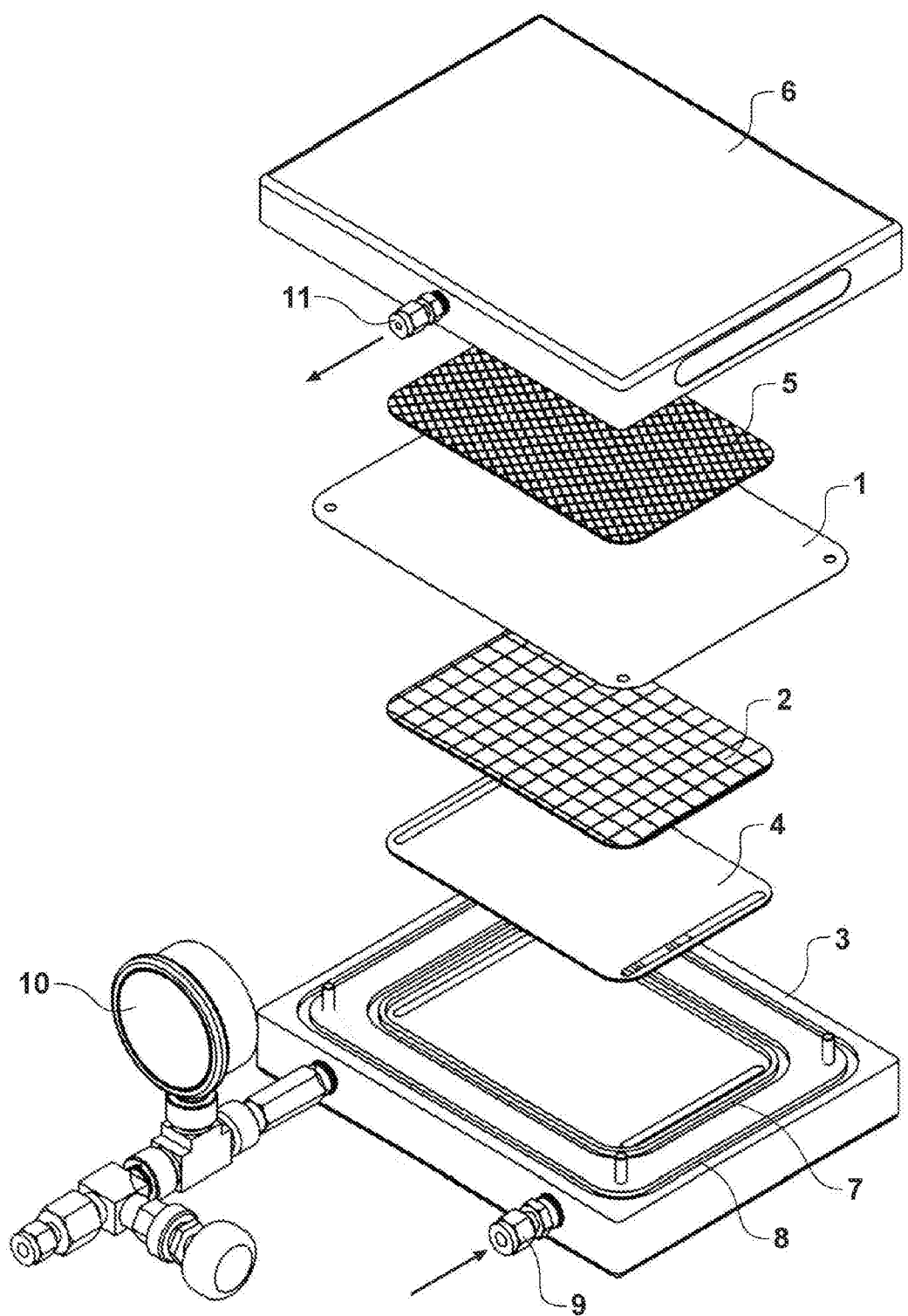
FIG. 6. Exploded view of the filter assembly (Sterlitech Corp.).
Figure 7:
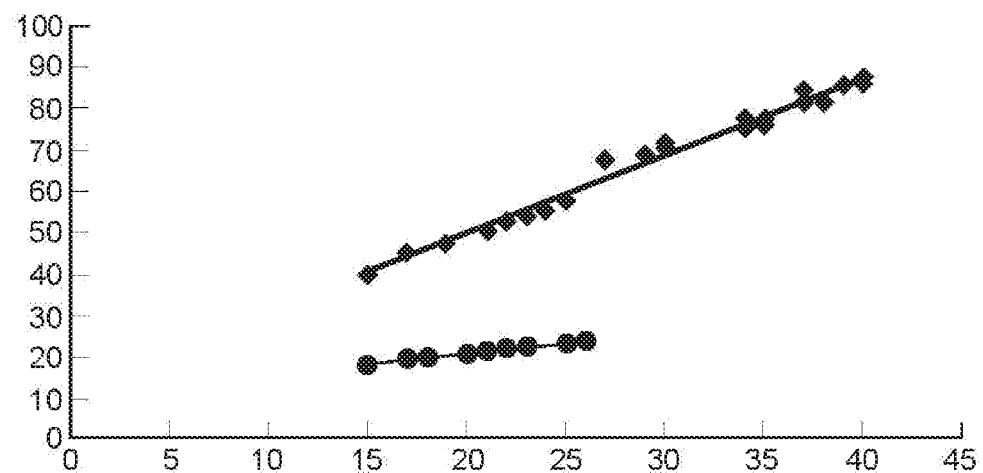
FIG. 7. Graph showing dependency of flux rate (L/m2h) (Y axis) on temperature (degrees C.) of the feed stream where the feed stream was milk (solid circles) or water (solid diamonds).
Figure 8:
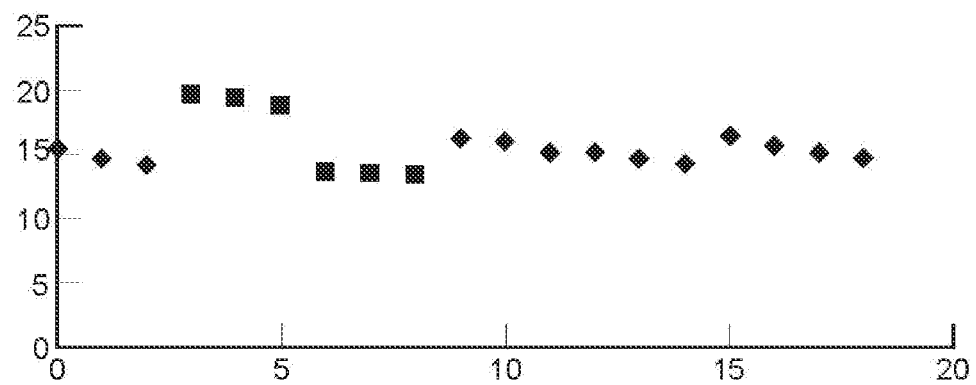
FIG. 8. Flux rates (L/m$^2$h) (Y axis) where the feed stream was milk at a pressure of 20 bar (solid diamonds) or 28 bar (solid squares) with in situ cleaning (vertical lines).

The performance of the asymmetric composite membranes prepared according to Examples 10 and 11 were evaluated using a reverse osmosis (RO) filter assembly of the type illustrated in FIG. 6.

Flux Testing

A section of the asymmetric composite membrane (1) was pre-wetted by dipping in distilled water and then placed on a coarse support mesh (2) located in the lower half (3) of the filter assembly housing, with a shim (4) optionally interposed. The section was placed with the rejection layer of the asymmetric composite membrane facing downwards. A fine mesh (5) located in the upper half of the filter assembly (6) housing was placed over the upper surface of the section of the asymmetric composite membrane (1). The filter assembly was sealed by sealing rings (7,8) and held in a hydraulic press pressurised to 60 Bar. The inlet port (9) of the lower half of the filter assembly housing (3) was in fluid connection with a feed reservoir (not shown) from which a feed stream was pumped at a rate to maintain the feed stream pressure measured on the pressure gauge (10). A pressure of 5 Bar was maintained for feed streams comprising water and salts. A pressure of 10 Bar was maintained for feed streams of milk. Feed streams were pre-chilled to 8° C. to mimic commercial processing conditions. Permeate was collected from the outlet port (11) of the upper half of the filter assembly housing (6) in a graduated cylinder (not shown). Collection was started at least 5 minutes after the commencement of permeate being discharged from the outlet port (11) in order to exclude water from the pre-wetting of the membrane or permeate from previously used feed streams.

In Situ Cleaning of Membrane

To mimic commercial processing operations the asymmetric composite membrane was subjected to repeated in situ washing protocols. The intermediate and subsequent flux rates were determined to assess the likely durability of the membrane in commercial processing operations. The in situ washing protocol was based on that employed in a commercial processing operation, but modified in duration to compensate for the greater exposure of the membrane to the cleaning agents (caustic and acid) in the filter assembly. Prior to the washing steps the membrane was rinsed by circulating water at an initial temperature of 65° C. through the filter assembly for a period of three minutes before draining the system.

The membrane was subjected to a first wash by circulating a circa 2% (w/v) sodium hydroxide solution ("caustic wash") through the filter assembly for a period of five minutes before draining and flushing the system by circulating water at an initial temperature of 65° C. through the filter assembly system for a period of five minutes. The membrane was subjected to a second wash by circulating a circa 2% (w/w) nitric acid solution ("acid wash") through the filter assembly system for a period of ten minutes before draining and flushing the system of circulating water at an initial temperature of 65° C. for a period of ten minutes. The membrane was subjected to a third wash (a "caustic wash") before flushing the system by circulating water at an initial temperature of 65° C. for a period of five minutes before circulating chilled water for a period of five minutes to cool the system. All rinsing and washing steps were performed with no pressure recorded on the pressure gauge (8).

Samples of the asymmetric composite membrane were tested for tensile strength and burst strength following flux testing and in situ washing to assess the likely durability of the membrane in commercial processing operations. All testing methods were performed in accordance with ASTM standards (Anon (2009), Anon (2010) and Anon (2012)).

Tensile Strength Testing

Samples for testing were excised from a sheet of the asymmetric composite membrane used in flux testing using a die and hydraulic press. The die was positioned on the upper surface of the sheet of the asymmetric composite membrane supported on a wooden board. Sufficient pressure was applied to the die using the hydraulic press to cut through the sheet. The sample was carefully removed from the die and subjected to testing according to the following protocol.

Samples were preconditioned at 23° C. plus or minus 2° C. and 50% plus or minus 10% relative humidity prior to testing. The thicknesses and widths of samples were measured at three points along the gage length of each sample. The calibrated load weighting system was zeroed and the machine crosshead adjusted to provide the required grip separation. Samples were placed in alignment in the grips of the universal testing machine ensuring sufficient tension on both edges of the sample. Where necessary, blotting or filter paper was used on the surface of the grips to prevent slippage. The extension indicator and recording system of the universal testing machine were reset before starting the machine and testing the samples to failure. Parts of samples tested to failure were removed from the universal testing machine and labelled. Data from testing of samples that failed outside the gage length, i.e. where contacting the grips of the universal testing machine or by tearing with an angle of separation greater than 30 degrees from the perpendicular, were excluded from analyses.

Bursting Strength Testing

The bursting strength of a sheet of the asymmetric composite membrane used in flux testing was measured (according to Mullen) using a tester (Burst-o-Matic™, Lorentzen and Wittre). Measurements were taken at multiple locations on the sheet. Data are presented in Table 6.

TABLE 6

Comparison of burst pressures for the used asymmetric composite membrane and an unused commercially available porous poly(ethylene) (K2045, 20 μm thick, porosity 45%, CELGARD ™).

| | Tensile strength (MPa) | |
|---|---|---|
| Sample | Mean | Standard deviation |
| CELGARD ™ K2045 | 98.3 | 10 |
| composite membrane | 84.9 | 2.6 |

Rejection Assessment

Figure 9:
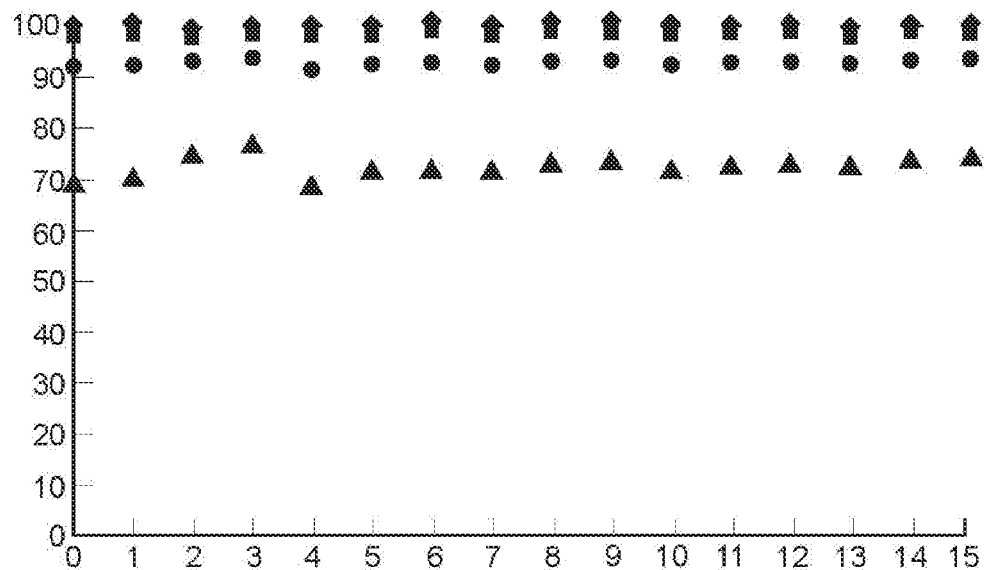
FIG. 9. Graph showing the rejection of fat (solid diamonds), lactose (solid triangles), protein (solid squares) and total solids (crosses) determined for samples of permeate where the feed stream was skim milk at a pressure of 20 bar or 28 bar (third and fourth samples).

Samples of permeate collected from a milk feed stream with periodic in situ cleaning of the membrane were analysed for fat, lactose, protein and total solids content. The results of these analyses are presented in FIG. 9.

In Situ Disinfection of Membrane

Prior to the washing steps the membrane was rinsed by circulating water at an initial temperature of 65° C. through the filter assembly for a period of three minutes before draining the system. The membrane was subjected to a first wash by circulating a circa 2% (w/v) sodium hydroxide solution ("caustic wash") through the filter assembly for a period of five minutes before draining and flushing the system by circulating water at an initial temperature of 65° C. through the filter assembly system for a period of five minutes. The membrane was subjected to a second wash by circulating a circa 2% (w/w) nitric acid solution ("acid wash") through the filter assembly system for a period of ten minutes before draining and flushing the system by circulating water at an initial temperature of 65° C. for a period of ten minutes. The membrane was subjected to a third wash by circulating a 2% (w/w) sodium hypochlorite solution ("disinfection wash") through the filter assembly system for a period of five minutes before draining and flushing the system with circulating water at an initial temperature of 65° C. for a period of ten minutes. The membrane was subjected to a final wash (a "caustic wash") before flushing the system by circulating water at an initial temperature of 65° C. for a period of five minutes before circulating chilled water for a period of five minutes to cool the system. As before all rinsing and washing steps were performed with no pressure recorded on the pressure gauge (8).

Post Disinfection Flux Testing

Figure 10:
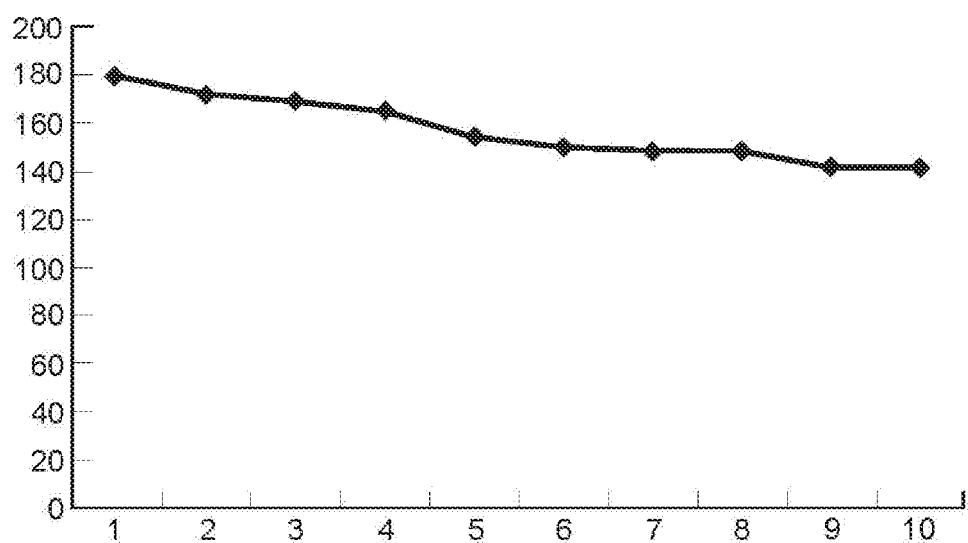
FIG. 10. Flux rates (L/m²h) (Y axis) obtained following disinfection of the asymmetric composite membrane where the feed stream was water at a pressure of 20 bar.
Figure 11:
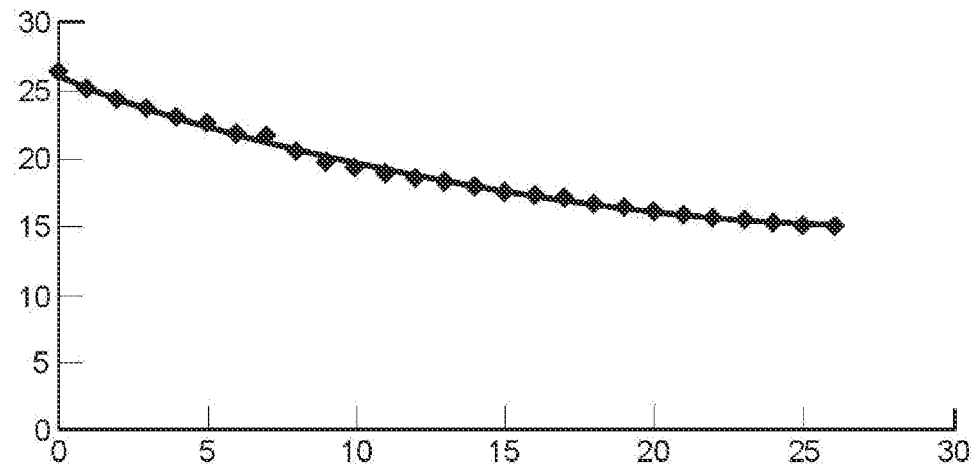
FIG. 11. Flux rates (L/m²h) (Y axis) obtained following disinfection of the asymmetric composite membrane where the feed stream was skim milk at a pressure of 20 bar.

The performance of the asymmetric composite membrane was evaluated following exposure to 2% (w/w) sodium hypochlorite. Flux rates obtained for water as the feed solution at a pressure of 23 bar are provided in FIG. 10. Permeate flux rates obtained when the feed stream was homogenised milk ("blue top") are provided in FIG. 11. Stable flux rates of ca. 15 litres per $m^2$ per hour were obtainable. An operating pressure of 20 bar for a flux rate of 13 litres per $m^2$ per hour was considered optimal for long-term use of the membrane.

A section of the asymmetric composite membrane was cut to size and mounted in the assembly illustrated in FIG. 6 as described above. A feed stream of homogenised whole milk (blue top) at a temperature of 7° C. was pumped at a rate (600 rpm) to maintain a feed stream pressure of 20 bar. Collection of permeate was alternated with the following clean-in-place (CIP) protocol:

Two volumes of two litres tap water at a temperature of 35° C. (flushed for 5 minutes each);

Circulating sodium hydroxide (pH 12) at a temperature of 35° C. for a period of 10 minutes;

One volume of one litre of tap water at a temperature of 35° C. (flushed for 5 minutes);
Circulating hydrochloric acid (pH 1.522) at a temperature of 35° C. for a period of 10 minutes;
One volume of one litre of tap water at a temperature of 35° C. (flushed for 5 minutes each);
Circulating sodium hydroxide (pH 12) at a temperature of 35° C. for a period of 10 minutes;
Two volumes of two litres tap water at a temperature of 35° C. (flushed for 5 minutes each);
Rinsing with cold tap water for a period of 5 minutes.

Figure 12:
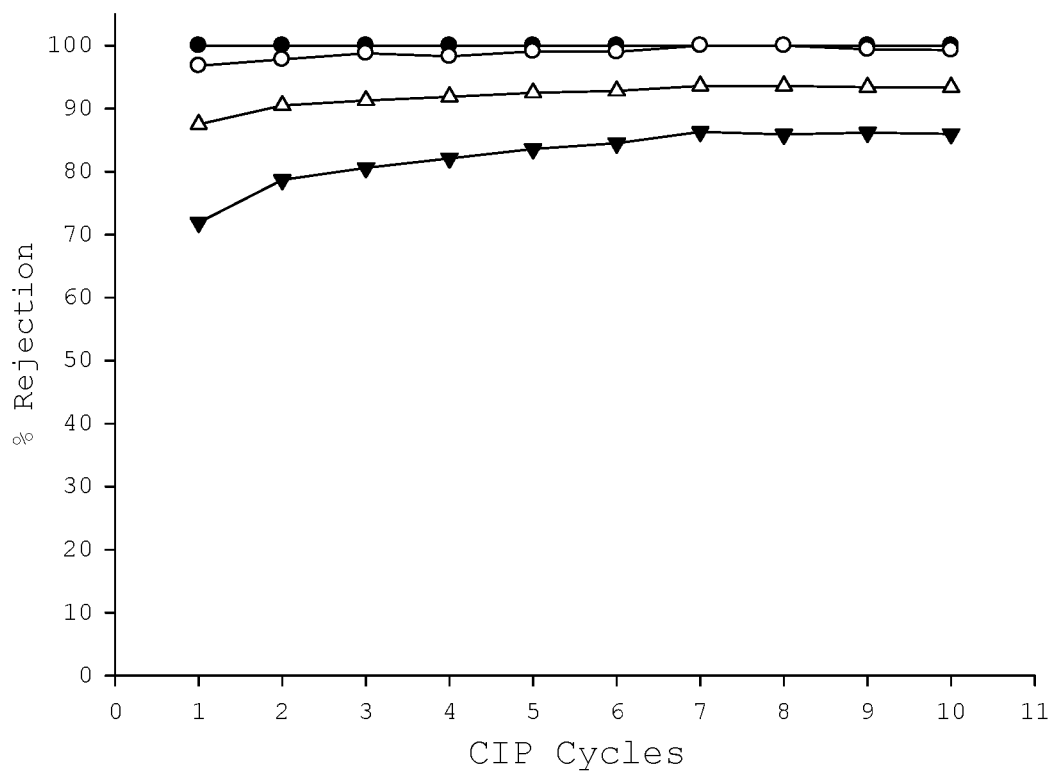
FIG. 12. Graph showing the rejection of fat (solid circles), lactose (solid inverted triangles), protein (open circles) and total solids (open inverted triangles) determined for samples of permeate where the feed stream was whole milk at a pressure of 20 bar and temperature of 7° C.

Ten samples of permeate from the milk feed stream were collected and independently analysed (Livestock Improvements Corporation, Hamilton) for fat, lactose, protein and total solids content. The results of these analyses are presented in FIG. 12. The asymmetric composite membrane provided consistently high rejection of fat, lactose, protein and total solids despite the repeated application of the CIP protocol. The performance of the membrane is consistent with its proposed use in food processing applications.

Example B

In a second option, the backing layer is prepared by the photoinitiated graft polymerisation of a sheet of μPE with selected hydrophilicitizing agents (Table 7). The hydrophilicitizing agent is selected to provide graft polymers with the chemical and physical properties dictated by the intended use of the asymmetric composite membrane. The irradiation of the microporous substrate should be for a period of time sufficient to allow for completion of the crosslinking or grafting. The intensity of the irradiation is typically sufficient to provide for a period of time of less than 5 minutes. In the context of preparing water permeable membranes using acrylic acid as the hydrophilicitizing agent this selection of parameters has been found to provide a PE sheet suitable for use in ultrafiltration of feed streams such as whole milk. In the context of preparing a durable (i.e. chlorine tolerant) asymmetric composite membrane, the selection of 4-ethenyl-benzenesulfonic acid (SSS) as the hydrophilicitizing agent has been found to provide a hydrophilicitized sheet of μPE particularly suited for use in the preparation of the asymmetric composite membrane.

Preparation of Hydrophilicitized Microporous Polyolefin ("Support Layer")

A microporous polyolefin substrate is contacted with a solution of 1% (w/v) photoinitiator and 6% (w/v) hydrophilicitizing agent in 1:1 (v/v) acetone-water. The contacted substrate is then irradiated at a wavelength optimal for the photoinitiator. When benzophenone is used as the photoinitiator a wavelength of around 270 nm is used. An intensity that is sufficient for a period of time of 5 minutes irradiation to be sufficient for the grafting to be complete is typically used. The irradiated substrate is finally washed using ultrasound in an excess of water followed by soaking in water. It was observed that a lower contact angle was achievable when irradiation of the contacted substrate occurred with the photoinitiator in solution (as opposed to being dried on the surface of the substrate).

For the preparation of samples A to D of modified polyolefin substrate according to the general method, sheets (20 μm thickness) of porous (45% porosity, 0.08 μm average pore diameter) poly(ethylene) (CELGARD™ K2045, Celgard LLC) were used as the polyolefin substrate. Other sources of sheets of porous poly(ethylene) may be used, e.g. TARGRAY™ SW320H. The solution was prepared by mixing benzophenone (photoinitiator) with acetone before adding water and then the selected hydrophilicitizing agent. The polyolefin substrate was contacted with the solution by casting the hydrophilicitizing solution on the sheet and removing excess fluid on the surface of the sheet. Irradiation was for three and a half minutes using UV fluorescent lamps (250 nm) having a bulb irradiance of 0.1 mW m$^{-1}$ at a distance of 50 mm. The ultrasound washing was for five minutes followed by soaking at 45° C. for three hours.

For the preparation of Sample E amounts of 0.6 g of the hydrophilicitizing agent sodium 4-vinylbenzene sulphonate and 0.1 g of the photoinitator benzophenone were dissolved in water (5 mL) and acetone (5 mL). The solution was then applied to a microporous polyethylene sheet on a glass plate using a threaded rod. Three applications were made until the polyethylene was wetted out. The glass plate and sample were then placed in a polyethylene plastic bag then clamped to a frame and cured using fluorescent UV lamps at a distance of 5 cm on both sides of the sample. The peak wavelength of the lamps was 250 nm and an irradiance power of 0.2 to 0.4 mW/m for each lamp. The lamps were placed in a line with 50 mm centres. The time the samples were irradiated was 210 seconds. The samples were then washed in 45° C. water for 10 seconds to removed excess polymer and unreacted hydrophilicitizing agent and put in an oven to dry for 30 minutes at 65° C. The samples were then removed from the glass plate by immersion in a water bath and extracted in a beaker of deionised water for three hours. Sample F was prepared by the same method as used for the preparation of Sample E, but with a volume of 0.6 mL of the hydrophilicitizing agent acrylic acid being substituted for the hydrophilicitizing agent sodium 4-vinylbenzene sulphonate and added after the benzophenone was dissolved in the solvent. Sample G was prepared by the same method as used for the preparation of Sample E, but with a volume of 0.6 mL of the hydrophilicitizing agent 2-hydroxyethyl methacrylate being substituted for the hydrophilicitizing agent sodium 4-vinylbenzene sulphonate and added after the benzophenone was dissolved in the solvent. The properties of samples of modified polyolefin substrate prepared using different hydrophilicitizing agents were assessed.

TABLE 7

Structure of AMPS, SSS and alternative hydrophilicitizing agents.

| Hydrophilicitizing agents | Structure |
| --- | --- |
| 2-acrylamido-1-methyl-2-propanesulfonic acid (AMPS) | |
| 2-propen-1-ol (allyl alcohol) | |
| 2-propenoic acid (acrylic acid) | |
| 2-hydroxyethyl 2-methyl-2-propenoic acid ester (HEMA) | |

TABLE 7-continued

Structure of AMPS, SSS and alternative hydrophilicitizing agents.

| Hydrophilicitizing agents | Structure |
|---|---|
| 4-ethenyl-benzenesulfonic acid (as the sodium salt) (SSS) | 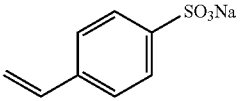 |

Characterization of Hydrophilic Microporous Polyolefin Samples

Fourier Transform Infrared (FTIR)

Spectra of the samples were recorded using a Thermo Electron Nicolet 8700 FTIR spectrometer equipped with a single bounce ATR and diamond crystal. An average of 32 scans with a 4 cm$^{-1}$ resolution was taken for all samples.

Surface Analysis

The contact angles for the surfaces of the asymmetric composite membrane were determined in using the captive bubble method as described in the publication of Causserand and Aimar (2010). The samples were immersed in deionized water with the surface to be analysed facing downwards. An air bubble was trapped on the lower surface of the sample using a syringe. An image of the bubble was captured and the contact angle was calculated from its geometrical parameters.

Permeability and Flux Testing

Permeability was determined by measuring the flux in deionized water at various pressures starting at 20 bar and decreasing in 4 bar iterations. Flux $J_v$ was then graphed against effective pressure difference across the membrane, $p_{eff}$, and the slope of the permeability $L_p$.

$$L_p = \frac{J_V}{\Delta p_{eff}}$$

Initial flux rates under pressure (20 bar) and no pressure were determined using the Sterlitech flux rig illustrated in FIG. 1 equipped with a PolyScience cooling unit. The samples were mounted in the flux cell and bolted. Deionized water was fed into the rig at 2.5 L min$^{-1}$ and 4 to 8° C. The time to collect a predetermined volume of permeate was noted. The flux rate (J) was calculated according to the following equation:

$$J = \frac{V}{t \times A}$$

where V is the permeate volume (L), t is the time (h) for the collection of V and A is area of the sample (m$^2$) which was determined to be 0.014 m$^2$.

To assess durability in different environments tests were also performed on samples immersed for 60 to 70 hours in aqueous solutions of either 30% (w/v) potassium hydroxide ("alkali environment") or 33% (w/v) hydrochloric acid ("acid environment").

Dry weight increases were calculated by taking the dry weight of the sample after it had dried in an oven for half an hour and comparing the weight to the initial weight of the porous polyethylene before grafting. Dry weights were taken after loose polymer had been extracted from the membrane and at the end of testing after a clean in place.

$$\Delta m_{dry} = \frac{m_{dry} - m_{initial}}{m_{initial}} \times 100$$

Water absorption was measured after loose polymer from the membrane had been extracted. The wet membranes were dabbed dry with a paper towel to remove surface moisture and weighed.

$$\Delta m_{Wet} = \frac{m_{wet} - m_{initial}}{m_{initial}} \times 100$$

Total solids rejection for whole milk samples was measured by pouring 20 mL of sample from the feed in a petri dish and measuring the dry weight after 2 hours in a 100° C. oven.

$$\% \; R_{TS} = \left(1 - \frac{m_{p,TS}}{m_{f,TS}}\right) \times 100$$

where $m_{p,TS}$ is total milk solids in the permeate and $m_{f,TS}$ is the mass of milk total solids in the feed.

Sodium chloride rejection was measured using a 2 g/L solution with a feed pressure of 16 bar. The conductivities from the feed and permeate were compared.

$$\% \; R_{NaCl} = \left(1 - \frac{\sigma_p}{\sigma_f}\right) \times 100$$

Where $\sigma_p$ is the conductivity of permeate and $\sigma_f$ is the conductivity of the feed.

The bubble point of the dry membranes was determined by gradually increasing the pressure of the feed until permeate started to flow through the membrane.

Results

Figure 13:
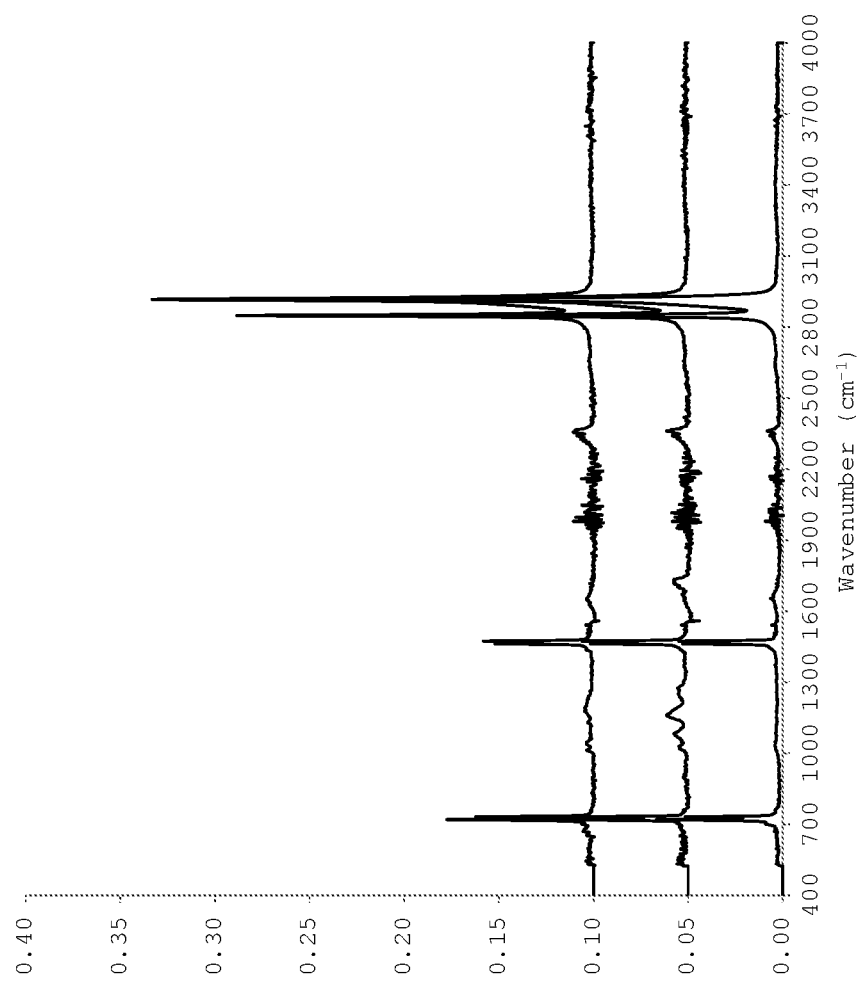
FIG. 13. Comparison of the FTIR spectra obtained for Sample 1 (lower trace), Sample 3 (middle trace) and Sample 4 (upper trace). An FTIR spectrum was not obtained for Sample 2.

The FTIR spectra for samples A to D generally showed faint peaks compared to the peaks observed in the FTIR spectrum of the unmodified polyolefin substrate (CELGARD™ K2045, Celgard LLC) (see FIG. 13). However, the ester and carbonyl groups of Sample C were clearly discernible. The hydroxyl group peaks of Sample A and Sample D were barely evident. The FTIR spectrum for Sample B was not determined.

Figure 14:
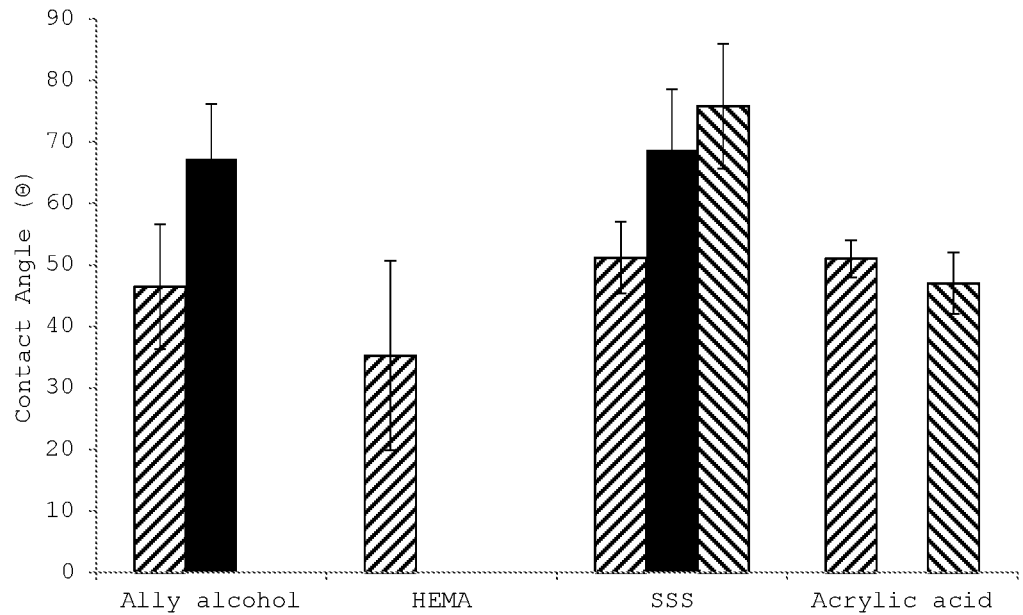
FIG. 14. Comparison of the contact angles determined for Sample 1 (Ally [sic] alcohol), Sample 3 (HEMA), Sample 4 (SSS) and Sample 2 (Acrylic acid) before (◨) and after exposure to an acid (◧) or alkali (■) environment.
Figure 15:
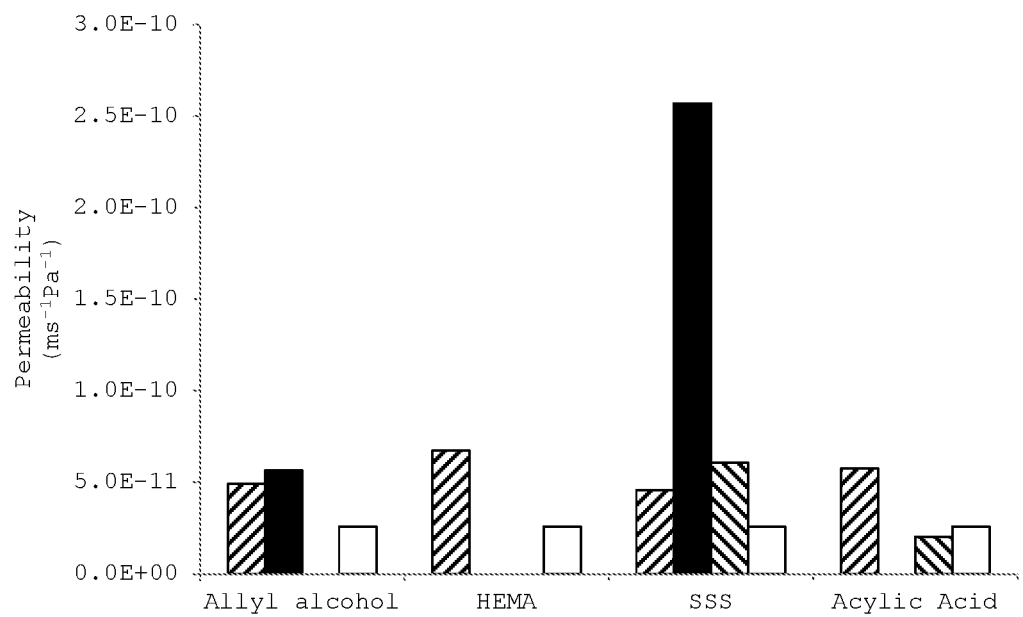
FIG. 15. Comparison of the permeability determined for Sample 1 (Allyl alcohol), Sample 3 (HEMA), Sample 4 (SSS) and Sample 2 (Acylic [sic] Acid) before (◨) and after exposure to an acid (◧) or an alkali (■) environment relative to the permeability of the unmodified polyolefin substrate (□).
Figure 16:
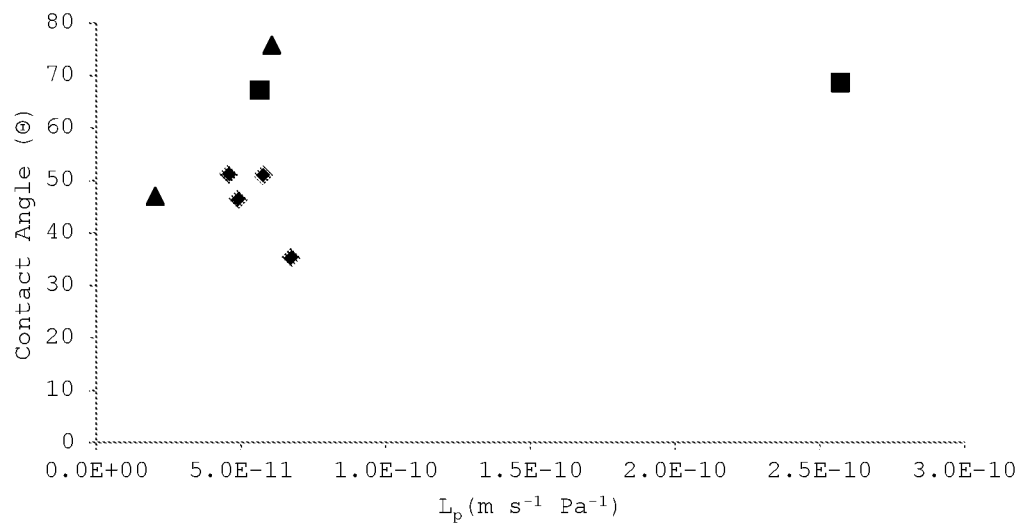
FIG. 16. Correspondence between contact angle and permeability determined for samples before (♦) and after exposure to an acid (▲) or an alkali (■) environment. The outlier is Sample 4 (SSS) after exposure to an alkali (■) environment.

The contact angles for samples A to D showed an inverse relationship with the permeability determined for the same sample (see FIGS. 14 to 16). Sample C was observed to have the lowest contact angle and the highest permeability prior to exposure to an acid or alkali environment. Following exposure to an acid environment the contact angle for Sample D increased. The contact angle of the unmodified polyolefin substrate (CELGARD™ K2045, Celgard LLC) was determined to be 89°, so modification of the surface tension is shown for all the samples despite the absence of definitive FTIR spectra. The observed initial flux rates were also consistent with modification of the polyolefin substrate (see Table 8).

TABLE 8

Initial flux rates of samples of modified polyolefin substrate (CELGARD ™ K2045, Celgard LLC).

| Sample | Initial flux (Lm²min⁻¹) | |
|---|---|---|
| | No pressure | Pressure (20 bar) |
| A (Allyl alcohol) | 50 | 484 |
| B (Acrylic acid) | 43 | 555 |
| C (HEMA) | 61 | 772 |
| D (SSS) | 44 | 577 |

All of samples A to D showed an increase in permeability compared to the unmodified membrane which measured 2.56 m s⁻¹ Pa⁻¹. When soaked for 66 hours in 30% (w/v) potassium hydroxide Sample A was stable based on a comparison of the permeability determined before and after exposure to the alkali environment. By comparison Sample D showed a large increase in permeability when exposed to the same alkali environment indicating the importance of the selection of the hydrophilicitizing agent when preparing modified polyolefin substrates for particular applications, e.g. alkaline battery separators. Furthermore, when immersed in 33% (w/v) hydrochloric acid Sample D turned the acid environment yellow and a strong odour of chlorine was detected, indicating oxidation of the modified polyolefin substrate. Notwithstanding this observation, the permeability of Sample D following exposure to the acid environment remained stable suggesting that the polyolefin substrate was not being degraded. When Sample B was exposed to the acid environment no colour change was observed, but the permeability decreased to less than the permeability of the polyolefin substrate, i.e. less than 2.56 m s⁻¹ Pa⁻¹).

Figure 17:
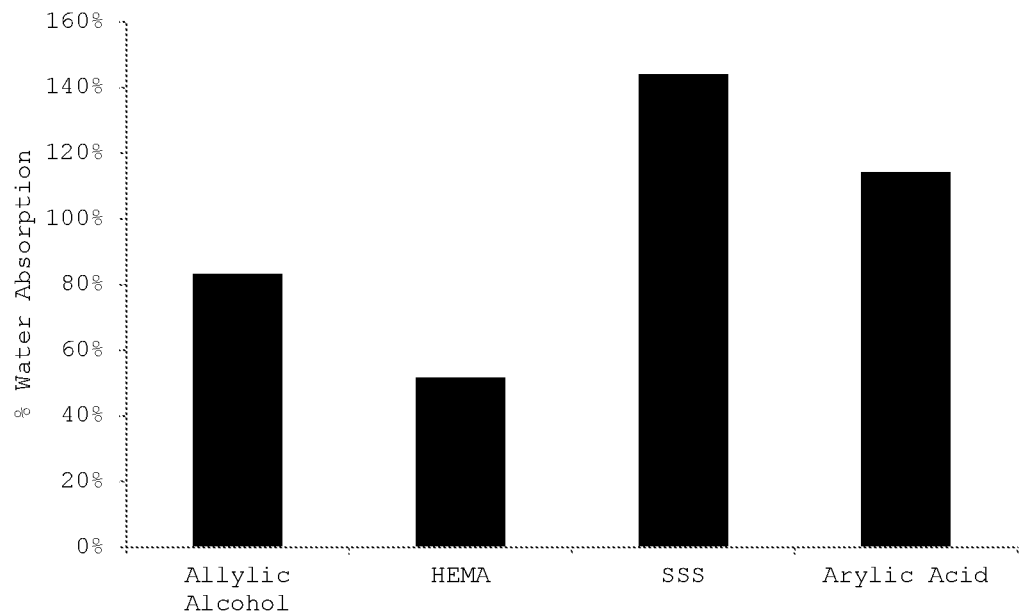
FIG. 17. Water absorption determined for Sample 1 (Allylic alcohol), Sample 2 (Arylic [sic] Acid), Sample 3 (HEMA) and Sample 4 (SSS).
Figure 18:
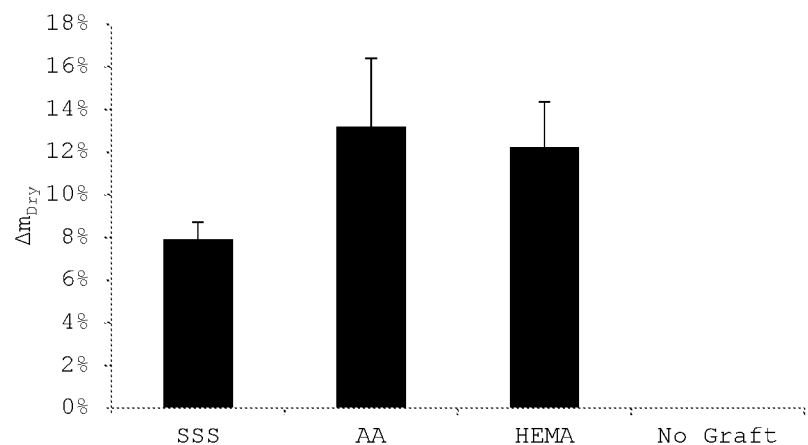
FIG. 18. The dry weight increase determined for Sample 5 (SSS), Sample 6 (AA), Sample 7 (HEMA) and the untreated microporous polyethylene substrate (CELGARD™ K2045).
Figure 19:
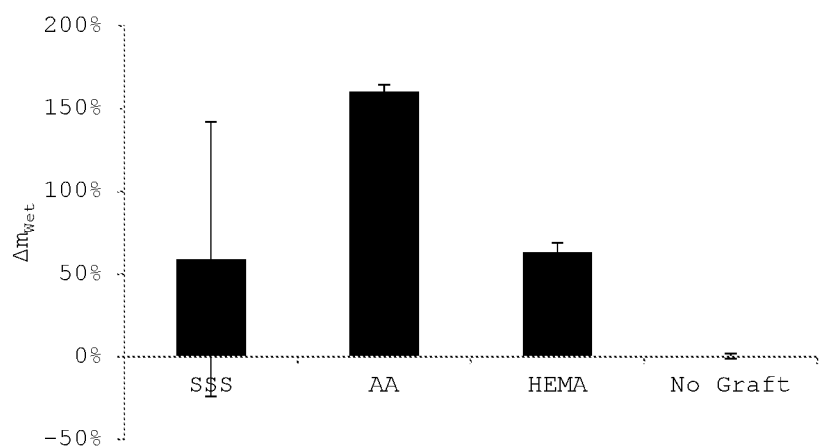
FIG. 19. The water absorption determined for Sample 5 (SSS), Sample 6 (AA), Sample 7 (HEMA) and the untreated microporous polyethylene substrate (CELGARD™ K2045).
Figure 20:
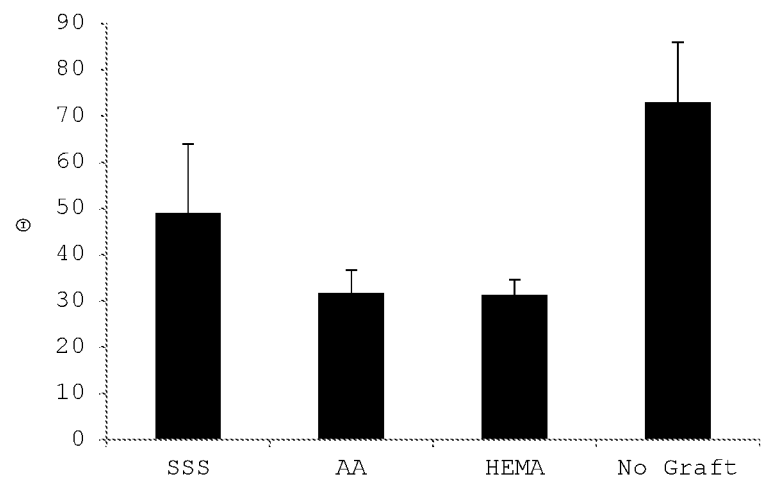
FIG. 20. The contact angles determined for Sample 5 (SSS), Sample 6 (AA), Sample 7 (HEMA) and the untreated microporous polyethylene substrate (CELGARD™ K2045).
Figure 21:
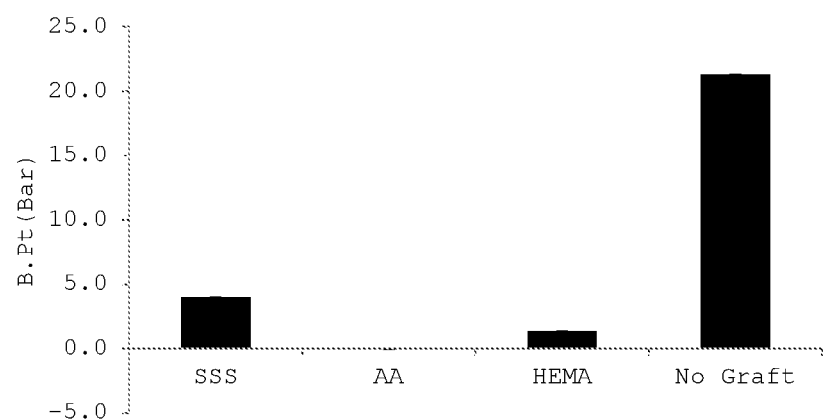
FIG. 21. The bubble points determined for Sample 5 (SSS), Sample 6 (AA), Sample 7 (HEMA) and the untreated microporous polyethylene substrate (CELGARD™ K2045).
Figure 22:
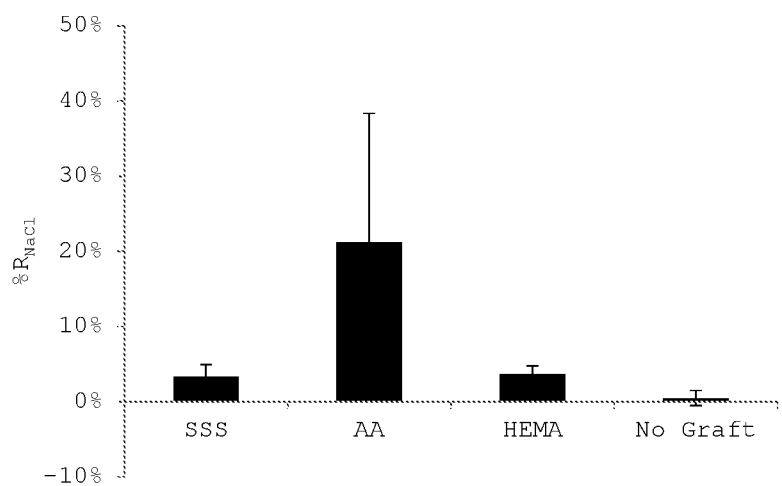
FIG. 22. The sodium rejection determined for Sample 5 (SSS), Sample 6 (AA), Sample 7 (HEMA) and the untreated microporous polyethylene substrate (CELGARD™ K2045).
Figure 23:
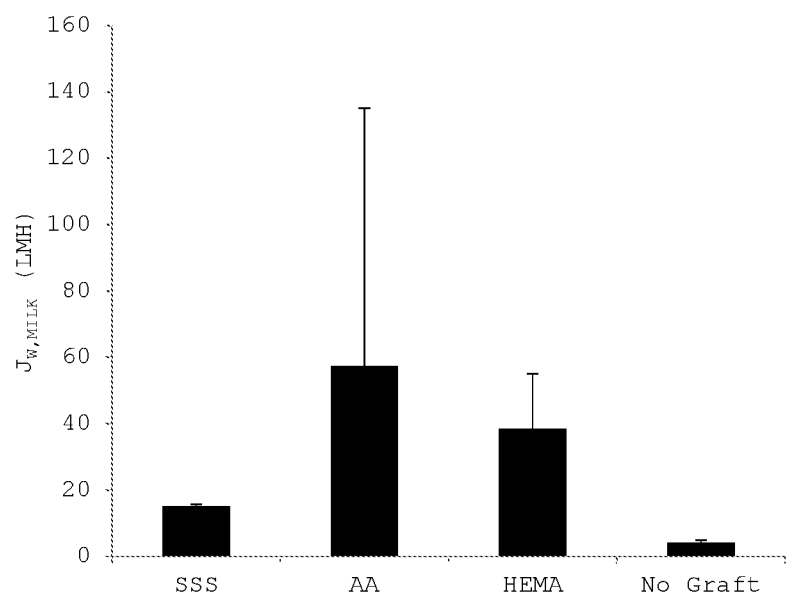
FIG. 23. The milk flux determined for Sample 5 (SSS), Sample 6 (AA), Sample 7 (HEMA) and the untreated microporous polyethylene substrate (CELGARD™ K2045).

As a general rule the higher the observed contact angle the lower the permeability determined for a sample. After Sample D was exposed to an alkali environment the sample developed a high initial flux even though the contact angle was determined to remain high. This observation indicates that the structure of the modified polyolefin is degraded. Water absorption was observed to be greatest for Sample B and Sample D, and of these two samples, Sample D had the largest water absorption. Sample A had a larger water absorption than Sample C (see FIG. 17).

Based on the assessment the preparation of modified polyolefin substrates according to the general method using 2-hydroxyethyl 2-methyl-2-propenoic acid ester as the hydrophilicitizing agent is selected for use as a backing or support layer in osmosis membranes. Sample C has been determined to provide high initial flux and the ability to let permeate through at low pressure differentials. Use of this class of modified polyolefin is indicated for medical applications.

Based on the assessment the preparation of modified polyolefin substrates according to the general method using 2-propen-1-ol as the hydrophilicitizing agent is selected for use in applications having an alkali environment. Sample A maintained a relatively high permeability under these conditions.

Based on the assessment the preparation of modified polyolefin substrates according to the general method using 4-ethenyl-benzenesulfonic acid as the hydrophilicitizing agent is selected for use in applications having an acid environment. Under these conditions Sample D maintained a more stable flux than Sample B exposed to the same conditions.

The assessments of replicates (i, ii, iii, . . . ) of samples E, F and G are presented in Table 9 and FIGS. 18 to 24.

TABLE 9

Assessments of replicates of Samples E, F and G.

| Hydrophilicitizing agent | Sample (replicate) | $\Delta m_{dry}$ | $\Delta m_{wet}$ | B. Pt bar | B. $Pt_{CIP\ 1}$ | $\Theta$ | $Flux_{DI}$ | % $R_{NaCl}$ | FluxMilk (Lm⁻²hr⁻¹) | % RTS |
|---|---|---|---|---|---|---|---|---|---|---|
| 4-ethyenyl-benzenesulfonic acid, Na salt (SSS) | E(i) | 9% | 10% | 4 | 0 | 32 | 429 | 2% | 16 | 66% |
| | E(ii) | 7% | 13% | 4 | 4 | 60 | 114 | 3% | 15 | 71% |
| | E(iii) | 7% | 155% | 4 | 0 | 55 | 213 | 5% | 15 | 65% |
| Acrylic acid (AA) | F(i) | 10% | 158% | 0 | 0 | 33 | 208 | 9% | 13 | 72% |
| | F(ii) | 13% | 165% | 0 | 0 | 32 | 167 | 13% | 147 | 8% |
| | F(iii) | 16% | 158% | 0 | 0 | 30 | 208 | 41% | 12 | 71% |
| 2-hydroxyethyl 2-methyl-2-propenoic acid ester (HEMA) | G(i) | 13% | 64% | 0 | 0 | 32 | 303 | 4% | 20 | 50% |
| | G(ii) | 14% | 57% | 0 | 0 | 35 | 405 | 3% | 44 | 46% |
| | G(iii) | 10% | 68% | 4 | 4 | 27 | 147 | 4% | 51 | 46% |
| | G(iv) | 10% | 68% | 0 | 0 | 31 | 385 | 2% | 97 | 16% |

Figure 24:
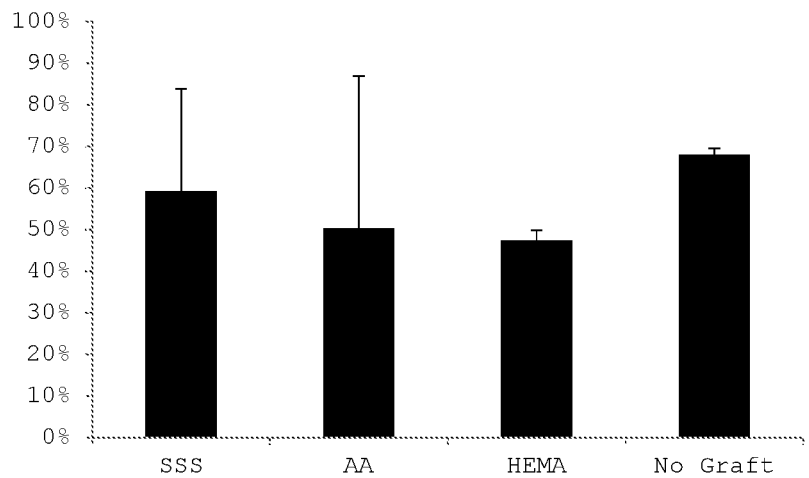
FIG. 24. The total milk solids rejection determined for Sample 5 (SSS), Sample 6 (AA), Sample 7 (HEMA) and the untreated microporous polyethylene substrate (CELGARD™ K2045).

Sample F was observed to provide a water permeable membrane with the highest rejection of salt (sodium chloride) (FIG. 10) combined with a relatively high flux (FIG. 23) and rejection of total milk solids (FIG. 24). Based on this assessment the preparation of modified polyolefin substrates according to the general method using acrylic acid as the hydrophilicitizing agent is indicated for use as a membrane in the ultrafiltration of feed streams such as milk.

The combination of a cross-linked poly(ether ether ketone) rejection layer and a hydrophilic microporous polyethylene backing layer provides a durable asymmetric composite membrane suitable for use in commercial processing operations.

Preparation of the Asymmetric Composite Membrane ("Two-Step Method")

The membrane is prepared by adhering a sheet of hydrophilic microporous poly(ethylene) (μPE) to a film of putatively cross-linked sulfonated poly(ether ether ketone) (sPEEK). The adherence is augmented by the interpenetration of the two polymers. In the laboratory the membrane may be prepared according to the following method in which the sheet of hydrophilic μPE is nominally referred to as the 'backing layer' and the film of putatively cross-linked sPEEK is nominally referred to as the 'rejection layer'. (The backing layer may alternatively be referred to as the 'support layer' and the rejection layer alternatively referred to as the 'barrier layer'.) The method provides the advantage of being adaptable to the continuous production of the asymmetric composite membrane. The method is described in detail in respect of the preparation of a single sample.

Rejection Layer

Poly(ether ether ketone) (PEEK) (VICTREX™ 450P, Victrex, England) was sulfonated by heating to 50° C. in concentrated sulfuric acid (95%) for 1 and one half hours. The sulfonated PEEK (sPEEK) was precipitated and washed in ice water several times before being dried in a vacuum oven. Without wishing to be bound by theory it is believed the small amount of water present in the concentrated sulfuric acid prevents cross-linking attributable to the formation of sulfone bridges. The degree of sulfonation of the sPEEK was determined by titration according to a modified form of the method disclosed in the publication of Drioli et al (2003). The sPEEK was leached for three days in a 3M solution of sodium chloride (NaCl) and the resulting solution titrated against a 0.2 M solution of sodium hydroxide (NaOH) using phenolphthalein as indicator. An amount of sPEEK (0.2 g) with a 69% DS was then added to a volume of dimethylacetamide (DMAc) (2.7 mL) and sonicated until a clear to slightly cloudy dispersion was obtained.

A volume (0.1 mL) of divinylbenzene (DVB) as cross-linking agent and an amount (0.14 g) of sodium styrene sulfonate (SSS) as hydrophilicitizing agent were added to a dispersion of sPEEK in DMAc. The dispersion contained 8% (w/w) sPEEK (0.216 mol/L) to provide a mixture containing a molar ratio of DVB to sPEEK of 1:2 and a molar ratio of SSS to sPEEK of 1:2. To increase the rate of the photoinitiated reaction an amount of benzophenone (BP) (8 μg) was added to the mixture before pouring onto aluminium foil on a glass plate, directly onto a glass plate or directly onto a stainless steel surface. The poured mixture was then exposed to 0.1 mW m$^{-1}$ UVA fluorescent lamps (368 nm) at a distance of 50 mm for a limited time of 60 to 90 seconds to provide a semi-cured film. The photoinitiated reaction is conveniently performed under an atmosphere of air (without the need to provide an inert, e.g. nitrogen ($N_2$), atmosphere). The structures of DVB and alternative di- and tetra-ethenyl cross-linking agents are provided in Table 10.

TABLE 10

Structure of cross-linking agents.

| Cross-linking agents | Structure |
|---|---|
| o-Divinylbenzene (o-DVB) | 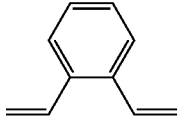 |
| m-Divinylbenzene (m-DVB) | 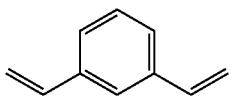 |
| p-Divinylbenzene (p-DVB) | 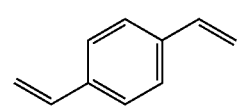 |
| Ethylene glycol dimethacrylate (EGDMA) | 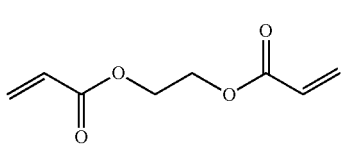 |

TABLE 10-continued

Structure of cross-linking agents.

| Cross-linking agents | Structure |
|---|---|
| glyoxal bis (diallyl acetal) (GBDA) | 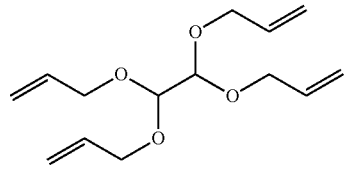 [SMILES: C=CCOC(OCC=C)C(OCC=C)OCC=C] |

Backing Layer

The sheet of sμPE to which a film of xsPEEK is adhered was prepared from a preformed sheet of microporous poly (ethylene) (μPE). The formation of sheets μPE is described, for example, in the publications of Fisher et al (1991) and Gillberg-LaForce (1994). In the present studies a preformed sheet of μPE (20 μm thickness, 45% porosity, 0.08 μm average pore diameter) (CELGARD™ K2045, Celgard LLC) was contacted with a solution of 1% (w/v) benzophenone and 6% (w/v) 4-ethenyl-benzenesulfonic acid (as the sodium salt) (SSS) as hydrophilicitizing agent in 1:1 (v/v) acetone-water. The solution was prepared by mixing benzophenone with acetone before adding water and then the hydrophilicitizing agent. The use of SSS is preferred due to the greater chlorine tolerance of membranes prepared using this hydrophilicitizing agent. This advantage applies to both the preparation of the hydrophilicitized backing layer and the asymmetric composite membrane.

Asymmetric Composite Membrane

The sheet of μPE contacted with the solution was laid on top of the semi-cured film (the nascent 'rejection layer'). The composite of μPE contacted with the solution and semi-cured film of putative xsPEEK was then exposed as before to 0.1 mW m$^{-1}$ UVA fluorescent lamps (368 nm) at a distance of 50 mm, but for a limited time of 210 seconds. The UVA-irradiated composite was then dried in an oven at 60° C. for 30 minutes to promote adherence of the film and sheet before releasing the composite membrane from the aluminium foil by immersion in a solution of 2% w/w sodium hydroxide or, if cured on a glass plate, by immersing the membrane in a water bath at room temperature until the membrane releases and floats to the surface (typically for 10 to 15 minutes). Where the nascent rejection layer is cured on a stainless steel surface it may be necessary to soak in water overnight. The structures of AMPS, SSS and alternative mono-ethenyl hydrophilicitizing agents are provided in Table 7. Before evaluation the laboratory prepared composite membrane was rinsed at 50° C. with a large excess of deionised (DI) water.

Samples of the asymmetric composite membrane were prepared according to the foregoing method consisting of a rejection layer and a backing layer prepared using the compositions and conditions provided in Table 11 and Table 12.

TABLE 11

Rejection layer formulations and cure conditions used in the preparation of each of the samples. The rejection layer of sample 12 was prepared using 1:1 (v/v) acetone-water as solvent.

| Sample | sPEEK DS | sPEEK % of solids | DVB % of solids | SSS % of solids | BP | Solvent | % solids (w/w) | Cure time (s) | Number of applications |
|---|---|---|---|---|---|---|---|---|---|
| 1 | 69 | 45 | 22 | 31 | 2 | DMAc | 12 | 90 | 1 |
| 2 | 69 | 45 | 22 | 31 | 2 | DMAc | 12 | 60 | 1 |
| 3 | 69 | 45 | 15 | 33 | 6 | DMAc | 15 | 90 | 2 |
| 4 | >80 | 41 | 17 | 30 | 11 | DMAc | 15 | 90 | 1 |
| 5 | 69 | 45 | 15 | 33 | 6 | DMAc | 15 | 90 | 2 |
| 6 | 69 | 98 | 0 | 0 | 2 | DMAc | 15 | 90 | 1 |
| 7 | 69 | 70 | 21 | 0 | 9 | DMAc | 9 | 90 | 1 |
| 8 | 69 | 57 | 35 | 0 | 8 | DMAc | 9 | 90 | 1 |
| 9 | 69 | 47 | 46 | 0 | 6 | DMAc | 9 | 90 | 1 |
| 10 | 69 | 42 | 52 | 0 | 6 | DMAc | 9 | 90 | 1 |
| 11 | >80 | 63 | 32 | 0 | 5 | MeOH | 29 | 90 | 1 |
| 12 | >80 | 15 | 10 | 70 | 5 | acetone/water | 6 | 300 | 1 |
| 13 | 69 | 45 | 19 | 34 | 2 | DMAc | 15 | 90 | 2 |

TABLE 12

Backing layer formulations used in the preparations of each of the samples. All backing layers (except for sample 11 and sample 12) were prepared using 1:1 (v/v) acetone-water as solvent.

| Sample | Hydrophilicitizing agent (H.A.) | H.A. % of solids | BP % of solids | % solids (w/w) | Cure time (s) | Number of applications |
|---|---|---|---|---|---|---|
| 1 | AMPS | 86 | 14 | 7 | 90 | 1 |
| 2 | AMPS | 86 | 14 | 7 | 600 | 2 |
| 3 | SSS | 86 | 14 | 7 | 90 | 1 |
| 4 | SSS | 86 | 14 | 7 | 90 | 1 |
| 5 | SSS | 86 | 14 | 7 | 90 | 1 |
| 6 | SSS | 86 | 14 | 7 | 90 | 1 |
| 7 | SSS | 86 | 14 | 7 | 90 | 1 |
| 8 | SSS | 86 | 14 | 7 | 90 | 1 |
| 9 | SSS | 86 | 14 | 7 | 90 | 1 |
| 10 | SSS | 86 | 14 | 7 | 90 | 1 |
| 11 | n.a. | n.a. | n.a. | n.a. | n.a. | n.a. |
| 12 | n.a. | n.a. | n.a. | n.a. | n.a. | n.a. |
| 13 | SSS | 86 | 14 | 7 | 90 | 1 |

Preparation of the Asymmetric Composite Membrane ("One-Step Method")

The membrane may also be prepared by contacting one side of a sheet of microporous poly(ethylene) (TARGRAY™ SW320H) with a single mixture of the components of the formulations presented in Table 11 and Table 12. In this "one-step method" the hydrophilicitization of the poly(ethylene) of the microporous support layer occurs in conjunction with the crosslinking of the sPEEK of the rejection layer. According to this method a solution in a volume of 15 mL of dimethylacetamide (DMAc) or dimethylsulfoxide (DMSO) of 1.2 g 4-ethenyl-benzenesulfonic acid (as the sodium salt) (SSS), 0.2 g of benzophenone (BP), 0.8 g sPEEK and 0.14 g divinylbenzene is prepared and a volume of about 5 mL of the solution applied uniformly to the one side of a pre-weighed sheet of microporous poly(ethylene) (185 mm×135 mm) supported on a glass plate. The wetted sheet is then quickly transferred to a sealed poly(ethylene) bag to minimise evaporation of solvent and irradiated at a wavelength around 250 nm for a period of time of around 2 minutes. The irradiated sheet is then oven dried at 65° C. for a period of time of 30 to 45 minutes before being allowed to cool to room temperature and washed in a deionised water bath maintained at 50° C. for a period of time of 3 hours. The washed sheet is finally air dried at room temperature before storage. When preparing the solution dissolution of the sPEEK may require heating of the solvent, e.g. DMSO, to 60° C. Accordingly, the sPEEK should be added first and the heated volume of solvent cooled to room temperature prior to addition of the other components of the mixture. Exposure of the solution to light is avoided following addition of the photoinitiator, e.g. BP.

Evaluation of the Asymmetric Composite Membrane ("Two-Step Method")

The performance of the asymmetric composite membrane was evaluated using a reverse osmosis (RO) filter assembly of the type illustrated in FIG. 6 as described above for the characterisation of hydrophilicitized microporous polyolefin sample. Flow rates of approximately 2 L/min were obtained.

To mimic commercial processing operations the asymmetric composite membrane was subjected to 'clean-in-place' (CIP) protocols between each use of milk as the feed stream. The CIP protocols were based on those employed in a commercial processing operation for reverse osmosis (RO) membranes (Anon (2014)) and summarised in Table 7. The CIP protocols were repeated alternating with the use of milk as a feed stream. Samples were taken from the feed and permeate for each intervening use of milk as a feed stream to determine any deterioration in the performance of the membrane attributable to repeated CIP protocols. The asymmetric composite membrane was also evaluated for its tolerance to a CIP protocol including sodium hypochlorite (Table 14).

TABLE 13

Clean-in-place (CIP) protocol adapted from Anon (2014).

| Step | Wash[1] | Time (min) | Temperature (° C.) |
|---|---|---|---|
| 1 | Water | 5 | Ambient |
| 2 | Water | 5 | 35 |
| 3 | Alkali | 10 | 35 |
| 4 | Water | 5 | 35 |
| 5 | Acid | 10 | 35 |
| 6 | Water | 5 | Ambient |
| 7 | Alkali | 10 | 35 |
| 8 | Water | 5 | Ambient |

[1]alkali (2% (w/v) NaOH) and acid (1.9% (w/v) $H_2NO_3$ and 0.6 (w/v) $H_3PO_4$).

TABLE 14

Clean-in-place (CIP) protocol including 200
ppm free chlorine (as sodium hypochlorite).

| Step | Wash[1] | Time (min) | Temperature (° C.) |
|---|---|---|---|
| 1 | Water | 5 | Ambient |
| 2 | Water | 5 | 35 |
| 3 | Alkali | 10 | 35 |
| 4 | Water | 5 | 35 |
| 5 | Acid | 10 | 35 |
| 6 | Water | 5 | Ambient |
| 7 | Chlorine | 10 | 35 |
| 8 | Water | 5 | 35 |
| 9 | Water | 1-2 | 35 |
| 10 | Water | 1-2 | Ambient |

[1]alkali (2% (w/v) NaOH), acid (1.9% (w/v) H$_2$NO$_3$ and 0.6 (w/v) H$_3$PO$_4$) and chlorine (0.05% (w/v) sodium hydroxide and 0.09% (w/v) sodium hypochlorite).

The following measurements relating to the performance of the asymmetric composite membrane before and after repeated application of the CIP protocols were made:
1. initial flux rates with water or whole milk as the feed stream after equilibration for 30 minutes;
2. rejection levels for fat, lactose and protein;
3. total solids content;
4. salt (NaCl or Na2SO4) retention; and
5. Sucrose retention.

The total solids content was determined gravimetrically for both the feed and permeate. Samples were weighed in Petri dishes and dried in an oven at 60° C. for two hours and then 102° C. for a further two hours. The results are summarised in Table 15.

Comparative Studies

Sample 1

Figure 25:
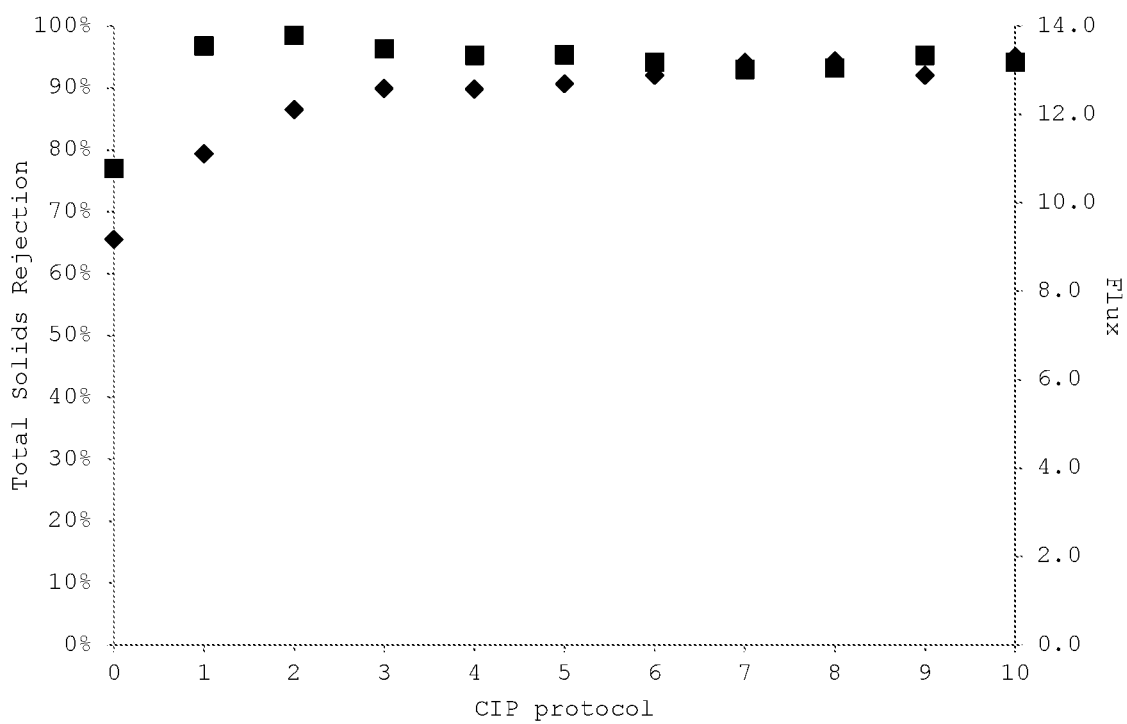
FIG. 25. Flux (LMH) (♦) and total solids rejection (%) (■) for Sample 1 during repeated CIP protocols (10× according to the schedule provided in Table 14). The feed stream was whole milk.

The sample was subjected to repeated CIP protocols according to the schedule provided in Table 14 with the exception that Step 1 and Step 6 were also performed at 35° C. The maximum total solids rejection (standard milk) was observed after three CIP protocols with flux and total solids rejection stabilising after four to five CIP protocols (FIG. 25). Microscopic examination of the surface of the sample exposed to repeated CIP protocols indicated an increase in crystallinity of the membrane. It was found that increasing the concentration of the photoinitiator benzophenone (BP) used in the subsequent preparation of samples improved the reproduceability of these observations.

TABLE 15

Performance of the samples of the asymmetric composite membrane measured at 20 bar.

| | | | | Standard milk | |
|---|---|---|---|---|---|
| Sample | Deionised water Flux L/m$^2$/h (gfd) | Rejection (NaCl) | Rejection (lactose) | Rejection (total solids) | Flux L/m$^2$/h (gfd) |
| 1 | 40 (11.7) | 52 | 99 | 99 | 12.1 (3.5) |
| 2 | 18.1 (5.3) | 47 | 98 | 99 | 10.1 (3.0) |
| 3 | 9.5 (2.8) | 46 | 90 | 97 | 9.4 (2.8) |
| 4 | 50 (14.7) | 64 | 75 | 97 | 14.7 (4.3) |
| 5 | 9.5 (2.8) | 46 | 91 | | 6 (1.8) |
| 6 | 1051 (308) | | | 82 | 13.5 (4.0) |
| 7 | 3.3 (1.0) | 19 | 42 | 73 | 8.7 (2.6) |
| 8 | 56 (16) | 17 | 91 | 83 | 12.4 (3.6) |
| 9 | 65 (19) | 13 | 59 | 79 | 14 (4.1) |
| 10 | 107 (31) | 5 | 32 | 71 | 12.7 (3.7) |
| 11 | 1.6 (0.5) | 50 | n.a. | n.a. | n.a. |
| 12 | 83 (24) | 25 | | | |
| 13 | 100 (29) | 38 | | | |

Sample 2

Figure 26:
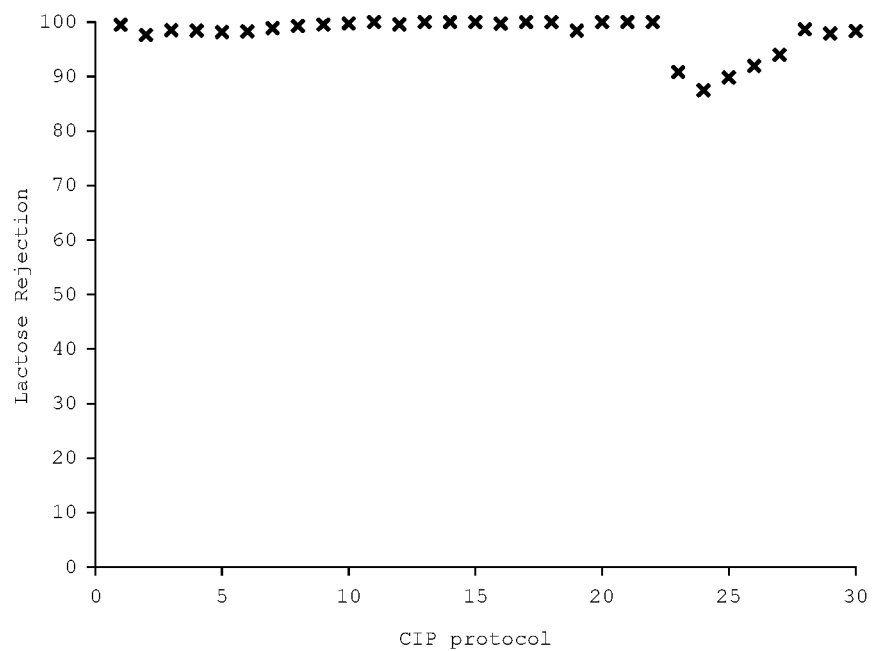
FIG. 26. Lactose rejection (%) detected by FTIR for Sample 2 during sequential CIP protocols (10 times according to the schedule provided in Table 7 followed by 12 times according to the schedule provided in Table 14), drying of the sample and further CIP protocols (8 times according to the schedule provided in Table 14). The feed stream was whole milk.

The sample was subjected to repeated sequential CIP protocols according to the schedules provided in Table 13 (10×) and Table 14 (12×). The sample was then dried for several days before being subjected to further CIP protocols. The lactose rejection remained high throughout the sequential CIP protocols, the moderate decline in performance being recoverable following drying of the sample (FIG. 26).

Sample 3

Figure 27:
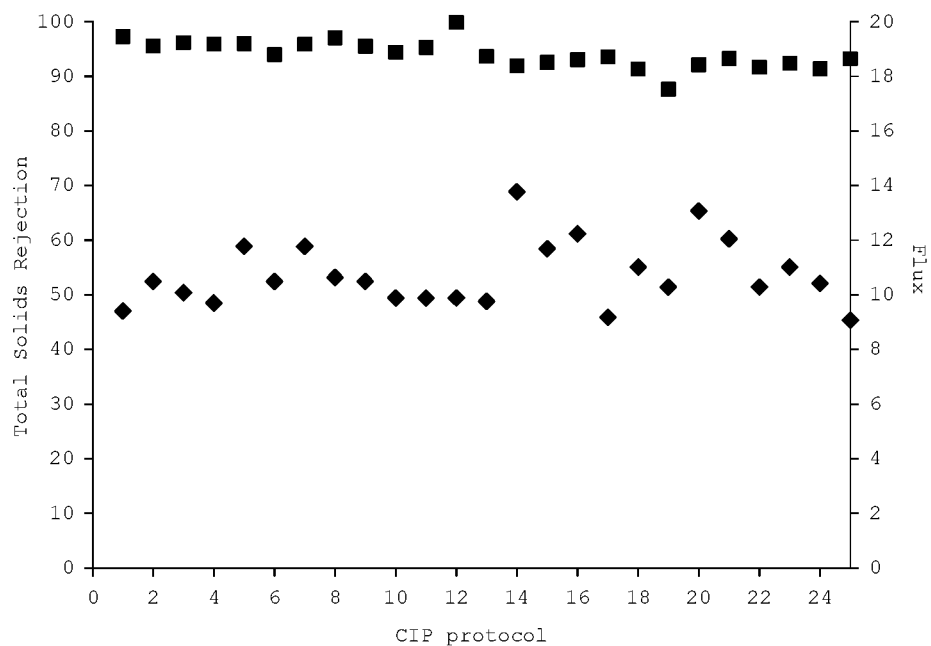
FIG. 27. Flux (LMH) (♦) and total solids rejection (%) (■) for Sample 3 during repeated CIP protocols (25× according to the Schedule provided in Table 14. The feed stream was whole milk.

The sample was subjected to repeated CIP protocols (25×) according to the schedule provided in Table 14. A total solids rejection (standard milk) comparable with that obtained for sample 1 was observed. A greater variability in flux was observed (FIG. 27).

Sample 4

Figure 28:
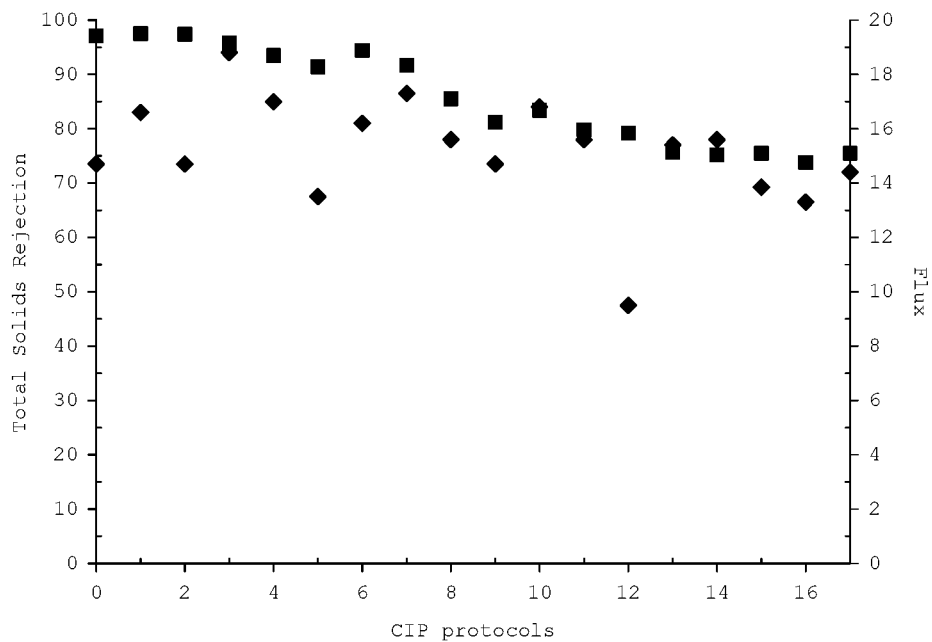
FIG. 28. Flux (LMH) (♦) and total solids rejection (%) (■) for Sample 4 during repeated CIP protocols (17 times according to the schedule provided in Table 14). The feed stream was whole milk.
Figure 29:
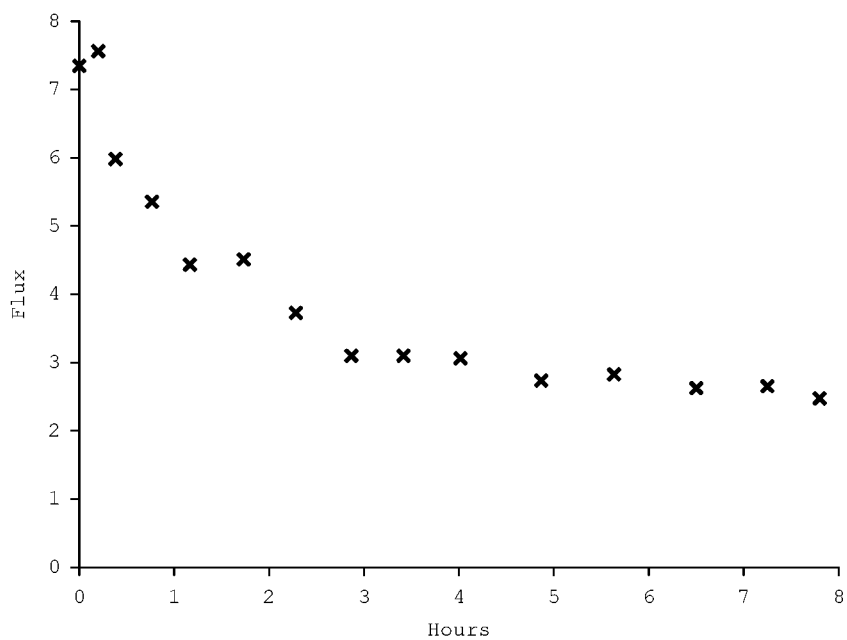
FIG. 29. Flux (LMH) (x) for Sample 5 measured over a period of eight hours using raw milk as the feed stream.
Figure 30:
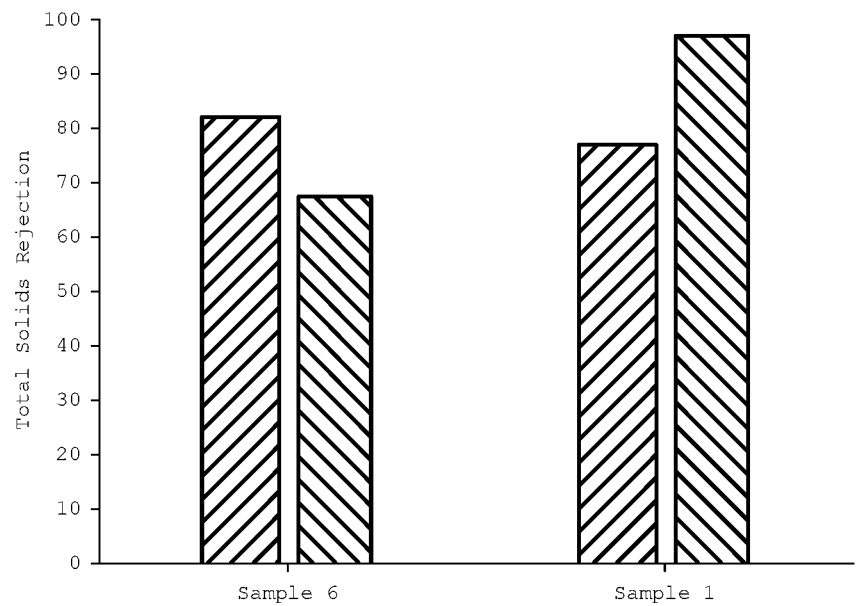
FIG. 30. Comparison of the total solids rejection (%) for Sample 6 and Sample 1 before (left hand bar) and after (right hand bar) a single CIP protocol according to the schedule provided in Table 14. The feed stream was whole milk.

The sample was subjected to repeated CIP protocols (17×) and exhibited an unacceptable decline in the rejection of total solids (FIG. 28). The unacceptable performance of this sample was attributed to the high DS (greater than 80%) of the sPEEK used in the preparation of the rejection layer.

Sample 5

The performance of the sample was evaluated when used to recover permeate from fresh raw milk over a prolonged period of time (18 hours) at a constant pressure of 16 bar. A performance comparable with that of existing commercial operations was observed.

Sample 6

The sample was prepared to demonstrate the advantage provided by the inclusion of both cross-linking and hydrophilicitizing agents in the preparation of the rejection layer. The performance of the sample before and after a single CIP protocol according to the schedule provided in Table 14 was compared with that of Sample 1. Whereas the performance of the latter in terms of total solids rejection improved, the performance of Sample 6 deteriorated. The poor durability of the sample is attributed to the absence of cross-linking and interpenetration of the polymers of the backing layer and rejection layer of the composite membrane.

Samples 7 to 10

Figure 31:
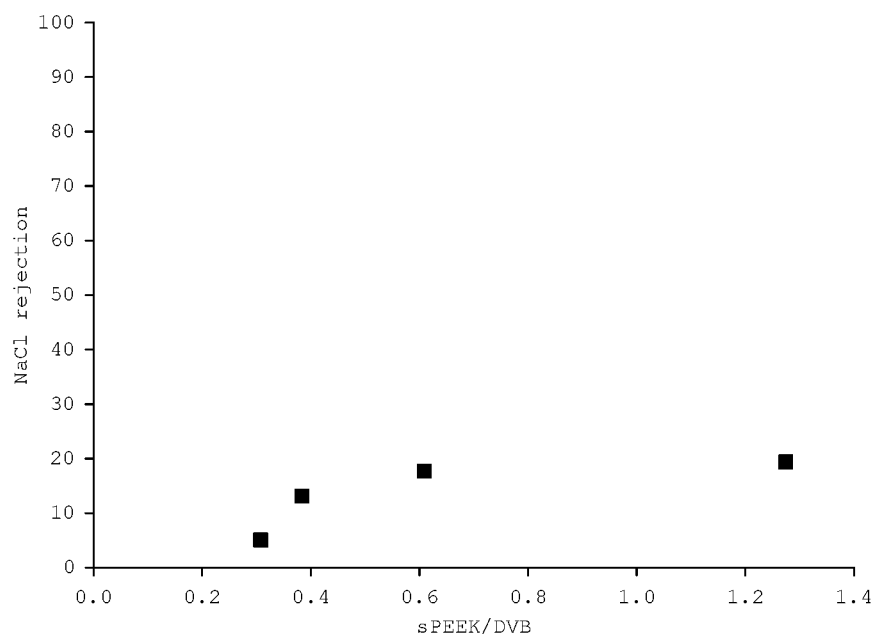
FIG. 31. Sodium chloride (NaCl) rejection (%) by Samples 7 to 10 of an asymmetric composite membrane prepared using different ratios of sPEEK and DVB in the preparation of the rejection layer. The feed stream was whole milk.
Figure 32:
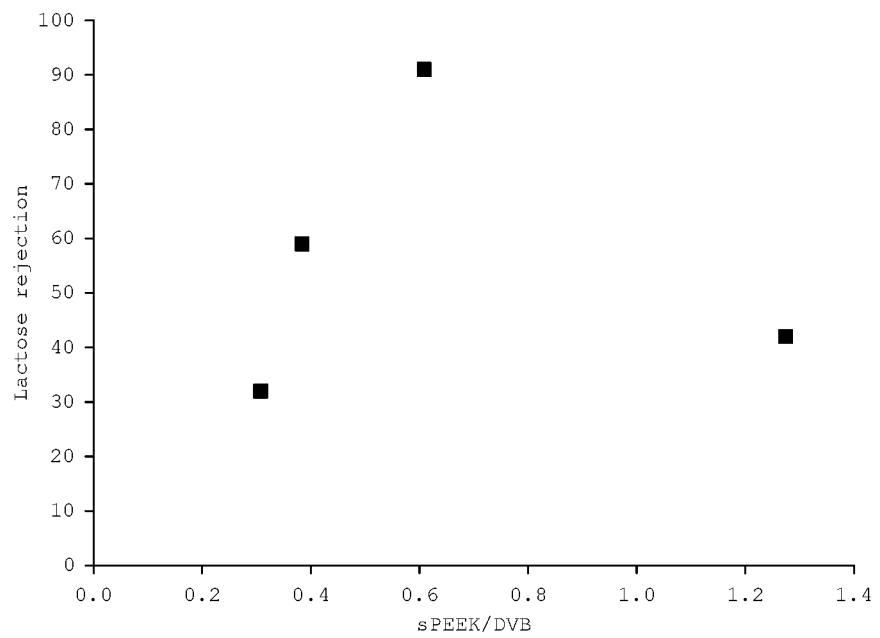
FIG. 32. Lactose rejection (%) by Samples 7 to 10 of an asymmetric composite membrane prepared using different ratios of sPEEK and DVB in the preparation of the rejection layer. The feed stream was whole milk.
Figure 33:
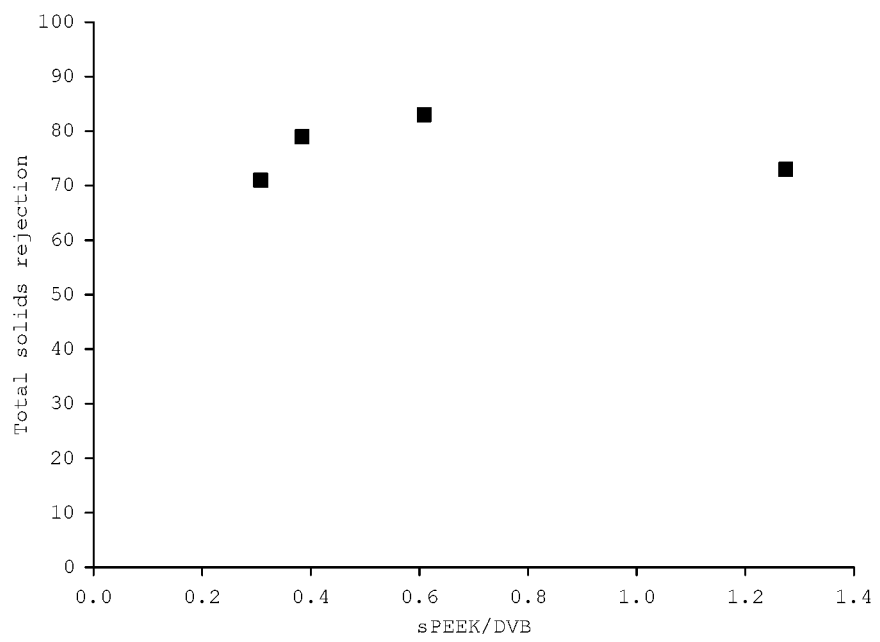
FIG. 33. Total solids rejection (%) by Samples 7 to 10 of an asymmetric composite membrane prepared using different ratios of sPEEK and DVB in the preparation of the rejection layer. The feed stream was whole milk.
Figure 34:
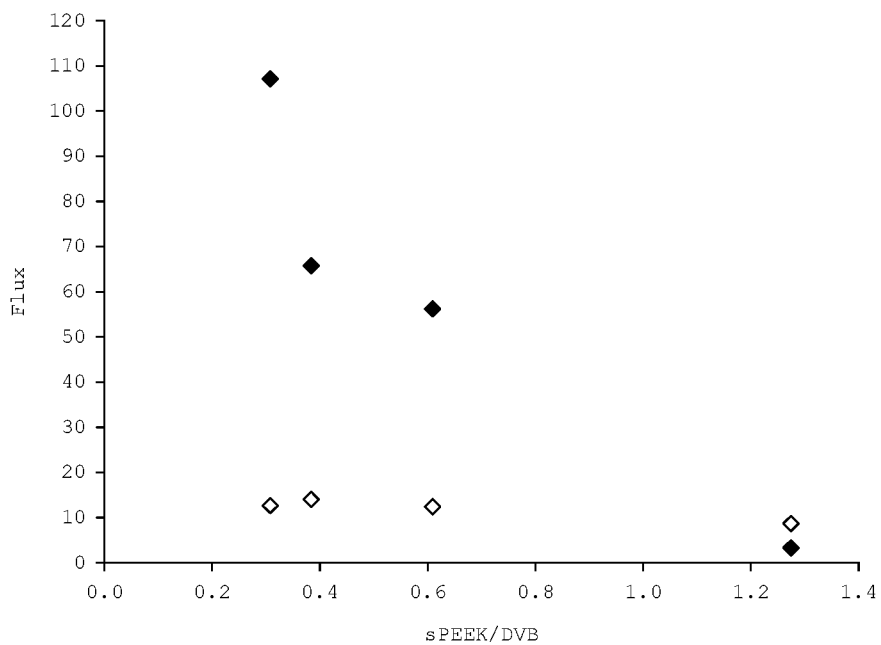
FIG. 34. Flux (LMH) for Samples 7 to 10 of an asymmetric composite membrane prepared using different ratios of sPEEK and DVB in the preparation of the rejection layer. The feed stream was either deionised water (♦) or whole milk (◊).
Figure 35:
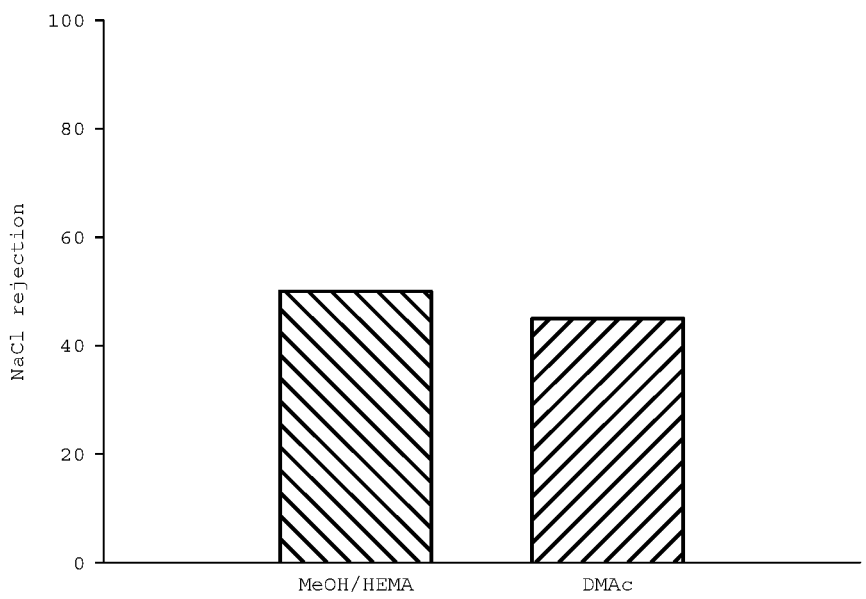
FIG. 35. Comparison of the sodium chloride (NaCl) rejection (%) for Sample 11 of an asymmetric composite membrane prepared using a different combination of solvent and hydrophilicitizing agent.

These samples were prepared to evaluate the influence the proportion of SPEEK used in the preparation of the rejection layer had on performance (in the absence of the hydrophilicitizing agent SSS). The non-linear relationship between the proportion of SPEEK used and sodium chloride rejection is consistent with an expected increase in the electric field gradient of the membrane and corresponding rejection of charged species (FIG. 31). The optimal lactose and total solids rejection was obtained for the sample with a molar ratio of sPEEK:DVB of 0.6 (FIGS. 32 and 33). The molar ratio of sPEEK:DVB that provided optimal flux was dependent on the feed stream (FIG. 34). For water the flux was highest for the sample with the lowest molar ratio of 0.3. For milk the flux was highest for the samples with the lower molar ratios. For both feed streams a high molar ratio of sPEEK:DVB was incompatible with a high flux.

Sample 11

Figure 36:
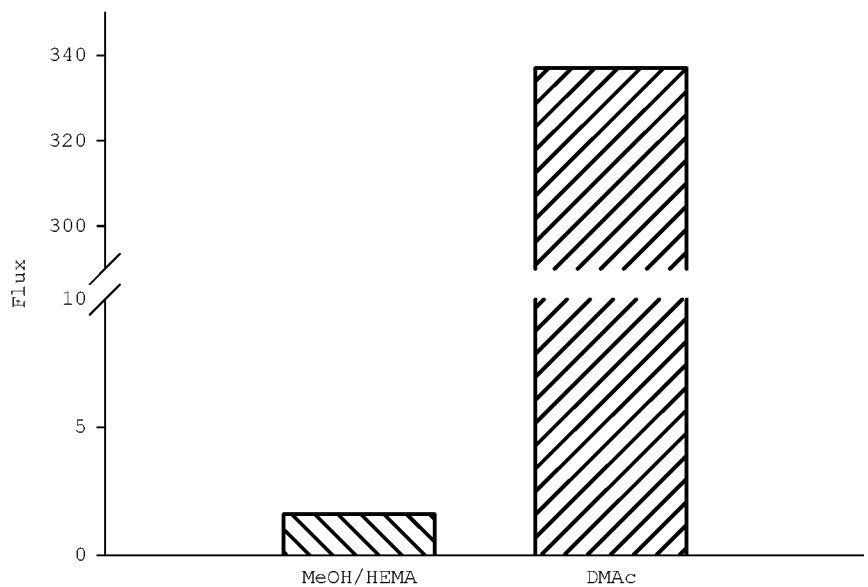
FIG. 36. Flux (LMH) for Sample 11 of an asymmetric composite membrane prepared using a different combination of solvent and hydrophilicitizing agent.
Figure 37:
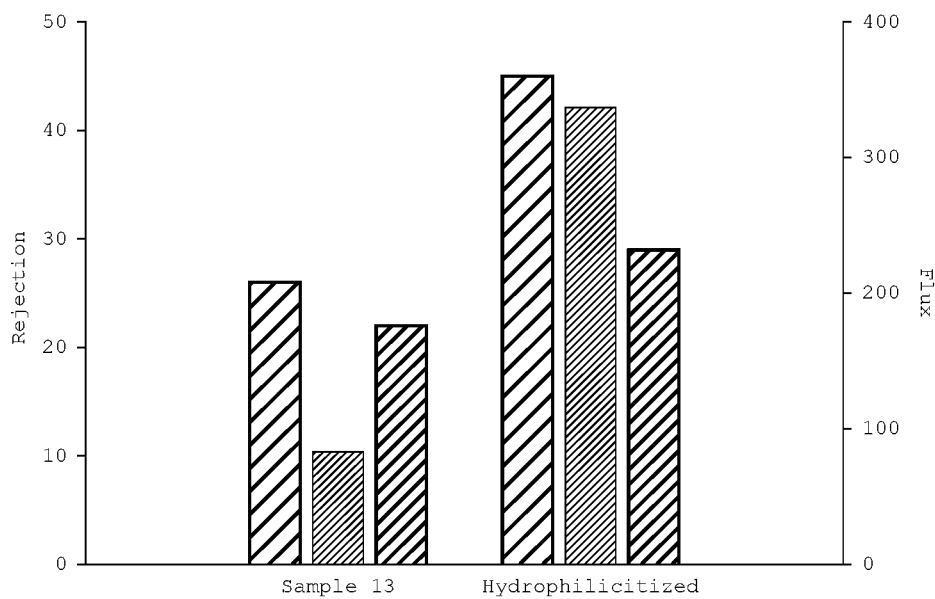
FIG. 37. Comparison of the sodium chloride (NaCl) rejection (%) (coarse diagonal hatching), flux (LMH) (fine diagonal hatching) and sucrose rejection (%) (medium diagonal hatching) for Sample 13 of an asymmetric composite membrane prepared using unmodified μPE as the backing layer and a sample of a symmetric composite membrane prepared using hydrophilic μPE as the backing layer.
Figure 38:
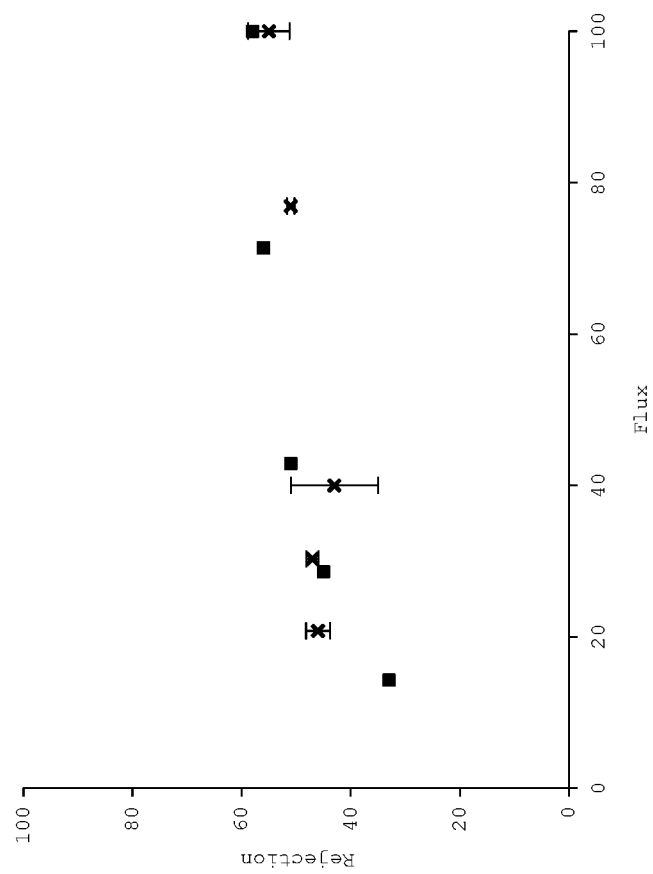
FIG. 38. Characterisation of Sample 13 using the Donnan Stearic Pore Model (DSPM) and curve fitting with sucrose as the uncharged solute.

The sample was prepared using a high (greater than 80%) solids content when preparing the rejection layer. In addition, HEMA was substituted for SSS as the hydrophilicitizing agent due to the poor solubility of the latter in methanol. An extended curing period of 10 minutes was employed. At a pressure of 20 bar the sample provided a comparable sodium chloride rejection (FIG. 24) but at a negligible flux (FIG. 36).

Sample 12

The sample was prepared using an unmodified µPE as the backing layer. This necessitated the use of acetone/water as the solvent for the rejection layer formulation. Pursuant to the use of this solvent the proportion of sPEEK was reduced and the proportion of SSS increased with a total solid content of 6% (w/w). The curing was performed in a sealed polyethylene bag to prevent flush evaporation of acetone during the curing period of five minutes. The performance of the sample at 20 bar in terms of flux and sodium chloride and sucrose rejection was poor when compared with the performance of an analogous sample prepared using a grafted, hydrophilicitized backing layer.

Evaluation of the Asymmetric Composite Membrane ("One-Step Method")

Figure 39:
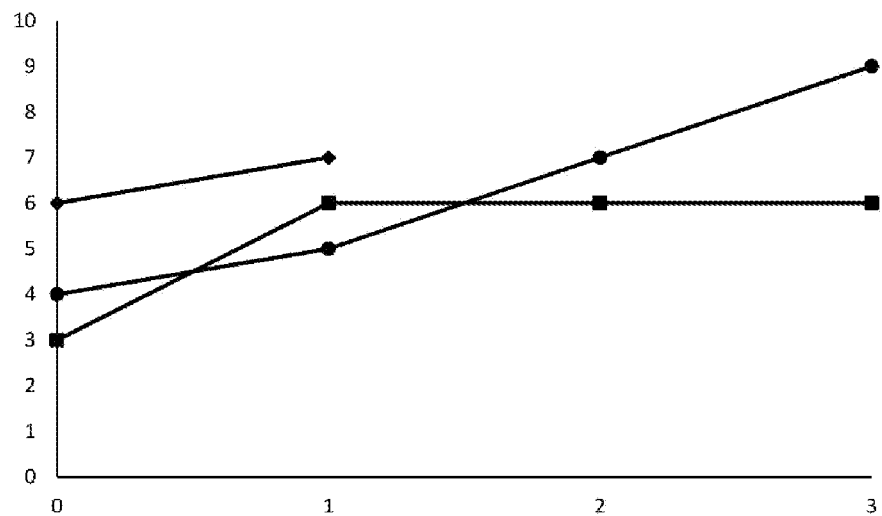
FIG. 39. The flux (L/m²/hr) of samples 090517Di, 090517Di and 090517Di over three clean-in-place (CIP) protocols.
Figure 40:
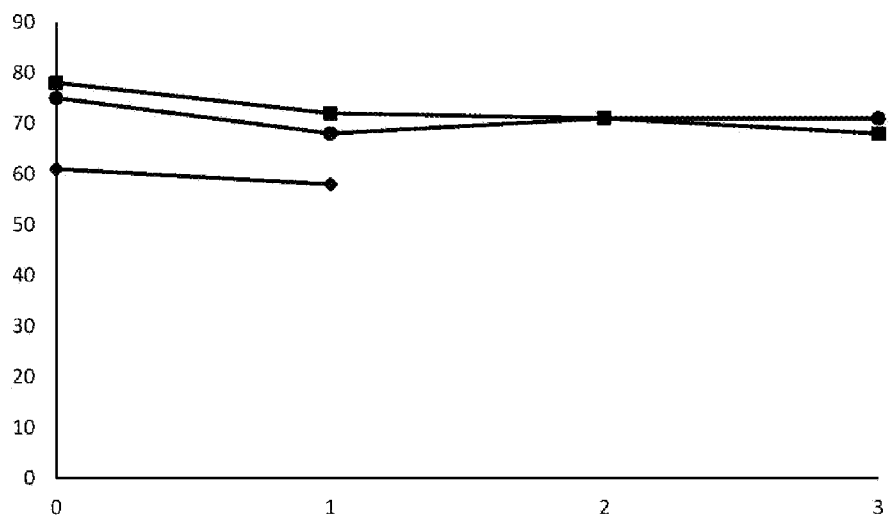
FIG. 40. The salt (NaCl) rejection (%) of samples 090517Di, 090517Di and 090517Di over three clean-in-place (CIP) protocols.

The performance over three clean-in-place (CIP) protocols of samples (090517Di, 090517Di and 090517Di) of the membrane prepared by contacting one side of a sheet of microporous poly(ethylene) (TARGRAY™ SW320H) with a single mixture of the components of the formulations presented in Table 11 and Table 12 was evaluated and the results presented in FIGS. 39 and 40.

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

REFERENCED PUBLICATIONS

Allmer et al (1988) *Surface modification of polymers. I. Vapor-phase photografting with acrylic acid* Journal of Polymer Science, Part A: Polymer Chemistry, 26(8), 2099-111.

Allmer et al (1989) *Surface modification of polymers. II. Grafting with glycidyl acrylates and the reactions of the grafted surfaces with amines* Journal of Polymer Science: Part A: Polymer Chemistry, 27, 1641-1652.

Ang et al (1980) *Photosensitized grafting of styrene, 4-vinylpyridine and methyl methacrylate to polypropylene* Journal of Polymer Science: Polymer Letters Edition, 18, 471-475.

Anon (2009) *Standard Practice for Cutting Film and Sheeting Test Specimens (D6287)* ASTM International, 100 Barr Harbour Drive, PO Box C700, West Conshohocken, Pa. 19428-2959, United States.

Anon (2010) *Standard Test Method for Tensile Properties of Plastics (D638)* ASTM International, 100 Barr Harbour Drive, PO Box C700, West Conshohocken, Pa. 19428-2959, United States.

Anon (2012) *Standard Test Method for Tensile Properties of Thin Plastic Sheeting (D882)* ASTM International, 100 Barr Harbour Drive, PO Box C700, West Conshohocken, Pa. 19428-2959, United States.

Anon (2014) *DOW FILMTEC™ Membranes—Cleaning procedures for DOW FILMTEC FT30 elements* Tech Fact (Form No. 609-23010-0211).

Bai et al (2011) *Surface UV photografting of acrylic acid onto LDPE powder and its adhesion* Shenyang Huagong Daxue Xuebao 25(2), 121-125.

Callahan et al (1990) Composite porous membranes and methods of making the same U.S. Pat. No. 4,976,897.

Callahan et al (1992) Membranes from UV-curable resins U.S. Pat. No. 5,102,552.

Causserand and Aimar (2010) 1.15 *Characterisation of filtration membranes* In *Comprehensive membrane science and engineering* Drioli, E; Giorna, L. eds. Oxford Elsevier.

Choi (2002) Graft polymerisation, separators, and batteries including the separators U.S. Pat. No. 6,384,100.

Choi (2004) Battery separator U.S. Pat. No. 6,680,144.

Choi (2005) Graft polymerisation, separators, and batteries including the separators U.S. Pat. No. 6,955,865.

Cussler et al (1992) Process for making microporous membranes having gel-filled pores and separations methods using such membranes U.S. Pat. No. 5,160,627.

Deb et al (2007) *Modification of sulfonated poly(ether ether ketone) with phenolic resin* Polym. Adv. Technol. 18, 419-426.

Di Vona et al (2008) *Synthetic strategies for the preparation of proton-conducting hybrid polymers based on PEEK and PPSU for PEM fuel cells* C. R. Chimie, 11, 1074-1081.

Di Vona et al (2009) *Analysis of Temperature-Promoted and Solvent-Assisted Cross-Linking in Sulfonated Poly (ether ether ketone) (SPEEK) Proton-Conducting Membranes* J. Phys. Chem. B 2009, 113, 7505-7512.

Donato et al (1993) Composite porous membranes U.S. Pat. No. 5,266,391.

Donato (1994) Composite porous membranes U.S. Pat. No. 5,294,342.

Donato et al (1994) Composite microporous membranes U.S. Pat. No. 5,294,346.

Drioli et al (2003) *Sulfonated PEEK-WC membranes for possible fuel cell applications* Journal of Membrane Science 228 (2004) 139-148.

Edge et al (1993) *Surface modification of polyethylene by photochemical grafting with 2-hydroxyethylmethacrylate* Journal of Applied Polymer Science, 47, 1075-1082.

El Kholdi et al (2004) *Modification of adhesive properties of a polyethylene film by phtografting* Journal of Applied Polymer Science 92(5), 2803-2811.

Fisher et al (1991) Microporous membranes having increased pore densities and process for making the same U.S. Pat. No. 5,013,439.

Gao et al (2013) *Radiation cross-linked lithium-ion battery separator with high rupture temperature and high tensile strength and manufacture method* Chinese patent application no. 2013-10196439 (publ. no. CN 103421208).

Gillberg-LaForce et al (1991) Modified microporous structures U.S. Pat. No. 5,049,275.

Gillberg-LaForce (1994) *Microporous membrane from cold-rolled precursor film* U.S. Pat. No. 5,328,760.

Hande et al (2008) *Crosslinking of sulfonated poly (ether ether ketone) using aromatic bis (hydroxyethyl) compound*, J. Membr. Sci., 322, 67-73.

Hou et al (2012) *Building bridges: Crosslinking of sulfonated aromatic polymers-a review* J. Membr. Sci., 423-424, 113-127.

Jones (1990) *Polybenzimidazole thin film composite membranes* U.S. Pat. No. 4,933,083.

Kubota and Hata (1990a) *Distribution of methacrylic acid-grafted chains introduced into polyethylene film by photografting* Journal of Applied Polymer Science, 41, 689-695.

Loeb (1981) *The Loeb-Sourirajan Membrane: How It Came About* In Synthetic Membranes, ACS Symposium Series, American Chemical Society, Washington, D.C.

McCutcheon and Wang (2013) *Osmotic Processes for a Sustainable 21st Century-Guest Editorial* Desalination, 312, 1.

Merle et al (2014) *Friedel Crafts crosslinked highly sulfonated polyether ether ketone (SPEEK) membranes for a vanadium/air redox flow battery*, Membranes 4, 1-19.

Mikhailenko et al (2004) *Proton conducting membrane based on cross-linked sulfonated poly(ether ether ketone) (SPEEK)* J. Membr. Sci. 233, 93-99.

Mikhailenko et al (2006) *Properties of PEMs based on crosslinked sulfonated poly(ether ether ketone)* J. Membr. Sci. 285, 306-316.

Ogiwara et al (1981) *Photosensitized grafting on polyolefin films in vapor and liquid phases* Journal of Polymer Science: Polymer Letters Edition, 19, 457-462.

Rhoden et al (2011) *Low equivalent weight Friedel-Crafts cross-linked sulfonated poly(ether ether ketone)* J. Membr. Sci., 376, 290-301.

Shentu et al (2002) *Factors affecting photo-grafting on low density polyethylene* Hecheng Suzhi Ji Suliao 19(3), 5-8.

Singleton et al (1993) *Polymeric sheet* International Application No. PCT/GB92/01245 (publ. no. WO 93/01622).

Tazuke and Kimura (1978) *Surface photografting. I. Graft polymerization of hydrophilic hydrophilicitizing agents onto various polymer films* Journal of Polymer Science: Polymer Letters Edition, 16, 497-500.

Xu and Yang (2000) *Study on the mechanism of LDPE-AA vapor-phase photografting system* Gaofenzi Xuebao (2000), 5, 594-598.

Yao and Ranby (1990a) *Surface modification by continuous graft copolymerization. I. Photoinitiated graft copolymerization onto polyethylene tape film surface* Journal of Applied Polymer Science, 40, 1647-1661.

Yao and Ranby (1990b) *Surface modification by continuous graft copolymerization. III. Photoinitiated graft copolymerization onto poly(ethylene terephthalate) fiber surface* Journal of Applied Polymer Science, 41, 1459-1467.

Yao and Ranby (1990c) *Surface modification by continuous graft copolymerization. IV. Photoinitiated graft copolymerization onto polypropylene fiber surface* Journal of Applied Polymer Science, 41, 1469-1478.

Ye et al (2009) *Sulfonated poly (ether ether ketone) membranes crosslinked with sulfonic acid containing benzoxazine monomer as proton exchange membranes* Polymer, 50, 3196-3203.

Zhang and Ranby (1991) *Surface modification by continuous graft copolymerisation. II. Photoinitiated graft copolymerization onto polypropylene film surface* Journal of Applied Polymer Science, 43, 621-636.

The invention claimed is:

1. An asymmetric composite membrane comprising a film of crosslinked sulfonated poly(ether ether ketone) adhered to one side of a hydrophilicitized sheet of microporous polyolefin where the hydrophilicitized sheet of microporous polyolefin consists of polyolefin grafted with 4-ethenyl-benzenesulfonic acid.

2. The membrane of claim 1 where the crosslinked sulfonated poly(ether ether ketone) incorporates a crosslinking agent selected from the group consisting of: divinylbenzene; ethylene glycol dimethacrylate; and glyoxal bis(diallyl acetal).

3. The membrane of claim 2 where the crosslinked sulfonated poly(ether ether ketone) incorporates divinylbenzene as the crosslinking agent.

4. The membrane of claim 1 where the polyolefin is poly(ethylene).

5. An asymmetric composite membrane consisting of a film of crosslinked sulfonated poly(ether ether ketone) incorporating divinylbenzene as the crosslinking agent adhered to one side of a sheet of microporous poly(ethylene) grafted with 4-ethenyl-benzenesulfonic acid.

* * * * *